(12) United States Patent
Schliwa-Bertling et al.

(10) Patent No.: US 9,955,419 B2
(45) Date of Patent: Apr. 24, 2018

(54) NETWORK NODES, A USER EQUIPMENT AND METHODS THEREIN FOR ESTABLISHING A CONNECTION BETWEEN THE USER EQUIPMENT AND A WIRELESS COMMUNICATIONS NETWORK

(71) Applicant: Telefonaktiebolaget L M Ericsson (publ), Stockholm (SE)

(72) Inventors: Paul Schliwa-Bertling, Ljungsbro (SE); Thomas Walldeen, Linköping (SE); Stefan Johansson, Linköping (SE); Håkan Axelsson, Linköping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 58 days.

(21) Appl. No.: 14/891,863

(22) PCT Filed: Oct. 20, 2015

(86) PCT No.: PCT/SE2015/051111
§ 371 (c)(1),
(2) Date: Nov. 17, 2015

(87) PCT Pub. No.: WO2016/068776
PCT Pub. Date: May 6, 2016

(65) Prior Publication Data
US 2016/0278160 A1     Sep. 22, 2016

Related U.S. Application Data

(60) Provisional application No. 62/079,821, filed on Nov. 14, 2014, provisional application No. 62/069,382, filed on Oct. 28, 2014.

(51) Int. Cl.
*H04W 52/02* (2009.01)
*H04W 48/02* (2009.01)
(Continued)

(52) U.S. Cl.
CPC ....... *H04W 52/0212* (2013.01); *H04W 48/02* (2013.01); *H04W 48/10* (2013.01);
(Continued)

(58) Field of Classification Search
CPC ....... H04W 80/04; H04W 8/26; H04W 84/12; H04W 88/08; H04W 88/06; H04W 84/18; H04L 2012/5608
(Continued)

(56) References Cited

U.S. PATENT DOCUMENTS 8,934,336 B2 * 1/2015 Ramachandran ... H04W 76/027
                                               370/221
9,332,461 B2 * 5/2016 Han ................... H04W 36/0022
(Continued)

FOREIGN PATENT DOCUMENTS

EP     2557890 A1    2/2013
EP     2645804 A1   10/2013
(Continued)

OTHER PUBLICATIONS

Author Unknown, "Technical Specification Group Services and System Aspects; Optimized offloading to Wireless Local Area Network (WLAN) in 3GPP Radio Access Technology (RAT) mobility (Release 12)," Technical Report 23.890, Version 12.0.0, 3GPP Organizational Partners, Sep. 2013, 12 pages.
(Continued)

*Primary Examiner* — Brenda H Pham
(74) *Attorney, Agent, or Firm* — Sage Patent Group

(57) ABSTRACT

A method performed by a wireless device for handling suspension of a connection between the wireless device and a wireless communications network. The wireless communications network comprises the first network node.
The wireless device receives information from the first network node. The information comprises a first identifier
(Continued)

identifying a first cell area. The first cell area comprises one or more cells capable of resuming the connection.
The wireless device suspends the connection in a first cell out of the one or more cells.
When selecting a cell access method for a cell the wireless device determines whether or not resumption of the connection is allowed in the cell based on the information from the network node.

28 Claims, 33 Drawing Sheets

(51) Int. Cl.
*H04W 48/10* (2009.01)
*H04W 76/06* (2009.01)
*H04W 76/02* (2009.01)
*H04W 72/04* (2009.01)
*H04W 4/20* (2018.01)
*H04W 4/00* (2018.01)
*H04W 36/00* (2009.01)
*H04W 76/04* (2009.01)

(52) U.S. Cl.
CPC ......... *H04W 72/048* (2013.01); *H04W 76/02* (2013.01); *H04W 76/028* (2013.01); *H04W 76/06* (2013.01); *H04W 4/005* (2013.01); *H04W 4/20* (2013.01); *H04W 36/0033* (2013.01); *H04W 76/046* (2013.01); *H04W 76/068* (2013.01); *Y02B 60/50* (2013.01)

(58) Field of Classification Search
USPC .... 370/349, 310.2, 328, 338, 332, 331, 351, 370/354, 355
See application file for complete search history.

(56) References Cited

U.S. PATENT DOCUMENTS

2012/0023506 A1  1/2012  Maeckel et al.
2015/0146685 A1* 5/2015  Han ................. H04W 36/30
                                                        370/331

FOREIGN PATENT DOCUMENTS

WO   2012050841 A1   4/2012
WO   2013155212 A1   10/2013
WO   2014117854 A1   8/2014

OTHER PUBLICATIONS

International Search Report and Written Opinion for International Patent Application No. PCT/SE2015/051111, dated Feb. 15, 2016, 13 pages.
Author Unknown, "Technical Specification Group Services and System Aspects; Study on Machine-Type Communications (MTC) and other mobile data applications communications enhancements (Release 12)," Technical Report 23.887, Version 12.0.0, 3GPP Organizational Partners, Dec. 2013, 151 pages.
Author Unknown, "Technical Specification Group Radio Access Network; Evolved Universal Terrestrial Radio Access (E-UTRA); User Equipment (UE) procedures in idle mode (Release 12)," Technical Specification 36.304, Version 12.2.0, 3GPP Organizational Partners, Sep. 2014, 37 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.3.0, 3GPP Organizational Partners, Sep. 2014, 378 pages.
Author Unknown, "Technical Specification Group Radio Access Network; Evolved Universal Terrestrial Radio Access Network (E-UTRAN); S1 Application Protocol (S1AP)(Release12)," Technical Specification 36.413, Version 12.3.0, Sep. 2014, 290 pages.
European Search Report for European Patent Application No. 15855776.9, dated Sep. 20, 2017, 4 pages.
Examination Report for European Patent Application No. 15855776.9, dated Oct. 10, 2017, 6 pages.

\* cited by examiner

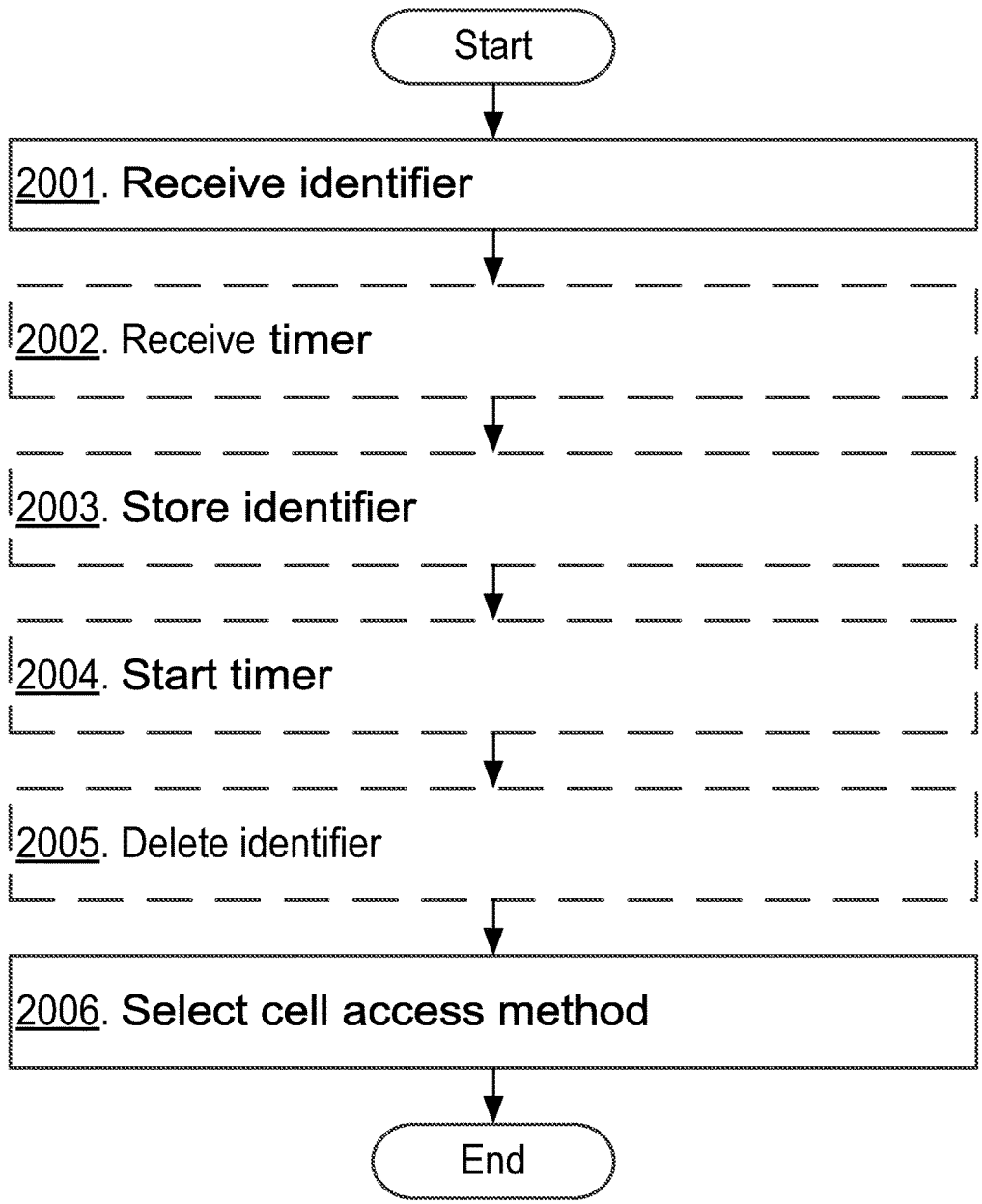
Fig. 20 Method in UE/wireless device 240

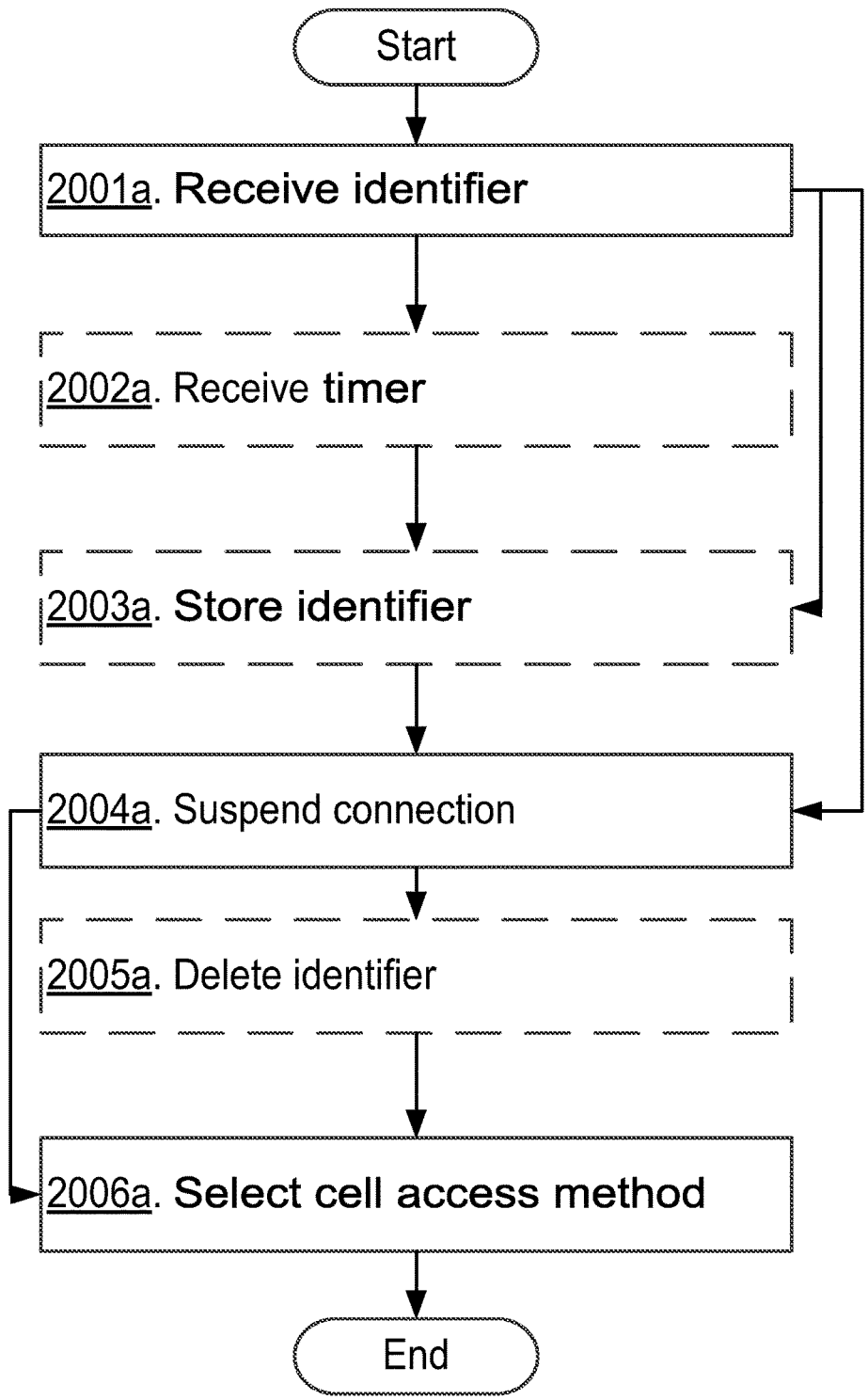
Fig. 20a Method in UE/wireless device 240

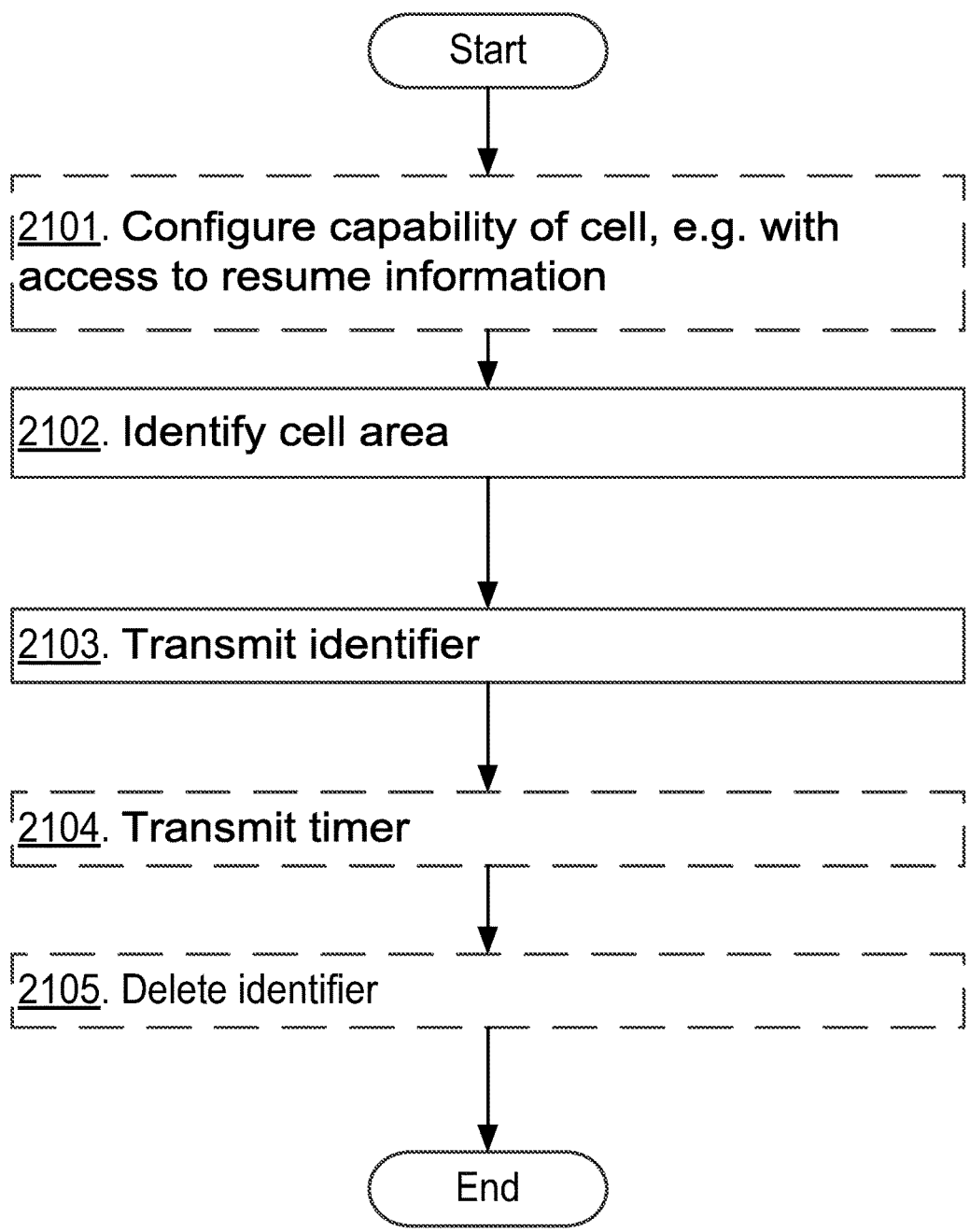
Fig. 21 Method in network node 211

NETWORK NODES, A USER EQUIPMENT AND METHODS THEREIN FOR ESTABLISHING A CONNECTION BETWEEN THE USER EQUIPMENT AND A WIRELESS COMMUNICATIONS NETWORK

This application is a 35 U.S.C. § 371 national phase filing of International Application No. PCT/SE2015/051111, filed Oct. 20, 2015, which claims the benefit of provisional application Ser. Nos. 62/069,382, filed Oct. 28, 2014, and 62/079,821, filed Nov. 14, 2014, the disclosures of which are incorporated herein by reference in their entireties.

TECHNICAL FIELD

Embodiments herein relate to a network node, a wireless device, a system of network nodes and methods therein. In particular the embodiments herein relate to handling a connection between the wireless device and a wireless communications network.

BACKGROUND

Communication devices such as terminals are also known as e.g. User Equipments (UE), mobile terminals, wireless terminals and/or mobile stations. Terminals are enabled communicate wirelessly in a wireless or cellular communications network or a wireless communication system, sometimes also referred to as a cellular radio system or cellular network. The communication may be performed e.g. between two terminals, between a terminal and a regular telephone and/or between a terminal and a server via a Radio Access Network (RAN) and possibly one or more core networks, comprised within the cellular communications network.

Examples of wireless communications networks are Long Term Evolution (LTE), Universal Mobile Telecommunications System (UMTS) and Global System for Mobile communications (GSM).

Terminals may further be referred to as mobile telephones, cellular telephones, laptops, surf plates or tablets with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used to denote the transmission path from the base station to the mobile station. The expression Uplink (UL) is used to denote the transmission path in the opposite direction i.e. from the mobile station to the base station.

In 3rd Generation Partnership Project (3GPP) LTE, base stations, which may be referred to as eNodeBs or even eNBs, may be directly connected to one or more core networks and related core network nodes, such as a Mobility Management Entity (MME) and a Serwing GateWay (SGW).

The MME is a control node and is responsible for idle mode UE tracking and paging procedure including retransmissions. The MME is involved in the bearer activation/deactivation process and is also responsible for choosing the SGW for a UE at the initial attach and at time of intra-LTE handover involving Core Network (CN) node relocation. The MME is responsible for authenticating the user.

3GPP LTE radio access standard has been written in order to support high bitrates and low latency both for uplink and downlink traffic. All data transmission is in LTE controlled by the radio base station.

The introduction of new types of devices, such as devices that are used for Machine-Type-Communication (MTC), that interact with wireless communications networks put new requirements both on the devices, such as UEs, and the networks. Such new requirements may impose problems, such as shorter battery lifetime for the UEs, and from the network point of view one of the problems is to handle many devices sending small amounts of data.

For example, when a device, such as a UE, wants to send data, it needs to set up a connection towards the wireless communications network. This implies some mandatory steps, e.g. establishing a control connection to the MME through the eNodeB, establishing a secure radio connection on the air interface and configuring data bearers through which data may be sent. FIG. 1 shows a legacy normal service request establishment in LTE when data is to be received or transferred. As can be seen from FIG. 1 there is rather much signaling, i.e. actions 101-114, before the UE sends 115 the payload data to the eNodeB.

The signaling described above consumes much processing resources compared to the data volume being transferred for some devices, such as MTCs. This may then set a limit on how many devices that an eNodeB may handle, or how much other traffic the eNodeB may handle.

One prior art approach is to always have the devices in connected mode, that is e.g. have a control connection towards the MME, a secure radio connection and configured data bearers established all the time. This will however have impacts both on the performance of mobile devices, e.g. in terms of battery lifetime, and also on the performance of the network, since the connected mode consumes network resources. In fact, an eNodeB is normally designed to only handle a certain maximum number of users in connected mode. Since the actual number of devices in the area may be multiples higher than the designed maximum number of users in connected mode this will impose a large limitation.

SUMMARY

It is therefore an object of embodiments herein to address at least some of the problems and issues mentioned above, by providing an improved way of handling a connection between a wireless device and a wireless communications network.

When a connection between the UE, i.e. wireless device, and the network is released in LTE, all contexts in the eNodeB and the related information in the MME and the SGW are released. At the next service request, e.g. when the UE wants to send data, the entire signaling procedure for establishing a connection needs to be performed again. The current way to always establish a new connection leads to much signaling and hence consume much processing resources compared to the data volume being transferred for some devices, such as MTCs.

Instead of releasing an established connection between a wireless device, such as the UE, and the wireless communications network, the wireless device is 'suspended' in embodiments herein. Suspended means that data related to the established connection between the wireless device and the wireless communications network are saved in the wireless device and in network nodes connected to the wireless device, such as an eNodeB, an MME and an SGW.

The data may comprise a UE context, for example a UE context related to security, bearers, Temporary International Mobile Subscriber Identity (T-IMSI) and UE capabilities.

Further, in embodiments herein, instead of establishing a new connection between the wireless device and the wireless communications network when there is new data to be transferred, the previous connection is resumed, or continued, at a later time with the same security context and bearers.

In other words, in embodiments herein the wireless device may be connected to the wireless communications network using the same connection parameters for several sessions of the connection since these connection parameters are saved in the wireless device and in the network nodes during the above suspension of the connection.

The wireless device is in other aspects handled as in 'Idle mode'. Although the wireless device is in other aspects handled as in 'Idle mode', the wireless device may continue a previous session of the connection, i.e. 'resume the previous session' when the wireless device wants to establish a connection towards the network, e.g. when there is new data to be transferred.

The 'Resume' of the previous connection may be allowed within the cell where the wireless device was 'suspended' or in a cell in which information indicating that resume is possible is broadcasted.

Embodiments herein are related to such information indicating whether or not resume is possible.

In order for the UE to be able to resume its RRC connection, a set of parameters, e.g. the UE's security context, also referred to as 'RRC Resume Context' or 'UE Context' herein, and a resume identifier of the UE, may be needed to be available to the cell that the UE wants resume its RRC connection with. These parameters will be further explained in the detailed description below.

Furthermore it is fair to assume that due to typical network deployments a given RRC Resume Context and a resume identifier of the UE will only be available to cells within some limited geographical area. Therefore a UE attempting blindly to resume its RRC connection with an arbitrary cell that may or may not have access to the RRC Resume Context will result in a high rate of resume attempt failures wasting the UEs' battery lifetime, radio resources, network resources, such as Random Access bandwidth, or L3 signalling load or node CPU cycles and increasing the interference level.

Finally, storing the RRC Resume Contexts infinitely may cause memory exhaustion in the UE and in network nodes involved in RRC Resume, which impacts the network performance.

According to a first aspect of embodiments herein, the object is achieved by a method performed by a wireless device for handling suspension of a connection between the wireless device and a wireless communications network. The wireless communications network comprises the first network node.

The wireless device receives information from the first network node. The information 1600 comprises a first identifier identifying a first cell area. The first cell area 281 comprises one or more cells capable of resuming the connection.

The wireless device suspends the connection in a first cell out of the one or more cells.

When selecting a cell access method for a cell the wireless device determines whether or not resumption of the connection is allowed in the cell based on the information from the network node.

According to a second aspect of embodiments herein, the object is achieved by a method performed by a first network node for handling suspension of a connection between a wireless device and a wireless communications network. The wireless communications network comprises the first network node.

The first network node identifies a first cell area. The first cell area comprises one or more cells capable of resuming the connection when the connection is suspended.

The first network node transmits information to the wireless device, which information comprises a first identifier identifying the first cell area. The information enables the wireless device to determine whether resumption of the connection is allowed or not in a cell.

The first network node suspends the connection in a first cell out of the one or more first cells.

According to a third aspect of embodiments herein, the object is achieved by a wireless device configured to perform the method according to the first aspect.

According to a fourth aspect of embodiments herein, the object is achieved by a first network node configured to perform the method according to the second aspect.

According to a fifth aspect of embodiments herein, the object is achieved by a method performed by a system of network nodes for suspension of a connection between a wireless device and a wireless communications network. The wireless communications network comprises the system of network nodes.

A first network node comprised in the system of network nodes identifies a first cell area. The first cell area comprises one or more cells capable of resuming the connection when the connection is suspended.

The first network node transmits information to the wireless device. The information comprises a first identifier identifying the first cell area.

The first network node suspends the connection in a first cell out of the one or more cells.

A second network node comprised in the system of network nodes transmits a second information to the wireless device. The second information is related to a cell. The second information comprises a third identifier identifying a second cell area. The second cell area comprises the cell. This enables the wireless device to determine whether or not resumption of the connection is allowed in the cell based on comparing the first information with the second information.

According to a sixth aspect of embodiments herein, the object is achieved by a system of network nodes configured to perform the method above performed by the system of network nodes.

The wireless device receives information comprising the first identifier identifying the one or more cells capable of resuming the connection from the first network node. Since the wireless device selects a cell access method based on the information comprising the first identifier radio resources are only spent on cell access attempts that are supported by the wireless device and the wireless communications network and therefore the performances of the wireless device and the first network node are improved.

In other words, since the wireless device selects a cell access method based on the information from the first network node the performances of the wireless device and the first network node are improved.

Embodiments herein enable a flexible handling of RRC connections.

Embodiments herein enable a faster transition from 'idle' to 'ready to transfer data mode', such as RRC Connected Mode. In embodiments herein no round trip communication towards the core network node is needed to set up a connection towards the wireless communications network. This will significantly reduce the time before an uplink packet may be transferred. Note also that the reduced time before an uplink packet may be transferred will be the same when the S1 connection is over satellite, i.e. 20-30 ms compared to 1 s with the current method where a new connection is needed every time new data is to be sent from the UE to the network. Further, when the S1 connection is over satellite, also the time to transfer a DL package from the wireless communications network to the UE is significantly improved, 250 ms compared to 1 s for the current method.

Embodiments herein require less signaling and hence consume less resources on the air interface, in the eNodeB, on an S1-C interface between the eNodeB and the MME, in the MME, on the S11 interface between the MME and the SGW and in the SGW.

Big advantages are seen for UEs with low mobility which transfers rather small amount of data at a time. However, benefits are expected also in other cases. For example, normal smart phone traffic will gain faster setup times and the underlying wireless communications network will need less processing.

Embodiments herein enable the possibility to manage the functionality of RRC resume across the network, which minimizes the risk for inefficient resource usage due to blind attempts for resumption of the RRC connection.

BRIEF DESCRIPTION OF THE DRAWINGS

Examples of embodiments herein are described in more detail with reference to attached drawings in which:

FIG. 20 is a flowchart illustrating embodiments of a method performed by a wireless device.

FIG. 20a is a flowchart illustrating further embodiments of a method performed by a wireless device.

FIG. 21 is a flowchart illustrating embodiments of a method performed by a first network node.

DETAILED DESCRIPTION

Figure 1:
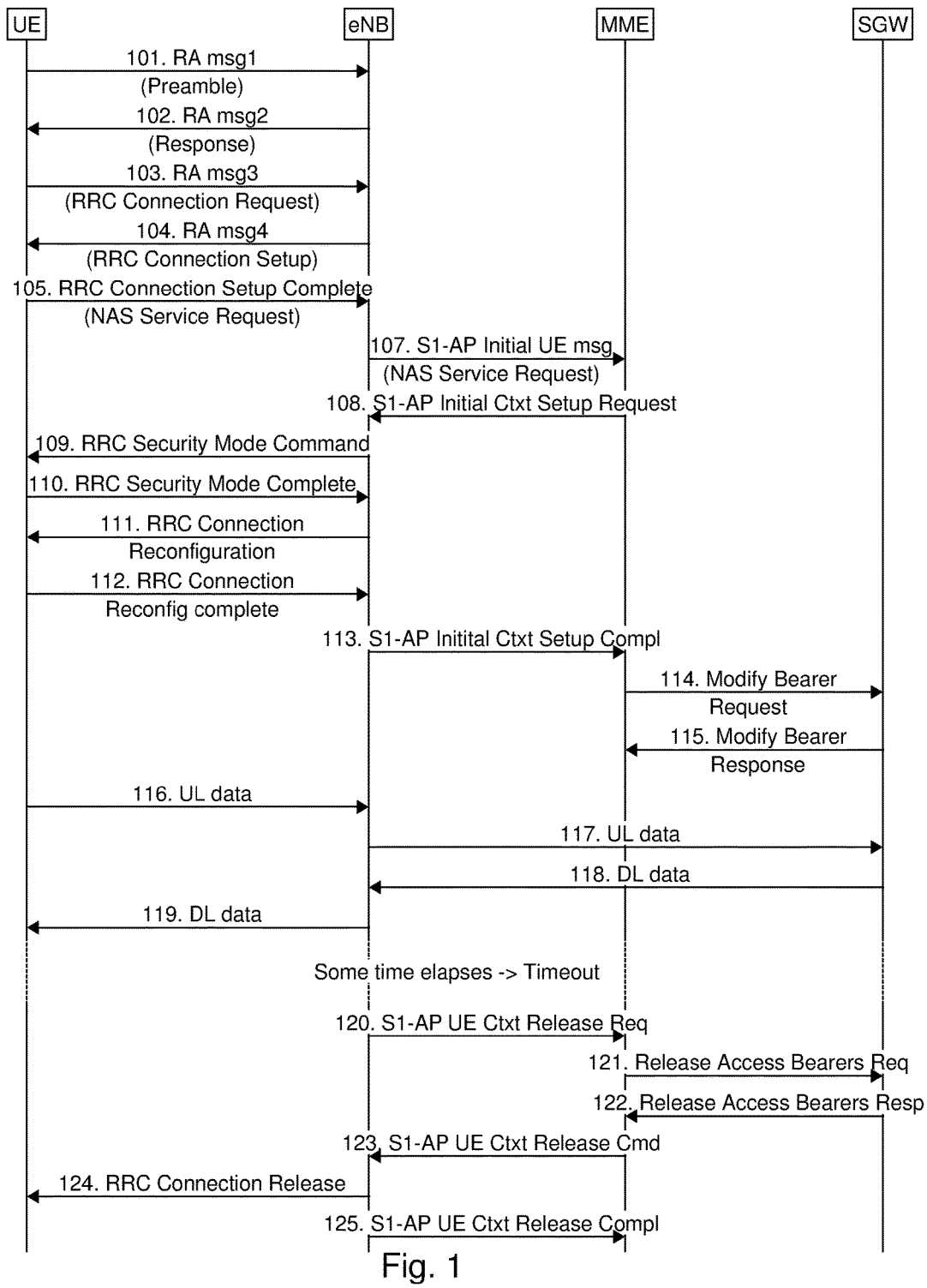
FIG. 1 is a signaling diagram illustrating a method for accessing the wireless communications network according to prior art.
Figure 2A:
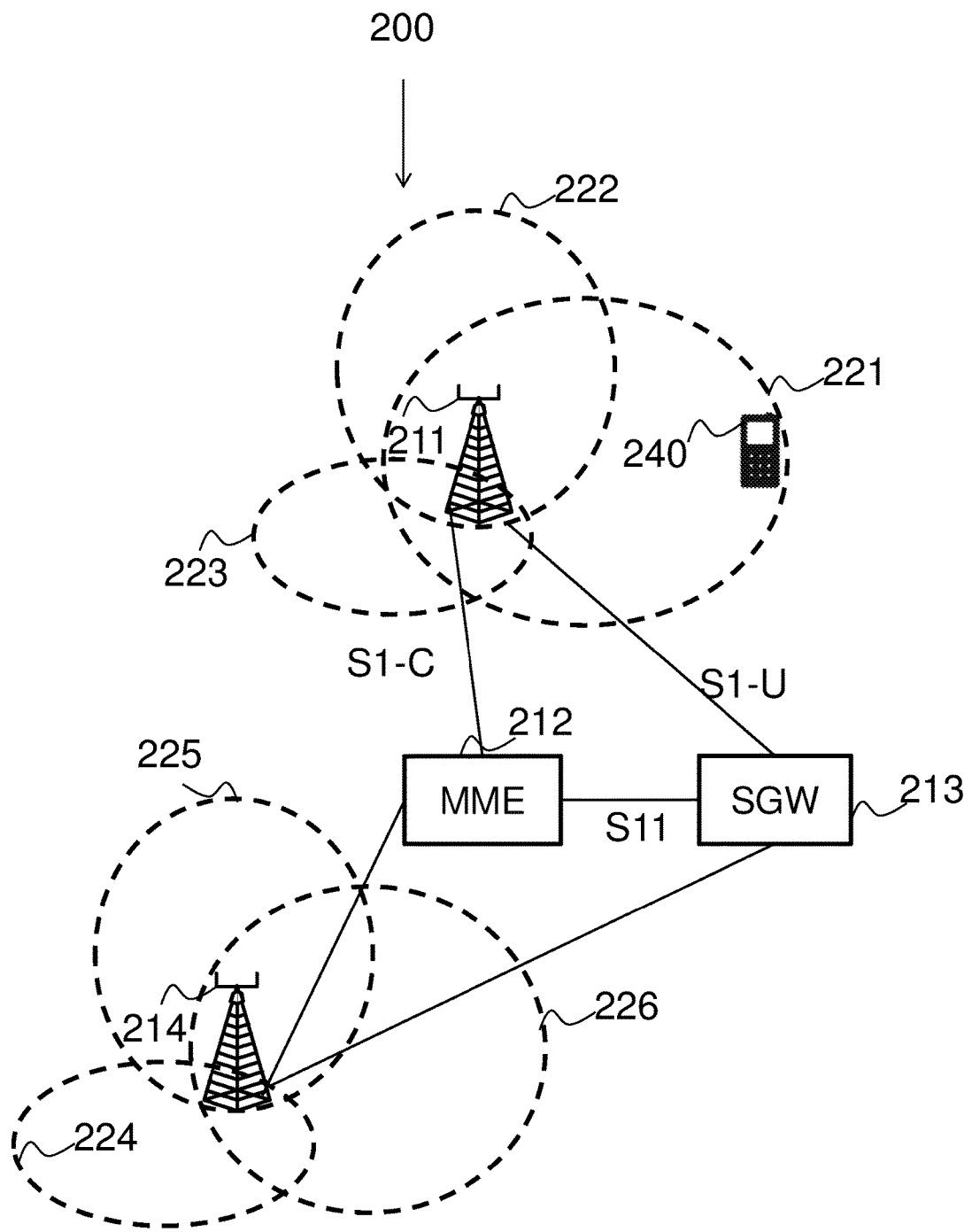
FIG. 2a is a schematic block diagram illustrating a wireless communications network in which embodiments herein may be implemented.
Figure 2B:
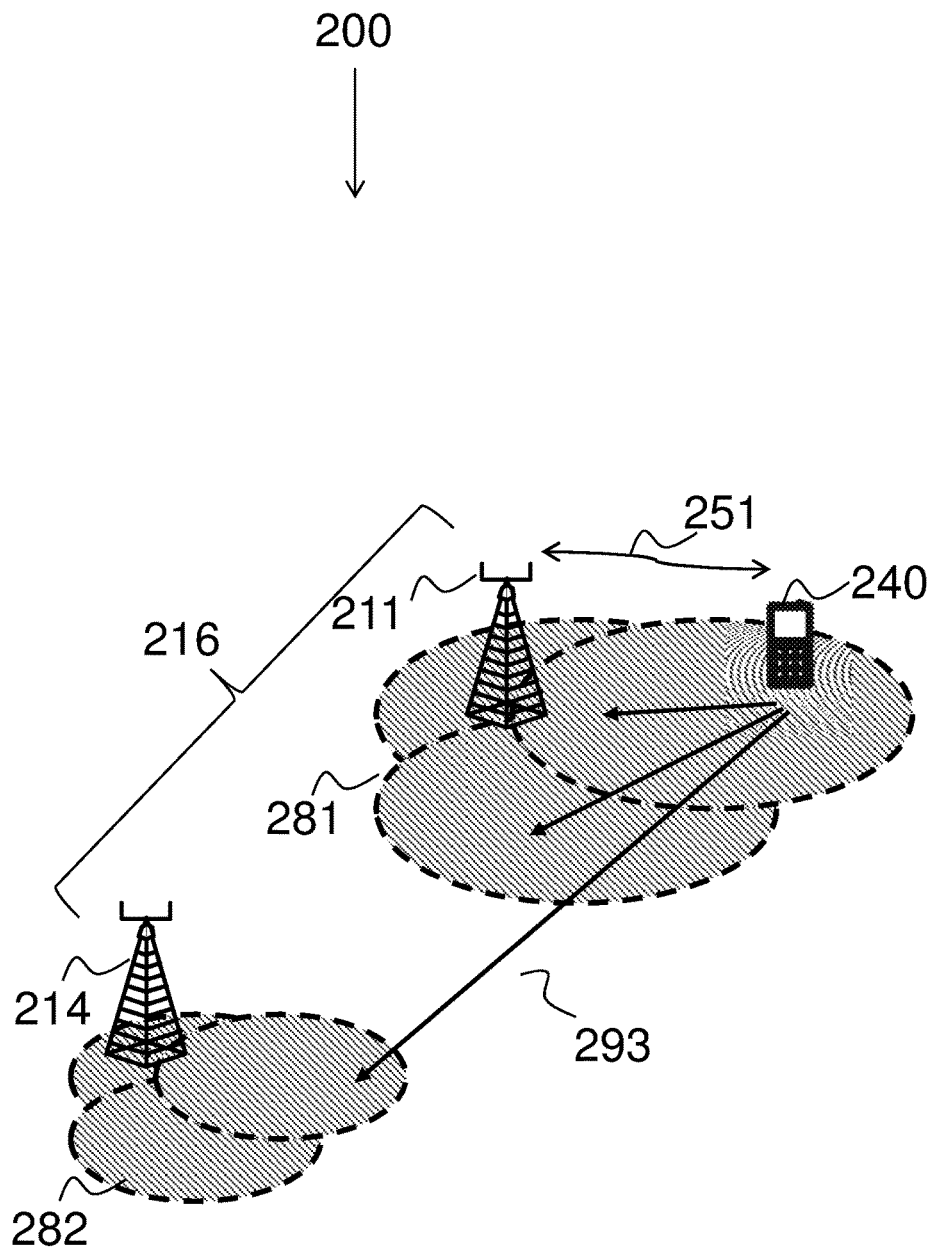
FIG. 2b is a further schematic block diagram illustrating a wireless communications network in which embodiments herein may be implemented.

Embodiments herein may be implemented in one or more wireless communications networks whereof FIG. 2a and FIG. 2b depict parts of a wireless communications network

200. The wireless communications network 200 may for example be an LTE, UMTS, GSM, or any 3GPP wireless communications network, or any cellular wireless communications network or system.

The wireless communications network 200 comprises a plurality of base stations and/or other network nodes. More specifically, the wireless communications network 200 comprises a first network node 211.

The term "network node" may correspond to any type of radio network node or any network node, which communicates with at least a radio network node. For example, the network node 211 may be a base station, such as an eNB. The base station may also be referred to as a NodeB, an evolved Node B (eNB, eNode B), a base transceiver station (BTS), Access Point (AP) Base Station, Wi-Fi AP, base station router, or any other network unit capable of communicating with a user equipment within a cell served by the base station depending e.g. on the radio access technology and terminology used. The network node 211 may also be an RNC in an UMTS system.

In some embodiments the wireless communications network 200 further comprises a second network node 214, e.g. a base station such as an eNB. The first network node 211 and the second network node 214 may operate and/or be comprised in a system 216 of network nodes. The system 216 of network nodes may for example comprise the first network node 211 and the second network node 214. Some of the embodiments herein are implemented in the system 216 of network nodes. For example, a first part of these embodiments may be performed in the first network node 211 while a second part of these embodiments may be performed in the second network node 214.

The wireless communications network 200 may further comprise a third network node 212, for example a first core network node such as an MME. The third network node 212 may be a control node and may be responsible for idle mode UE tracking and paging procedure including retransmissions. The third network node 212 may be involved in the bearer activation/deactivation process and may also be responsible for choosing an SGW for a UE at the initial attach and at time of intra-LTE handover involving CN node relocation. The third network node 212 may be responsible for authenticating the user. Embodiments herein are applicable for "MME in Pool", wherein the eNodeB may be connected to a number of MME nodes serving the same cells, or for similar technical solutions.

The wireless communications network 200 may further comprise a fourth network node 213, for example a second core network node such as an SGW.

The first network node 211 serves one or more cells. In FIG. 2*a* the first network node 211 serves a first cell 221, a second cell 222 and a third cell 223. Likewise, the second network node 214 serves one or more cells. In FIG. 2*a* the second network node 214 serves a fourth cell 224, a fifth cell 225 and a sixth cell 226.

A cell is a geographical area where radio coverage is provided by network node equipment such as Wi-Fi Access Point (AP) equipment, base station equipment at a base station site or at remote locations in Remote Radio Units (RRU). The network node 211 is an example of such network node equipment. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying cells uniquely in the whole of a wireless communication network is also broadcasted in the cells.

Throughout this description, the term "cell" is used to represent any area in which a network node provides radio coverage for wireless devices. Hence, this description is not limited to cellular networks and it may be valid and useful for any type of radio network in which various network nodes provide radio coverage.

The cells may be comprised in different cell areas. Examples of cell areas are illustrated in FIG. 2*b*. In FIG. 2*b* a first cell area 281 comprises the first cell 221, the second cell 222 and the third cell 223. A second cell area 282 comprises the fourth cell 224, the fifth cell 225 and the sixth cell 226. The cells comprised in the same cell area may be configured with the same capabilities, e.g. capabilities relating to access to information relating to suspend and resume procedures.

Network nodes, such as base stations and Wi-Fi AP, communicate over the air or radio interface operating on radio frequencies with user equipment within range of the network nodes. The user equipment transmit data over the radio interface to network nodes, such base stations and Wi-Fi AP, in UL transmissions, and network nodes, such as Wi-Fi AP and base stations, transmit data over an air or radio interface to the user equipment in DL transmissions.

The first network node 211 communicates with wireless devices in the cell 221, such as a wireless device 240, also referred to as a UE or a user equipment. The wireless device 240 may be in different states or modes of operation. For example, when no data is sent from or to the wireless device 240 it may be in an idle state, in which the wireless device 240 does not have a connection 251, such as a Radio Resource Control (RRC) connection, in place with the first network node 211, such as an eNB. When data is transmitted to or from the wireless device 240 it may be in an active state with an active connection 251 between the wireless device 240 and the wireless communications network 200.

The expression "serving cell" is normally used for a cell in which the wireless device 240 is active and the wireless device 240 is then on the serving cell. The expression "a cell the wireless device 240 camps on" is normally used for a cell that the wireless device 240 is currently monitoring when the wireless device 240 is in idle mode. The wireless device 240 may change cell to camp on without informing any of the network nodes comprised in the wireless communications network 200. I.e. in embodiments herein the wireless device 240 will resume a suspended connection in the cell 'it camps on' and if the resumption of the suspended connection is successful that cell will become the serving cell for the wireless device 240.

Figure 2C:
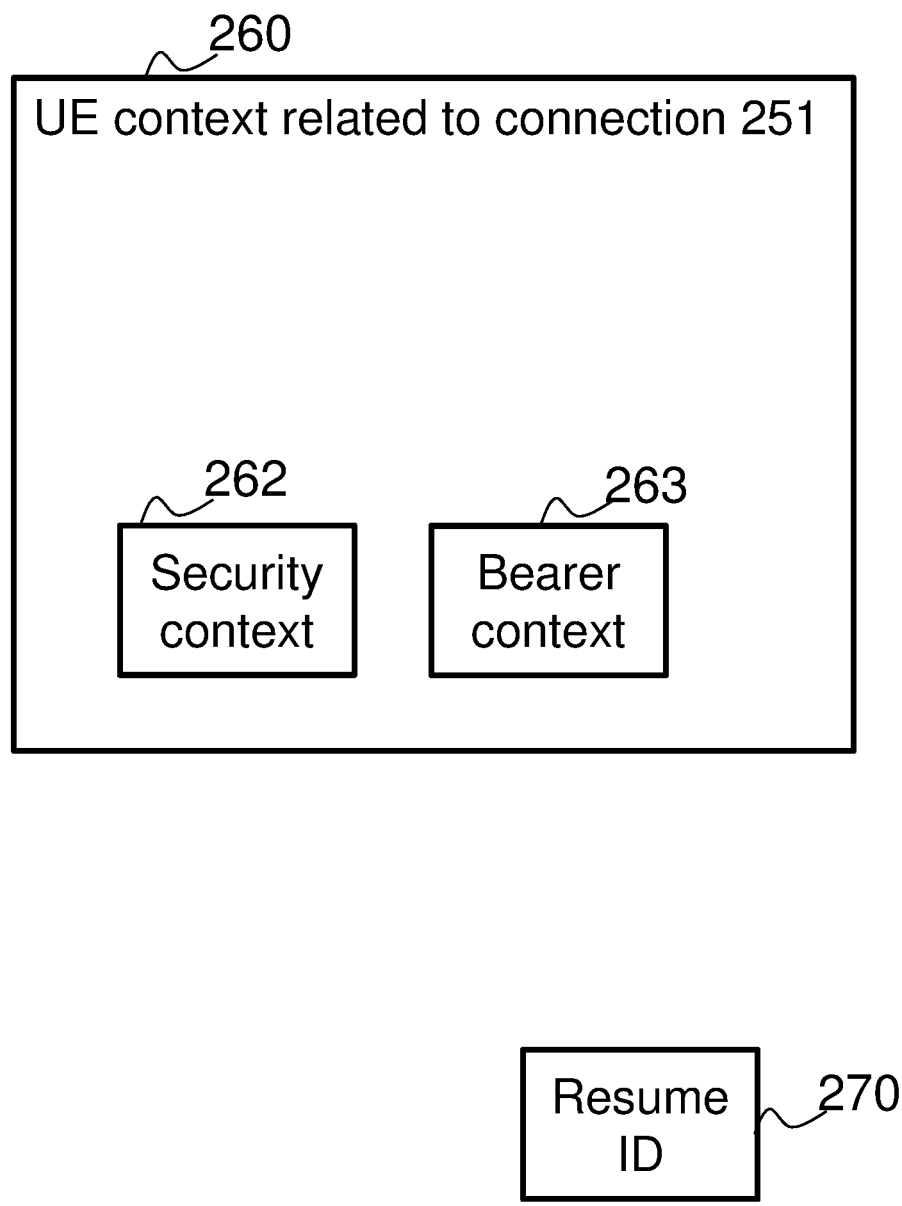
FIG. 2c is a schematic block diagram illustrating data related to a connection and an identifier of a wireless device used for handling the connection.

The connection 251 may be described by data 260 related to the connection 251. The data 260 related to the connection 251 is illustrated in FIG. 2*c*. The data 260 related to the connection 251 may be a context, such as a UE context. The UE context is related to the connection 251. As mentioned above, the UE context may comprise data related to the connection 251, such as data 262 related to security, such as keys, sequence number etc, and data 263 related to bearers, such as signaling and data bearers. The connection 251 between the wireless device 240 and the wireless communications network 200 comprises one or more bearers which are "virtual" connections between two endpoints in the wireless communications network 200. For example, in LTE signaling bearers are virtual connections between a UE and an MME, while data bearers are virtual connections between the UE and the SGW.

The wireless device 240 may be an MTC user equipment.

The wireless device 240 may further be e.g. a mobile terminal or a wireless terminal, a mobile phone, a computer such as e.g. a laptop, a Personal Digital Assistants (PDAs) or a tablet computer, sometimes referred to as a surf plate, with wireless capability, target device, device to device UE, MTC UE or UE capable of machine to machine communication, iPAD, mobile terminals, smart phone, Laptop Embedded Equipment (LEE), Laptop Mounted Equipment (LME), USB dongles etc. or any other radio network units capable to communicate over a radio link in a wireless communications network. Please note the term user equipment used in this document also covers other wireless devices such as Machine to machine (M2M) devices, even though they do not have any user.

Embodiments herein provide a more efficient procedure to move the wireless device 240, such as a UE, from a state corresponding to an idle state, e.g. RRC_IDLE state or mode, to a state where data may be transferred to and from the wireless communications network 200. This is achieved by reusing information from the previous session, i.e. from the previous connection.

The procedure is very efficient for wireless devices that make many accesses within the same cell or cell group. In this case, both air interface signaling as well as network internal signaling is reduced.

First, procedures and embodiments for suspending and resuming the connection 251 will be described without using information indicating whether or not resume is possible. These procedures are described below and illustrated with FIGS. 3-14. Then embodiments for suspending and resuming the connection 251 will be described using the information indicating whether or not resume is possible. These embodiments comprising the information indicating whether or not resume is possible will be illustrated with FIGS. 15-24.

Embodiments that can be employed without using information indicating whether or not resume is possible will now be described briefly in general terms to give an overview of embodiments herein.

Instead of releasing an established connection 251 between the wireless device 240 and the wireless communications network 200, the wireless device 240 and the connection 251 are 'suspended' in embodiments herein. Suspended means that any data 260 related to the established connection 251 between the wireless device 240 and the wireless communications network 200, including connection parameters, is saved in the wireless device 240 and in network nodes 211, 212, 213 connected to the wireless device 240, such as an eNodeB, an MME and an SGW.

The data 260 related to the connection 251 may comprise a UE context, for example a UE context related to security, bearers, T-IMSI and UE capabilities. More specifically, the UE context may comprise a security context and a context for the bearer, both related to the previous connection 251.

Further the wireless device 240 and the first network node 211 save the identifier 270 of the wireless device 240 for locating the data 260 related to the connection 251 later.

The wireless device 240 is in other aspects handled as if being in 'Idle mode', but when wanting to establish a connection towards the wireless communications network, the wireless device 240 may continue a previous session, that is 'resume the previous session' of the already established connection. I.e. in embodiments herein the wireless device 240 may be connected to the wireless communications network 200 using the same connection parameters for several sessions of the connection since these connection parameters are saved in the wireless device 240 and in the network nodes 211, 212, 213 during the above suspension of the connection 251.

Further, in embodiments herein, instead of establishing a new connection between the wireless device 240 and the wireless communications network 200 when there is new data to be transferred, the previous connection 251 is resumed, or continued, at a later time using the same security context and bearers.

The previous connection 251 is resumed by using the identifier 270 of the wireless device 240 for locating the data 260 related to the connection 251.

The 'Resume' of the previous connection 251 may be allowed within the cell 221 where the wireless device was 'suspended' or in a cell, e.g. the second cell 222 in which information indicating that resume is possible is broadcasted. Embodiments relating to whether or not it is allowable to resume the connection 251 will, as mentioned above, be described in relation to FIGS. 15-24 below.

Below, methods for suspending and resuming a connection between the wireless device 240 and the wireless communications network 200 will be illustrated in more detail by a number of exemplary embodiments. The following embodiments will be described using LTE as an example and the first network node 211 will be an LTE base station, i.e. an eNB. Further the third network node 212 will be an MME and the fourth network node 213 will be an SGW.

It will be assumed that network data is kept in the eNodeB, the MME and the SGW and that the S1-bearers are kept. Network data may for example be data related to the UE context and to the setup of bearers in the different network nodes. For example, when the first network node 211 is an eNB the network data may comprise MME resource used, SGW S1-U addresses, bearer configuration and Security context information. When the third network node 212 is an MME the network data may comprise UE and subscriber information, e.g. comprising bearer configuration, PDN connection used, SGW resource used and eNB resource used. When the third network node 213 is an SGW the network data may comprise PDN connection used, eNB S1-U addresses and Bearer configuration. Further, the S1 setup remains during the suspension of the connection. The radio bearers are remembered in the UE, eNB and MME and 'restarted' again at resume.

It should be noted that these embodiments are not mutually exclusive. Components from one embodiment may be tacitly assumed to be present in another embodiment and it will be obvious to a person skilled in the art how those components may be used in the other exemplary embodiments.

Figure 3:
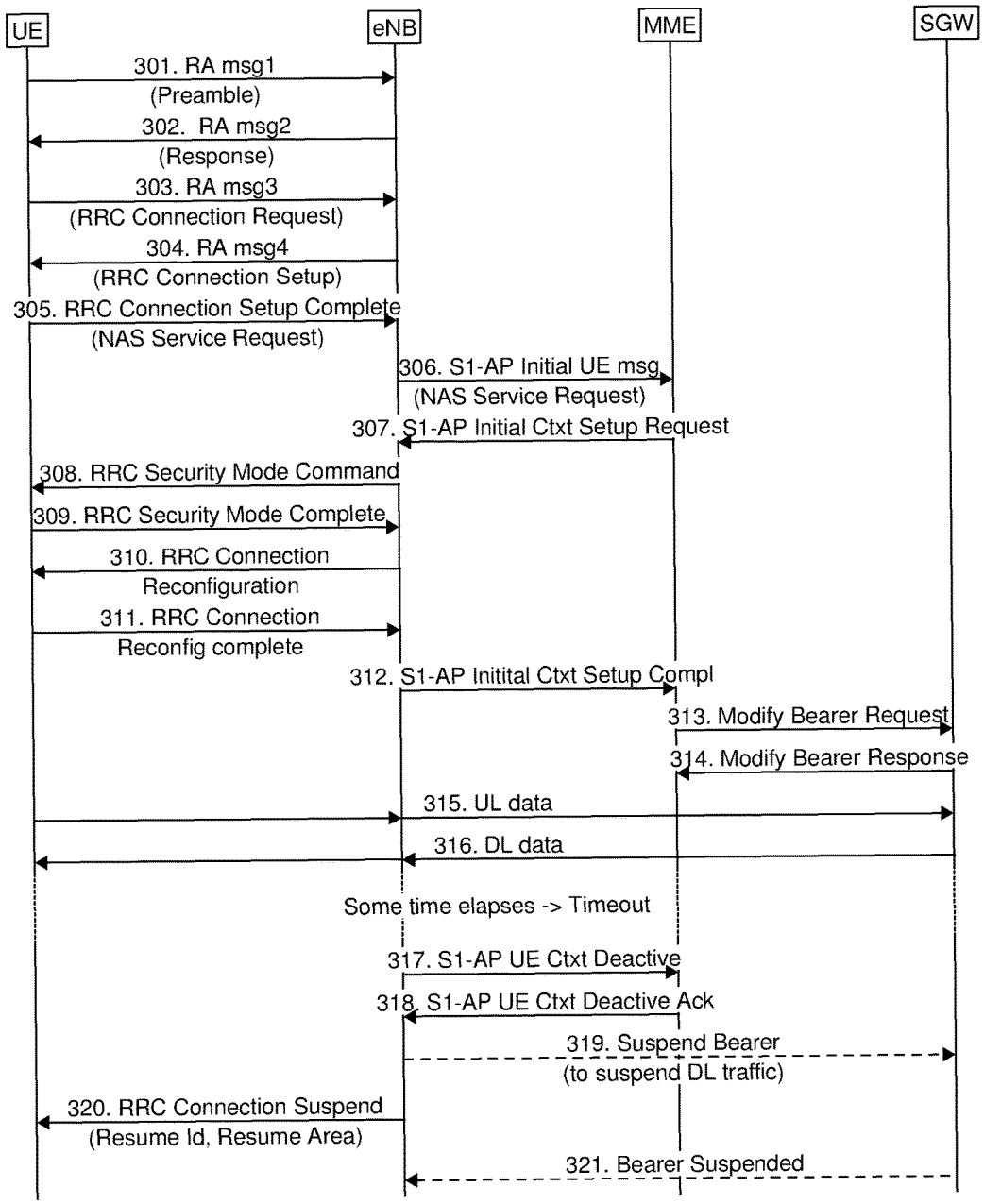
FIG. 3 is a signaling diagram illustrating embodiments of a method performed in a wireless communications network.

Actions for handling the connection 251 between the wireless device 240 and the wireless communications network 200 according to embodiments herein will now be described in more detail in relation to FIG. 3, FIG. 4a, FIG. 4b, FIG. 4c and FIG. 4d. FIG. 3 and FIGS. 4 to 4d show the interaction between the different nodes that take part in embodiments herein.

FIG. 3 is a signaling diagram between the wireless device 240, the first network node 211, the third network node 212 and the fourth network node 213. FIG. 3 describes actions that may take place to resume the connection 251 between the wireless device 240, such as a UE, and the wireless communications network 200 according to embodiments herein. Further, FIG. 3 shows the interactions between the wireless device 240, the first network node 211, the third network node 212 and the fourth network node 213.

More specifically, FIG. 3 describes actions to suspend the connection between the wireless device 240 and the wireless communications network 200.

Figure 4A:
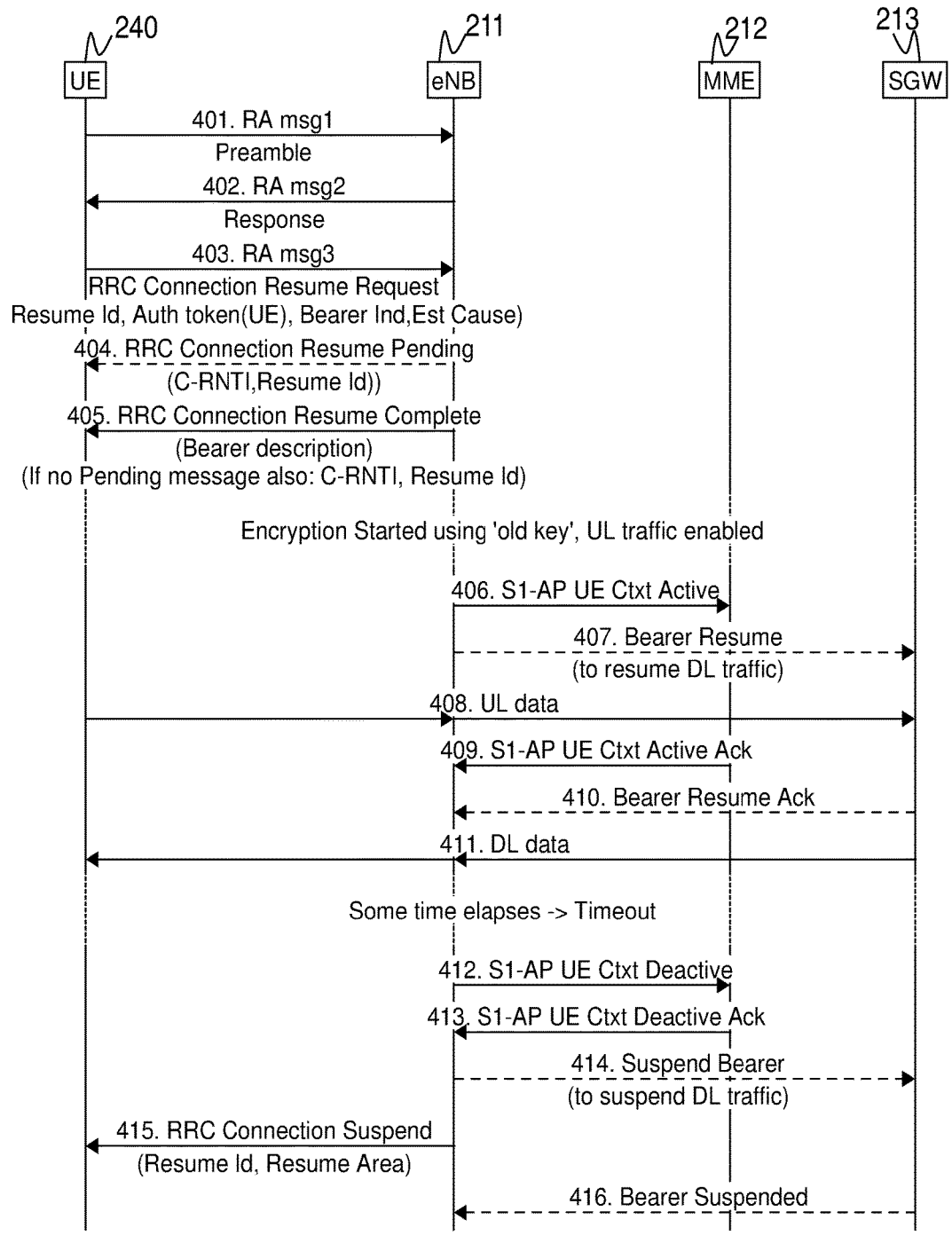
FIG. 4a is a signaling diagram illustrating further embodiments of a method performed in a wireless communications network.
Figure 4B:
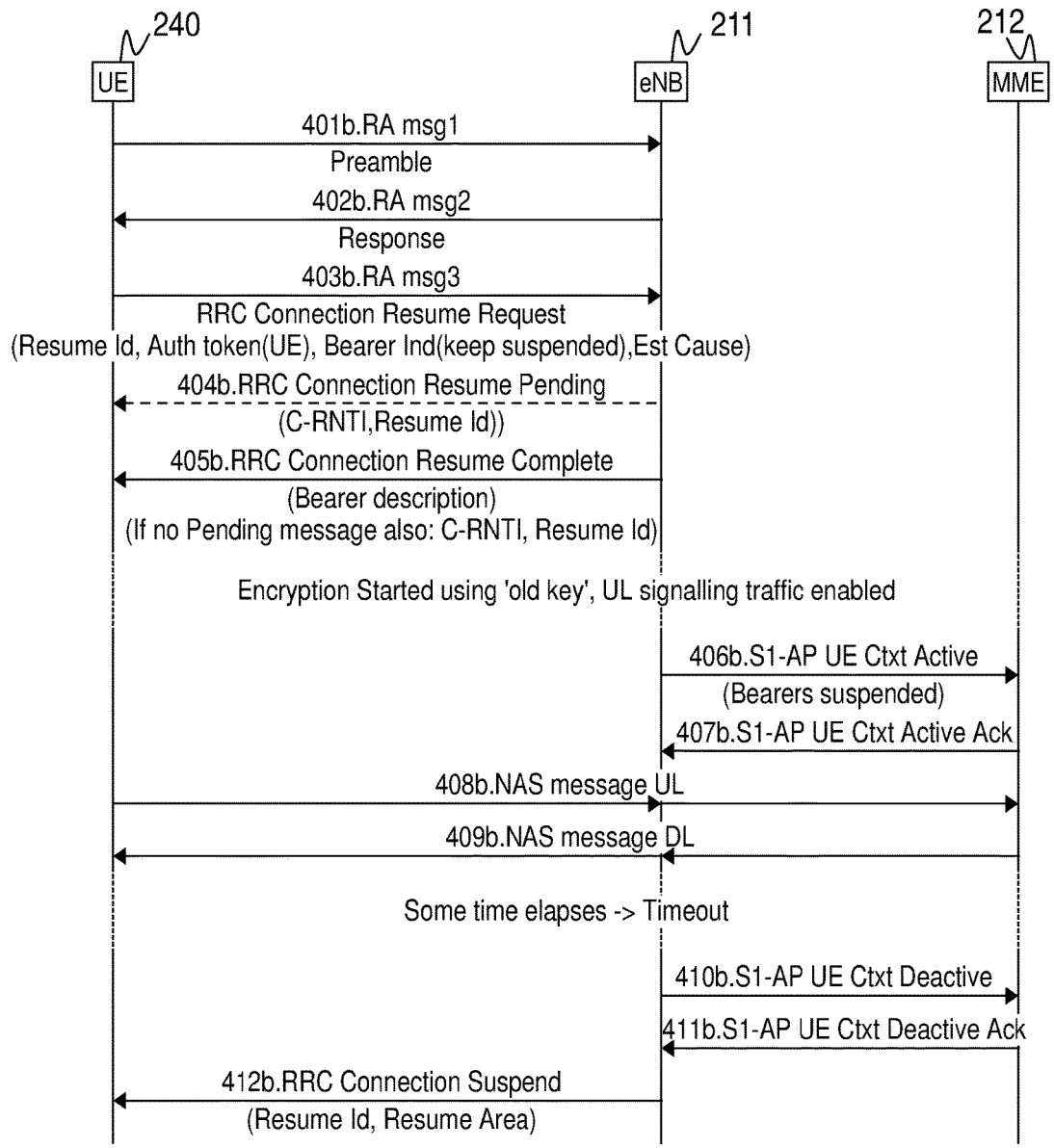
FIG. 4b is a signaling diagram illustrating further embodiments of a method performed in a wireless communications network.
Figure 4C:
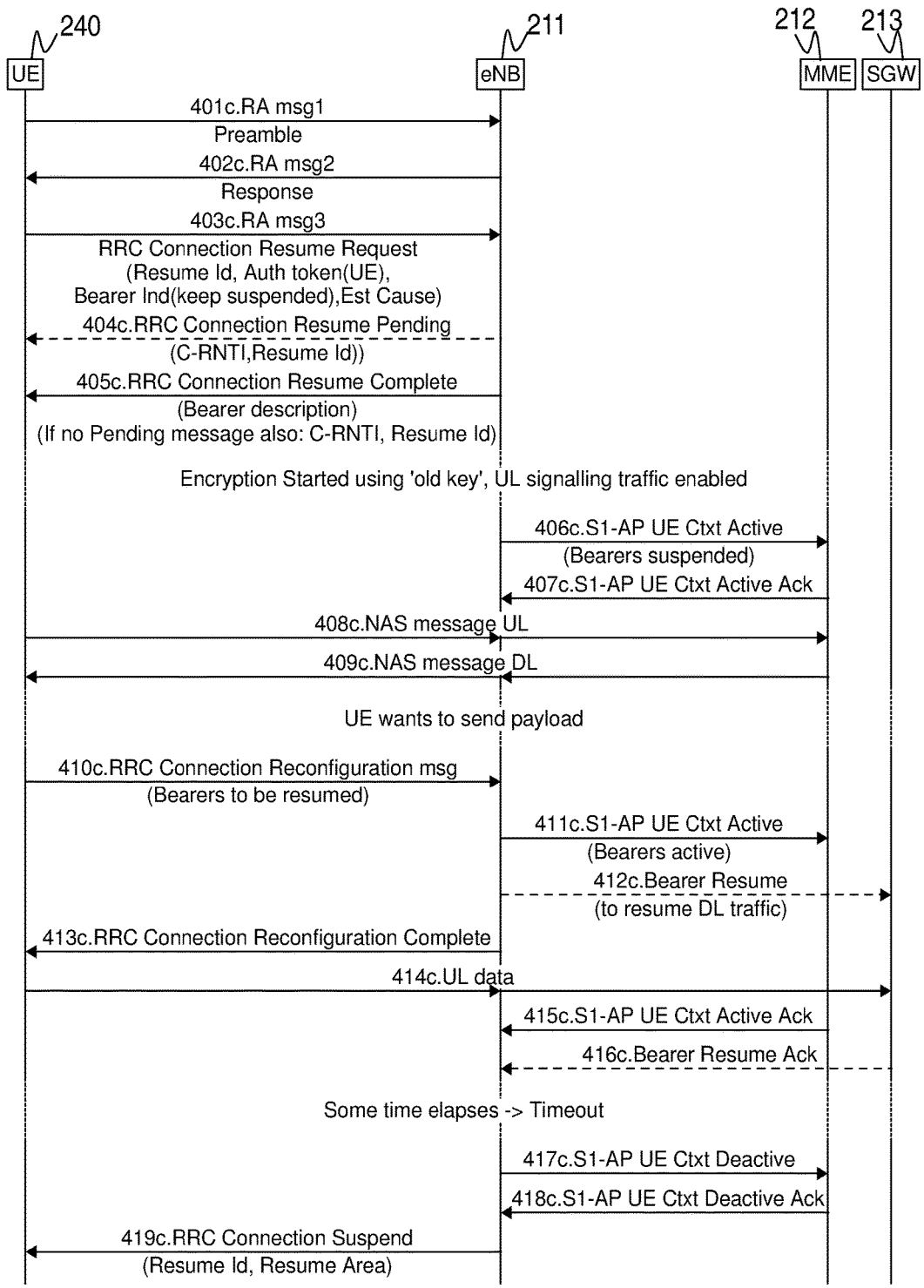
FIG. 4c is a signaling diagram illustrating further embodiments of a method performed in a wireless communications network.
Figure 4D:
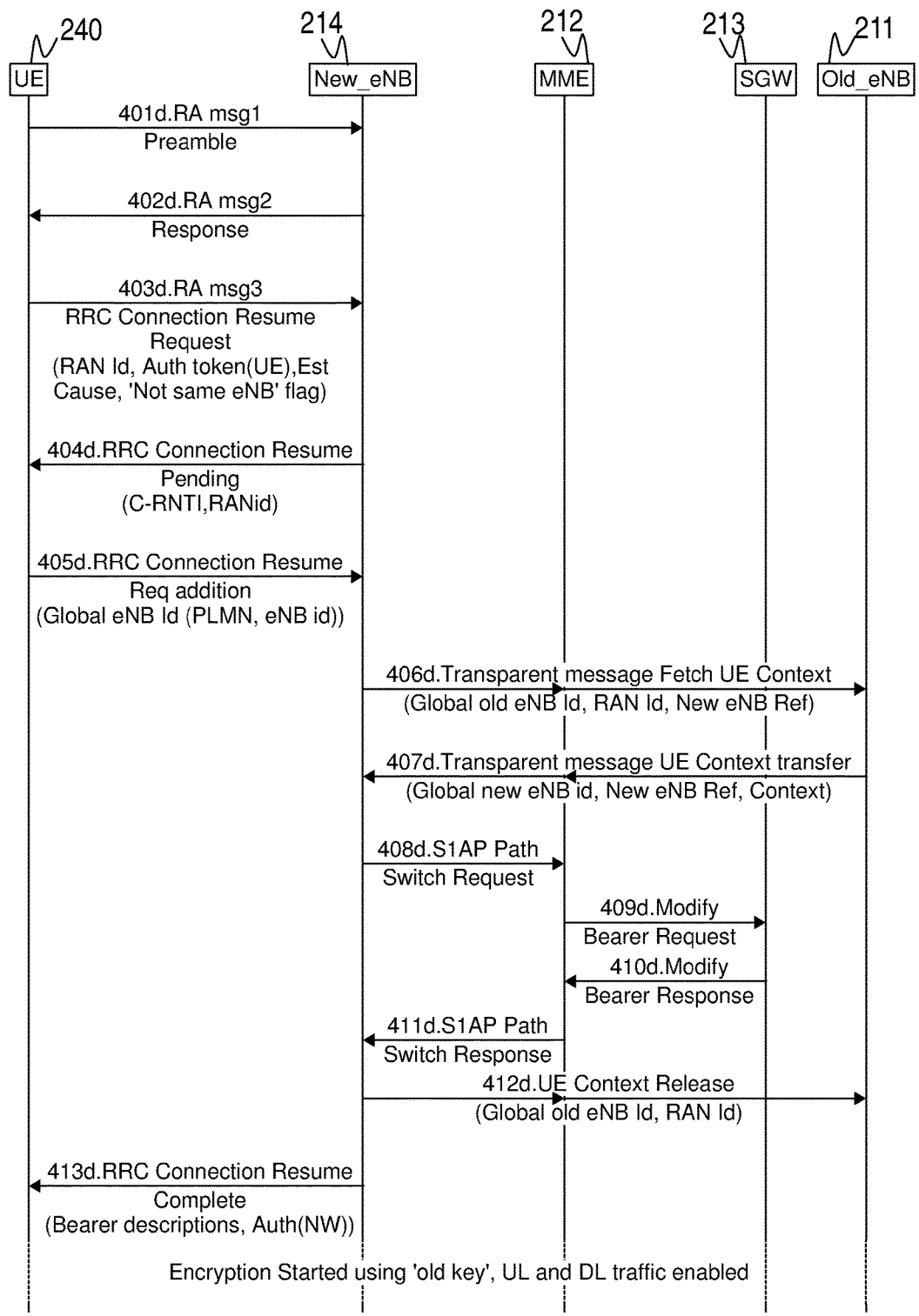
FIG. 4d is a signaling diagram illustrating further embodiments of a method performed in a wireless communications network

FIG. 4a is a further signaling diagram that describes actions 401-410 that may take place to resume the connection 251 between the wireless device 240 and the wireless communications network 200 according to embodiments herein. More specifically, FIG. 4a describes further actions that may be performed to resume the connection 251 between the wireless device 240 and the wireless communications network 200 from its suspended state. FIGS. 4b, 4c and 4d disclose optional details.

First the connection between the wireless device 240 and the wireless communications network 200 is established in a conventional manner as described by actions 301-314 in FIG. 3. UL and DL data is transmitted in action 315 and 316. Thus the wireless device is in a connected mode, e.g. RRC Connected mode, as illustrated with the state/mode 500 in FIG. 5. The data bearers are set up. At some point in time the wireless device 240 has indicated that it supports the 'suspend/resume' handling. The support of suspend/resume may be implemented as a capability together with other UE capabilities. The capability may be sent to the wireless communications network 200 when setting up a connection, such as the connection 251, unless the wireless communications network 200 already has the capability.

After some time there is a timeout related to the connection. The timeout may be a result of a timer in the first network node 211. The timer is related to the connection. However, instead of releasing the connection 251 it is 'suspended', which is described in actions 317 to 321, which will be described in more detail below. The first network node 211 may for example decide to suspend the connection 251 if the wireless device 240 supports suspension.

The concerned core network nodes, such as the third network node 212 and the fourth network node 213 are informed, for example by the first network node 211, that the wireless device 240 is in an 'RRC Suspended state'. The third network node 212 and the SGW may be informed either directly by the first network node 211 or via the other core network node. For example, the SGW may be informed by the third network node 212. In FIG. 3 the third network node 212 is informed about the wireless device 240 being 'suspended', for example with S1-AP UE Ctxt Deactive in action 317. The SGW is signaled with Suspend Bearer in action 319, to stop DL data traffic by the first network node 211.

The third network node 212 may acknowledge the information from the first network node 211 in action 318 and the fourth network node 213 may acknowledge the information from the first network node 211 in action 321.

The wireless device 240 receives 320 a command, e.g. from the first network node 111, to transition into a suspended idle mode. The wireless device 240 will then behave as in 'idle mode', but caches a context related to the last connection, for example data related to security, such as keys, sequence number etc, and data related to bearers, such as signaling and data bearers.

The bearers, such as signaling and data bearers, related to the previous connection are kept, i.e. these bearers are maintained for the time being by the network on behalf of the wireless device 240.

The wireless device 240 is further given a unique identity or identifier 270 of the wireless device 240, e.g. a resume identifier, to use later when the wireless device 240 needs to resume the connection. The identifier 270 of the wireless device 240, such as the resume identifier, is used to locate the data 260 related to the connection 251, such as the UE context, within the first network node 211. The C-RNTI (MAC id) may be used as the identifier 270. The identifier 270, such as the resume identifier, is unique within an area, which comprises one or more cells, such as the cell 221. If the area is more than one cell, the cells may broadcast information to allow the wireless device 240 to decide if resumption is allowed or not in the cells.

Also other information may be broadcasted to allow the wireless device 240 to decide if resumption is allowed in the cells, e.g. after how long time resumption is allowed in the cells, validity of the resume identifier etc.

The wireless device 240 is now in a suspended state. The suspended state corresponds to an idle state in which the wireless device 240 stores the data 260 related to the connection 251 and the identifier 270 of the wireless device 240 for resuming the connection 251 later.

When the wireless device 240 wants to resume its connection 251 for some reason, e.g. due to paging of the wireless device 240, wanting to send data, etc, it takes contact with the network, i.e. with the first network node 211. If the wireless device 240 supports a resumption of the suspended connection 251 it may check whether or not the identifier 270 of the wireless device 240 is valid.

The initial contact may be made by transmitting 401 a first random access message RA msg 1 comprising a preamble. The first network node 211 may respond 402 with a second random access message msg2. Then the wireless device 240 initiates the resumption by transmitting 403a either a new message RA msg3, called RRC Connection Resume Request in embodiments herein, or an updated existing message, e.g. RRC Re-establish Request. The message comprises data which enable the first network node 211 to uniquely identify the previously suspended wireless device 240. Such data may for example be the identifier 270 of the wireless device 240 which is related to the connection.

The RA msg 3 message may also comprise a kind of 'authentication token' to reduce the risk of 'Denial of service' attacks and also fraud.

If the first network node 211 finds that the identifier 270 of the wireless device 240, such as the resume identifier, sent to it from the wireless device 240 in order to resume the connection 251, is known and the data 260 related to the connection 251, e.g. the related UE context, is ok, e.g. the stored UE context has not been deleted or become too old, then the first network node 211 responds to the wireless device 240 with a response message in action 405. The response message may for example be a control message such as RRC Connection Resume Pending or RRC Connection Resume Complete. The response message comprises the identifier 270 of the wireless device 240, such as the resume identifier, to make sure both the wireless device 240 and the first network node 211 communicates about the same connection. This may be needed e.g. for performing contention resolution, and informs the wireless device 240 that the resumption is complete.

The response message may further indicate to the wireless device 240 that the first network node 211 recognises the wireless device 240 on RRC level, enable contention resolution and give the wireless device 240 a unique scheduling identifier, e.g. C-RNTI in LTE.

To allow for different response times for contention resolution—the objective is normally to keep the response time short—and for final completion of the resumption the response message may be split into two messages or kept as one message. That is, as illustrated in FIG. 4a, a first response message, RRC Connection Pending, is sent in action 404 to complete the contention resolution by giving a unique scheduling identifier within a certain short time. Then, afterwards the first network node 111 finally accepts the resumption with the later RRC Connection Complete message in action 405. The first network node 111 may also chose to only send RRC Connection Complete and include all data needed for the contention resolution and the final completion of the resumption of the connection.

When this has been performed the wireless device 240 may be scheduled by the first network node 211 to send uplink data on the resumed bearers. The action of scheduling is not shown in FIG. 4a.

The first network node 211 then informs 406 the third network node 212 that the data 260 related to the connection 251, e.g. the UE context, has become active, that is, paging is not needed anymore. The first network node 211 further informs 407 the fourth network node 213 that DL packets may be sent on the DL data bearers. The actual signaling may be made in many ways. In FIG. 4a the first network node 211 signals the third network node 212 with an S1-AP UE CTxt Active and sends in-band instructions, such as Bearer resume to the fourth network node 213. It is also possible that the third network node 212 informs the fourth network node 213 instead or vice versa.

The wireless device 240 may now send uplink data to the fourth network node 213 in action 408.

The third network node 212 responds with an S1-AP UE Ctxt Active Ack to the first network node 211 in action 409. The fourth network node 213 responds with a Bearer Resume Ack in action 410.

When the fourth network node 213 has been informed that the data 260 related to the connection 251, e.g. the UE context, has become active, it may forward 411 DL data or messages to the first network node 211 to be transferred to the wireless device 240.

The wireless device 240 is now fully resumed and in the same state in all nodes as if a normal service establishment had been done.

When a network node decides that the wireless device 240 shall not be kept in RRC_CONNECTED anymore, this may be either initiated by the first network node 211 or initiated by the third network node 212.

FIG. 4a illustrates the case where it is the first network node 211 that initiates to stop the connected mode. The first network node 211 then sends 412 a request to the third network node 212 to deactivate the data 260 related to the connection 251, e.g. the UE context. In other words, the first network node 211 requests that the third network node 212 pages the wireless device 240 in case of downlink signaling or data is to be sent to the wireless device 240. The third network node 212 answers 413 if this was accepted, e.g. if the third network node 212 supports suspended mode functionality and suspended mode is allowed to use. In the case of acceptance, the first network node 211 will inform 414 the fourth network node 213 to suspend DL packet transfer on DL data bearers and to inform the third network node 212 to page the wireless device 240 in case of a downlink control message or a payload, i.e. data traffic, is to be transferred to the wireless device 240. The first network node 211 will also command 415 the wireless device 240 to transition into suspended idle mode. The command comprises the identifier 270 of the wireless device 240, e.g. a resume id, to be used at a possible later resumption of the connection.

In the case that it is the third network node 212 that initiates to stop the connected mode, the third network node 212 may send a UE Context Release Command to the first network node 211. The command may comprise an optional indication that the connection 251 may be suspended as an alternative to released. If the first network node 211 decides to suspend the connection instead of releasing the connection, it should indicate this in a response message to the third network node 212. The first network node 211 will then continue to indicate to the fourth network node 213 to suspend DL packet transfer on DL bearers. The first network node 211 will also indicate to the third network node 212 to page the wireless device 240. The first network node 211 will also command the wireless device 240 to be suspended, i.e. transition into suspended idle mode. The command comprises the identifier 270 of the wireless device 240, e.g. the resume identifier, to be used at a possible later resumption.

If a DL packet is sent from the fourth network node 213 to the first network node 211 on a bearer that the first network node 211 considers suspended, the first network node 211 may send back an error message indicating this. This mechanism will make it possible to not send an acknowledgement on the suspend message from the first network node 211 to the fourth network node 213 in action 321, 416. That is, the acknowledgement of the Suspend Bearer message, i.e. the Bearer Suspended message, in FIG. 3 and FIG. 4a may in that case be removed.

Also the acknowledge message in action 410 for the Bearer Resume message in action 407 from the first network node 211 to the fourth network node 213 may be omitted if the first network node 211 repeatedly re-sends the 'Bearer Resume' message until a DL message has been detected.

FIG. 4b describes how the data bearers may be kept suspended also after resumption of the connection 251. In this case, the data bearers may be kept suspended in the core network, i.e. in the second and third network nodes 212, 213. The data bearers are still known to the wireless device 240, the first network node 211 and to the core network nodes, i.e. the third network node 212 and the fourth network node 213, but may not be used. Only default signaling bearers may be used.

Initially, FIG. 4b corresponds to FIG. 4a, i.e. actions 401b to 406b correspond to actions 401a to 406a. Action 407c corresponds to action 409a. However, the RA msg 3 message in action 403b may also comprise an indication if the data bearers from the previous connection 251 shall be used or not. Correspondingly, the S1-AP UE Ctxt Active message in action 406b comprises an indication to the third network node 212 that the bearers for the connection 251 shall be kept suspended.

This allows further advantages for 'signaling only traffic', e.g. Non-Access Stratum (NAS) traffic as exemplified in actions 408b NAS message UL and 409b NAS message DL. That is, if only control signaling is needed, e.g. network internal signaling or SMS, then no data bearers are needed.

The connection 251 may be suspended again after the NAS traffic has ended as exemplified with actions 410b-412b which correspond to actions 412a, 413a and 415a.

The advantages of keeping the data bearers suspended may for example be less processing in the fourth network node 213 and the first network node 211. Actions corresponding to actions 407a and 410a in FIG. 4a are not performed in FIG. 4c.

If the wireless device 240 or the core network nodes 212, 213 want to send data, the data bearers may be 'resumed' from the first network node 211 afterwards as described in FIG. 4c. That is, the bearers may be resumed after the connection 251 has been resumed with suspended bearers as described in FIG. 4b. Actions 401c to 409c correspond to actions 401b to 409b.

Towards the wireless device 240 either a new or existing message, such as an updated RRC Re-configuration Request in action 410c, may be reused for later resumption of the data bearers. That is, the wireless device 240 may request the bearers related to the connection 251 to be resumed by sending the updated RRC Re-configuration Request in action 410c to the first network node 211. The first network node 211 then sends an S1-AP UE Ctxt Active message to the third network node 212 in action 411c. The S1-AP UE Ctxt Active message indicates that the bearers shall be active. The first network node 211 sends an RRC Connection Reconfiguration Complete message to the wireless device 240 in action 413c. The wireless device 240 may now send uplink data to the fourth network node 213 in action 414c.

Further, the third network node 212 responds to the first network node 211 with a S1-AP UE Ctxt Active Ack message in action 415c, as was also the case for action 409 and action 407b.

Towards the fourth network node 213 the same signaling as used for the initial resumption of the connection 251 may be used for this later resumption of the data bearers, i.e. action 412c corresponds to action 407 Bearer resume while action 416c corresponds to action 410 Bearer Resume Ack.

Actions 417c-419c suspends the connection 251 again and these actions correspond to actions 410b-412b in FIG. 4b and actions 412-413 and 415 in FIG. 4a.

When the wireless device 240 is paged, the normal case is to always resume the data bearers. An alternative to this is if the third network node 212 indicates in a paging message if data bearers are needed to be resumed or not. The wireless device 240 may then indicate the need for data bearers to be resumed or not in the following RRC Connection Resume Request.

The first network node 211 may provide additional information to the wireless device 240 in its cells, such as the cell 221. The first network node 211 may indicate if resume is allowed in the cell 221. The first network node 211 may indicate which 'Resume Area' the cell 221 belongs to.

The third network node 212 may provide the first network node 211 with information if 'suspend is allowed' during the service establishment and handover if third network node 212 is changed.

It may also be possible to forward the information related to the connection 251 and stored in one network node between the nodes, e.g. over X2 or S1 interfaces to support the resume procedure over a larger geographical area. For example, the wireless device 240 may be suspended by the first network node 211 which stores the data 260 related to the connection 251. Then the wireless device 240 may resume the connection 251 in a cell served by another network node, e.g. in the second cell 224 served by the fourth network node 214. The first network node 211 may e.g. forward the data 260 related to the connection 251 to the fourth network node 214.

In some embodiments the data 260 is stored in the third network node 212 or found via the third network node 212. In order for the wireless device 240 to be able to initiate locating of the data 260 which is stored in the third network node 212 or in the fourth network node 214 the data 260 may comprise information about the identity of the third network node 212. For example, the wireless device 240 may store information about the identity of which MME to contact.

FIG. 4d describes some optional actions that may be performed in case the wireless device 240 is suspended by one network node and resumed by another network node. Actions 401d-405d are similar to actions 401-405.

In action 406d the fourth network node 214 signals the third network node 212 to obtain the data 260. If the data 260 is obtained from another network node, such as the first network node 211, a path switch is made.

The fourth network node 214 sends 408d a path switch to the third network node 212 which will signal 409 the fourth network node 213 to change user plane address, e.g. eNB user plane address, from the first network node 211 to the fourth network node 214. Then these signals are returned back in action 410d and action 411d. I.e. the fourth network node 213 responds to the third network node 212 in action 410d and the third network node 212 responds to the fourth network node 214 in action 411d. The first network node 211 releases the data 260, e.g. after receiving 412d a UE Context Release message from the fourth network node 214. Then the fourth network node 214 sends 413d resume complete to the wireless device 240.

In FIG. 4d the data 260 is fetched in another network node via the third network node 212. However, the data 260 may also be obtained directly from the other network node.

There is no need for extra mobility signaling for the wireless device 240, such as a UE, in suspended idle mode. One or a combination of the following mechanisms may be used to delete the data 260 related to the connection 251, e.g. the UE context, and related resources in the network nodes, such as the first network node 211, the third network node 212 and the fourth network node 213. An example of related resources are the reserved SGW resources.

If the wireless device 240 makes a service request and the third network node 212 detects that this wireless device 240 is 'suspended', the third network node 212 may inform both the first network node 211 and the fourth network node 213 to release its resources and contexts related to the suspended data 260 related to the connection 251, e.g. the suspended UE context.

If the third network node 212, the first network node 211 or the fourth network node 213 have deleted, wants to or needs to delete a stored data 260 related to the connection 251, such as the UE context, then it informs the other network nodes. This may also be done indirectly, e.g. the first network node 211 may only inform the third network node 212 since according to normal legacy logic the third network node 212 releases the fourth network node 213 resources.

A trigger for such actions may be:

Resource shortage such as memory, identifiers etc;

Timing, that is the data 260 related to the connection 251, such as the UE context, is only kept in idle mode for a certain maximum time;

Maintenance actions, for example restarts or manual intervention.

Embodiments of a method for handling the connection 251 will now be described from the viewpoint of the different nodes that participate in embodiments herein. The embodiments will be described in relation to FIG. 5, FIG. 6, FIG. 7, FIG. 8, FIG. 9, FIG. 9a, FIG. 10 and FIG. 10a. That is, the followings are embodiments related to the first network node 211, the third network node 212, the fourth network node 213 and the wireless device 240.

Embodiments will first be described from the viewpoint of the first network node 211. The first network node 211 embodiments relate to FIGS. 5, 6 and 7.

Figure 5:
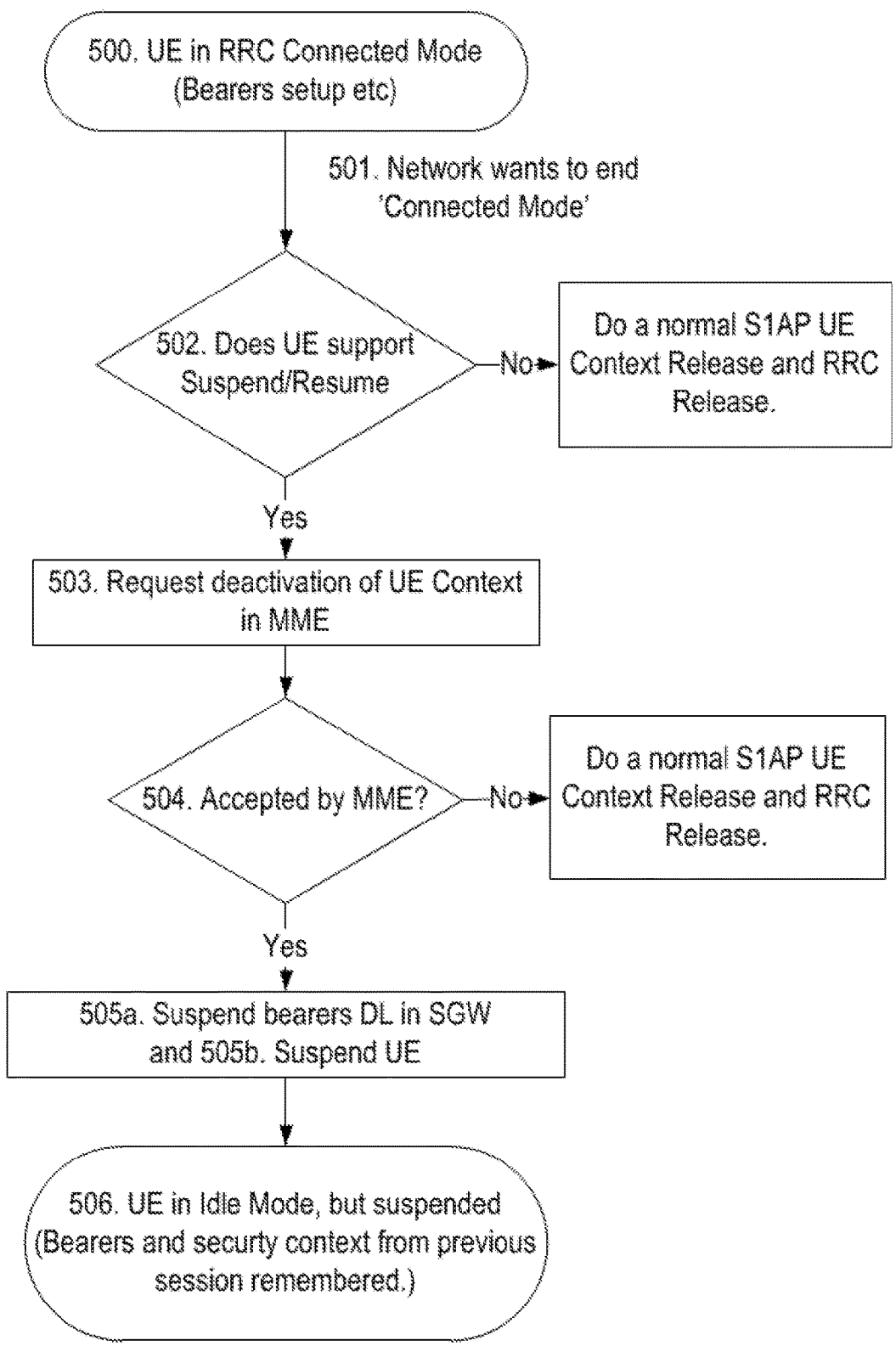
FIG. 5 is a flowchart illustrating embodiments of a method performed by a first network node.
Figure 6:
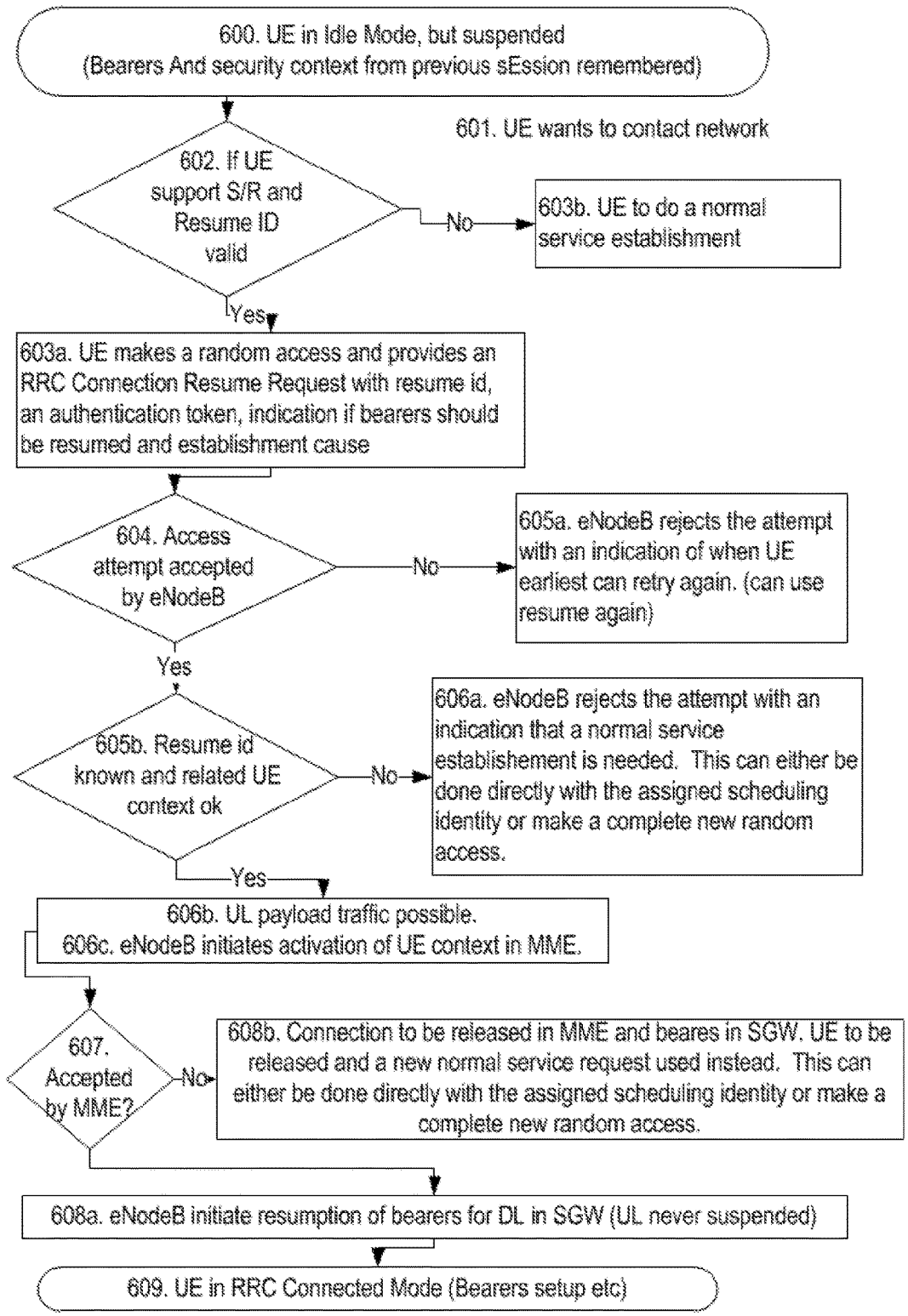
FIG. 6 is a flowchart illustrating embodiments of a method performed in a wireless communications network.

FIGS. 5 and 6 are flow charts that complement FIGS. 3 and 4a-4d and that describe actions that may take place to resume the connection 251 between the wireless device 240 and the wireless communications network 200 according to embodiments herein. More specifically, FIG. 5 complements FIG. 3 and describes actions to suspend the connection 251 between the wireless device 240 and the wireless communications network 200, while FIG. 6 complements FIG. 4a and describes actions to resume the connection 251 from the suspended state.

FIG. 5 further outlines how the wireless device 240 in 'connected mode' is moved to 'idle mode', while keeping the data 260 related the connection 251, e.g. the UE context, in the wireless device 240 and in the network nodes so that the previous connection 251 may be 'resumed' later. In other words, so that it is possible to continue with the same connection data, e.g. security context, keys, bearer setup etc.

Actions 501, 502, 503, 504, 505a and 505b related to FIG. 5 are performed by the first network node 211. FIG. 5 also describes two modes or states of operation of the wireless device 240. These states are referred to as state 500, in which the wireless device 240 is in RRC Connected Mode, and state 506 in which the wireless device 240 is in a suspended mode, also referred to in FIG. 5 as in Idle Mode, but suspended.

FIG. 6 outlines how the previously suspended wireless device 240, may resume the previous connection 251. Parts of the method are performed by the wireless device 240 while other parts are performed by the first network node 211. Actions 601-603 are performed by the first network node 211. Actions 603a-608b are performed by the first network node 211.

FIG. 6 also describes two modes or states of operation of the wireless device 240. These states are referred to as state 600, in which the wireless device 240 is in a suspended mode, also referred to in FIG. 6 as in Idle Mode, but suspended. In state 609 the wireless device 240 has re-entered in RRC Connected Mode.

Figure 7:
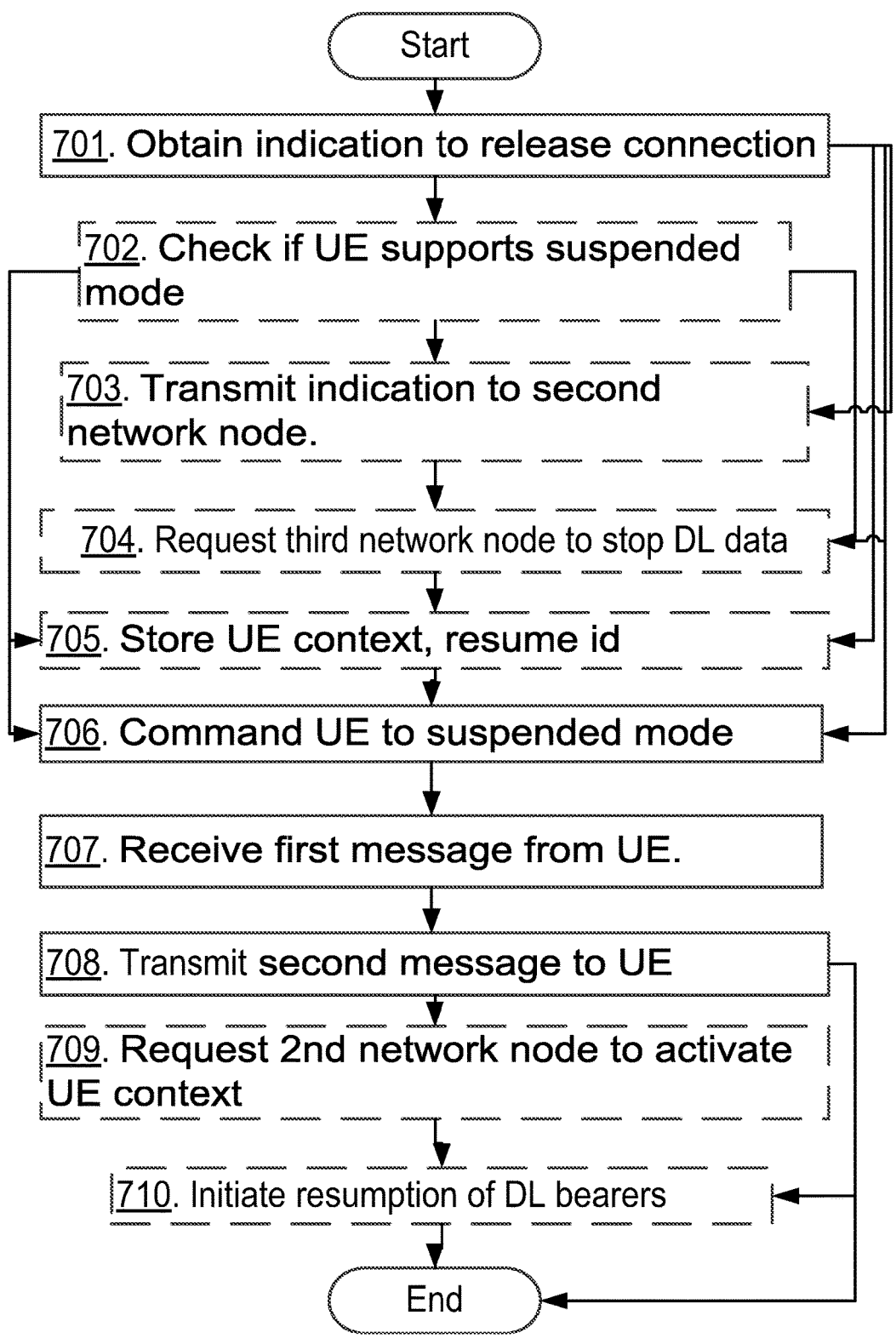
FIG. 7 is a flowchart illustrating embodiments of a method performed by a first network node.

FIG. 7 is a flowchart that describes actions of a method for suspending and resuming the connection 251 according to embodiments herein. Actions 701-710 are related to FIGS. 5 and 6 and are performed by the first network node 211. FIGS. 5, 6 and 7 complement each other. In the following description of FIG. 7, reference will also be made to FIG. 11 which illustrates an example of how the first network node 211 may be configured for implementing this procedure.

Actions 501, 701

The first network node 211 may obtain an indication that the connection 251 between the wireless device 240 and the wireless communications network 200 has not been used to transfer data for a while, e.g. that the wireless device 240 has been inactive for a while. In other words the obtained indication is or may be interpreted as an indication that the connection 251 between the wireless device 240 and the wireless communications network 200 is to be suspended or released. The indication may be provided as a timeout of the connection 251 between the wireless device 240 and the wireless communications network 200. The time out may be provided by a timer module 1110 in the first network node 211. The timer module 1110 may be implemented by a processor 1180 in the first network node 211.

Actions 502, 702

As a result of the obtained indication that the connection 251 between the wireless device 240 and the wireless communications network 200 is to be suspended or released the first network node may determine whether or not to suspend or release the connection 251.

In some embodiments the first network node 211 checks that the wireless device 240 supports resumption of the connection 251 before it tries to suspend the connection 251.

This action may be performed by means such as a checking module 1120 in the first network node 211. The checking module 1120 may be implemented by the processor 1180 in the first network node 211.

Actions 503, 703

Other network nodes, e.g. core network nodes such as the third network node 212 and the fourth network node 213 may need to be informed about the suspension. For example, the network may not send downlink data to the wireless device 240 during the suspension of the connection 251 without paging the wireless device 240 first.

In some embodiments the first network node 211 transmits an indication to the third network node 212, which is responsible for paging of the wireless device 240, that the connection 251 between the wireless device 240 and wireless communications network 200 is to be released.

The message to the third network node 212 may comprise a request to deactivate the data 260 related to the connection 251, e.g. the UE context, in the third network node 212. The request to deactivate the data 260 related to the connection 251 may further comprises an indication that the third network node 212 shall page the wireless device 240 in case of a downlink control message or a payload is to be transferred to the wireless device 240. The message to the third network node 212 may further comprise a request to store the UE context, the identifier 270 of the wireless device 240, e.g. the resume identifier of the wireless device 240 and a description of the bearer.

In some embodiments the identifier 270 of the wireless device 240 is optionally included in the message to the third network node 212 in order to find the data 260 related to the connection 251 in case of larger resume area.

The request may be accepted or acknowledged or it may be rejected by the third network node 212. This action may be performed by means such as a transmitting module 1130 in the network node 211. The transmitting module 1130 may be implemented by a transmitter in the first network node 211.

This action is related to action 901 below.

Action 504

The first network node 211 may check whether the third network node 212 accepted the request in actions 503, 703.

Actions 505a, 704

If the third network node 212 accepted the request in actions 503, 703 then the first network node 211 may request the fourth network node 213 to stop DL data traffic to the wireless device 240, since the wireless device 240 is unable to receive DL data without being paged first during the suspension.

This action may be performed by means such as a requesting module 1140 in the first network node 211. The requesting module 1140 may be implemented by the processor 1180 in the first network node 211.

These actions are related to actions 1000 and 1001 below.

Action 705

In order for the first network node 211 to be able to resume the connection 251 later the first network node 211 stores data 260 related to the connection 251, and further stores the identifier 270 of the wireless device 240 for locating the stored data 260 related to the connection 251 later.

The data 260 related to the connection 251 may be a UE context related to the connection 251 and the wireless device 240.

In other words the first network node 211 stores the UE context and the resume identifier of the wireless device 240 and related to the last connection 251.

This action may be performed by means such as a memory 1190 in the first network node 211.

Actions 505*b*, 706

The first network node 211 provides the wireless device 240 with a command to transition from a connected mode into a suspended mode. In the suspended mode the connection 251 is suspended and the wireless device 240 stores the data 260 related to the connection 251. The wireless device 240 further stores the identifier 270 of the wireless device 240 for locating the data 260 related to the connection 251 later.

In other words, the command to transition from the connected mode into the suspended mode further comprises a command to suspended the connection 251 and to store the data 260 related to the connection 251, and to store the identifier 270 of the wireless device 240 for locating the stored data 260 related to the connection 251 later.

This action may be performed when the first network node 211 has obtained an indication that the connection 251 between the wireless device 240 and the wireless communications network 200 is to be suspended or released. In some embodiments this action is performed if the request to deactivate the UE context has been accepted by the third network node 212.

These actions may be performed by means such as a commanding module 1150 in the first network node 211. The commanding module 1150 may be implemented by the processor 1180 in the first network node 211.

These actions are related to action 801 below.

Actions 603*a*, 707

The first network node 211 receives a message from the wireless device 240. The received message indicates a request from the wireless device 240 to resume the connection. In other words, the received message indicates that the wireless device 240 wants to establish a new connection 251.

The received message comprises the identifier 270, such as the resume identifier, of the wireless device 240 for locating the stored data 260. The identifier 270 enables the first network node 211 to locate the data 260 related to the connection.

Thus in some embodiments as part of the receiving action the first network node 211 locates the stored data 260 related to the connection based on the received identifier 270 of the wireless device 240.

In some embodiments the received message from the wireless device 240 comprises an indication of whether or not to resume data bearers. This was explained above in relation to FIGS. 4-4*c*. If the data bearers are not resumed at once the first network node 211 and the fourth network node 213 will perform less processing related to the connection 251 which will enhance the performance of these nodes and of the wireless communications network 200.

The received message may be received with RRC signaling.

This action may be performed by means such as a receiving module 1160 in the first network node 211. The receiving module 1160 may be implemented by a receiver in the first network node 211.

These actions are related to action 803 below.

Action 604

The first network node 211 may check whether or not it shall accept the access attempt by the wireless device 240.

Action 605*a*

If the first network node 211 rejects the random access attempt from the wireless device 240 it may reject the attempt with an indication of when the wireless device 240 earliest may retry to access the network again. The wireless device 240 may try to resume the connection 251 again.

Action 605*b*

If the first network node 211 accepts the random access attempt from the wireless device 240 it may further check whether or not the identifier 270 of the wireless device 240 is known and/or valid.

If the identifier 270 is valid then the first network node 211 may check whether or not the related data 260 related to the connection 251 is ok. For example, the 'authentication token' provided by the wireless device 240 may be used to validate that it is the correct wireless device that is trying to resume the connection 251. The authentication token may be a value derived from a secret key, e.g. by an algorithm, known by the wireless device 240 and by the wireless communications network 200. This is especially important if the connection 251 was unencrypted.

Action 606*a*

If the identifier 270 of the wireless device 240 or the data 260 related to the connection 251 are not valid any more, then the first network node 211 may reject the attempt with an indication that a normal service establishment is needed. This may either be done directly with the assigned scheduling identity or the wireless device 240 may need to make a complete new random access.

Actions 606*b*, 708

The first network node 211 resumes the connection 251 by transmitting a message to the wireless device 240 in response to the message received in action 707 above. The transmitted message comprises the identifier 270 of the wireless device 240, and further comprises an indication that a resumption of the connection 251 is complete. The suspended connection 251 between the wireless device 240 and the wireless communications network 200 is resumed using the data 260 related to the suspended connection 251. UL payload traffic is now possible.

In other words, the first network node 211 transmits a control message to the wireless device 240 in response to the received message from the wireless device 240. The control message comprises the resume identifier of the wireless device 240 and an indication that a resumption of the connection 251 is complete, whereby the connection 251 between the wireless device 240 and the wireless communications network 200 is resumed using the UE context.

The control message may further comprise a description of the bearer related to the connection 251. The bearer may be any one or more out of a signaling bearer and a data bearer. This action may be performed by the transmitting module 1130 in the first network node 211.

The transmitted message may be transmitted with RRC signaling.

These actions are related to action 804 below.

Action 606*c*, 709

The first network node 211 may request the third network node 212 to activate the data 260 related to the connection 251, such as the UE context. In this way the first network node 211 may initiate activation of the data 260 related to the connection 251 in the third network node 212.

The request may be seen as an indication that the wireless device 240 wants to resume or has resumed the connection 251 again.

This action may be performed by the requesting module 1140 in the first network node 211.

These actions are related to action 904 below.

Action 607

In some embodiments the first network node 211 checks whether or not the third network node 212 accepts the request to activate the data 260 related to the connection 251.

Actions 608a, 710

If the third network node 212 accepts the request to activate the UE context the first network node 211 may initiate resumption of bearers for DL in the fourth network node 213. In other words, the first network node 211 may transmit an indication that the wireless device 240 wants to establish or has established the connection again. For example, if the RRC Resume complete is sent to the wireless device 240 before the third network node 212 answers, then the indication indicates that the connection has been established. If the first network node 211 waits for the third network node 212 to answer, then the indication indicates that the wireless device 240 wants to establish the connection.

If the third network node 212 does not accept the request to activate the UE context the connection 251 is to be released in the third network node 212 and bearers are to be released in the fourth network node 213. Further, the wireless device 240 is to be released and a new normal service request is to be used instead. This may either be done directly with the assigned scheduling identity or the wireless device 240 may need to make a complete new random access.

This action may be performed by means such as an initiating module 1170 in the network node 211. The initiating module 1170 may be implemented by the processor 1180 in the first network node 211.

These actions are related to action 1003 below.

Action 608b

If the third network node 212 rejects the request to activate the UE context the connection is to be released in the third network node 212 and bearers are to be released in the fourth network node 213. The wireless device 240 is to be released and a new normal service request used instead. This may either be done directly with the assigned scheduling identity or the wireless device 240 may make a completely new random access.

Embodiments will now be described from the viewpoint of the wireless device 240. The embodiments related to the wireless device 240 relate to FIGS. 6 and 8.

FIG. 6 was described above and is a flowchart that describes actions of a method for suspending the connection 251 according to embodiments herein. Actions 601, 602 and 603b are performed by the wireless device 240.

Figure 8:
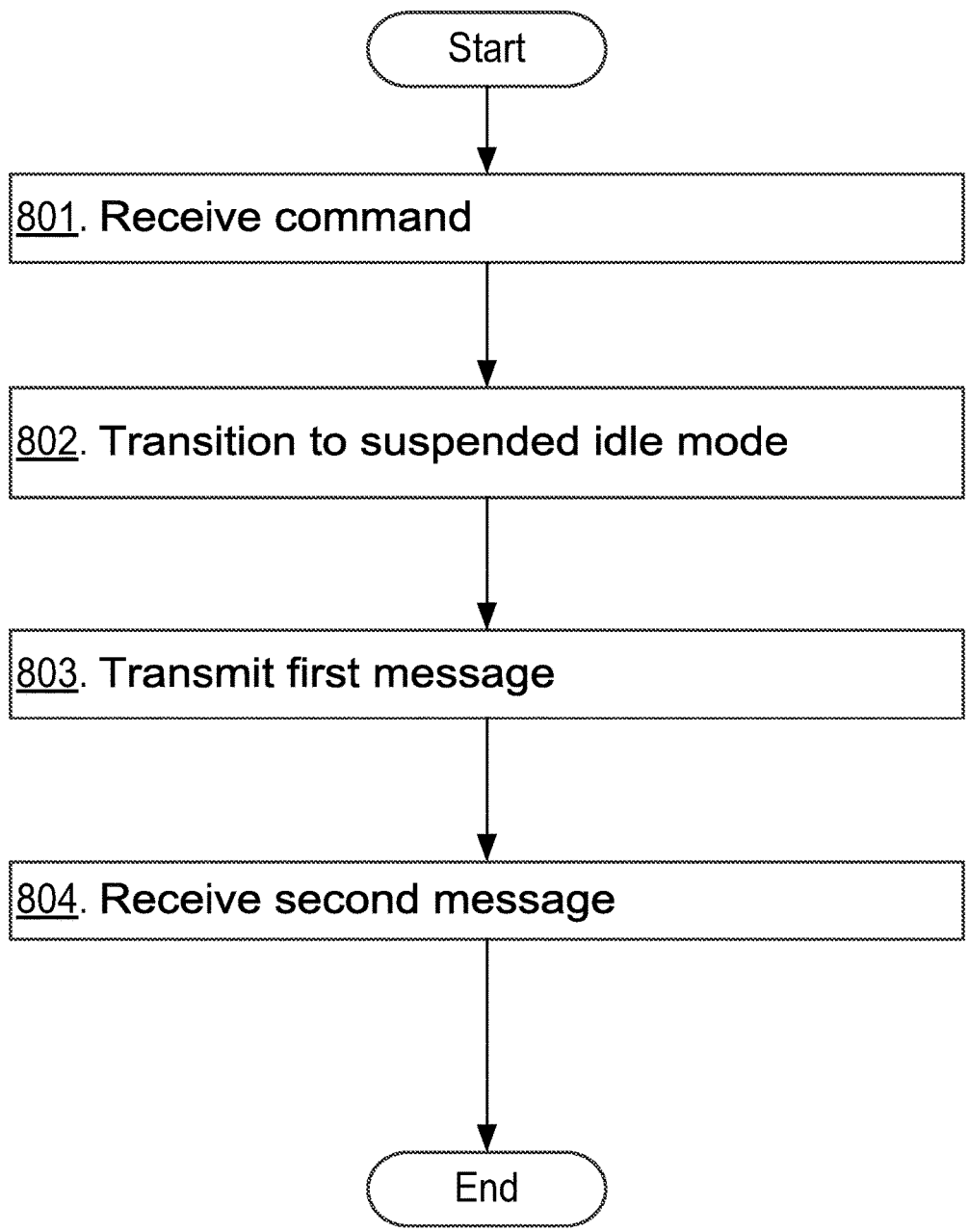
FIG. 8 is a flowchart illustrating embodiments of a method performed by a wireless device.

FIG. 8 is a flowchart that describes actions of a method for suspending and resuming the connection 251 according to embodiments herein. Actions 801-804 are related to FIG. 8 and are performed by the wireless device 240. FIGS. 6 and 8 complement each other. In the following description of FIG. 8, reference will also be made to FIG. 12 which illustrates an example of how the wireless device 240 may be configured for implementing this procedure.

Action 801

The wireless device 240 receives from the first network node 211 the command to transition from the connected mode into the suspended mode.

In other words, the wireless device receives the command from the first network node 211 to transition into the suspended idle mode, in which suspended idle mode the wireless device 240 has stored the UE context related to the connection 251, and the resume identifier of the wireless device 240 for resuming the connection 251 later.

This action may be performed when the first network node 211 has obtained an indication that the connection 251 between the wireless device 240 and the wireless communications network 200 is to be suspended or released. In some embodiments this action is performed if the request to deactivate the UE context has been accepted by the third network node 212.

The received command may further comprise a command to store a resume area. The resume area indicates in which area, i.e. in which cells, that the resumption is valid.

This action may be performed by means such as a receiving module 1210 in the wireless device 240. The receiving module 1210 may be implemented by a receiver in the wireless device 240.

This action is related to actions 504 and 706 above.

Action 802

The wireless device 240 transitions into the suspended mode, in which suspended mode the connection 251 is suspended and the wireless device 240 stores data 260 related to the connection, and further stores an identifier 270 of the wireless device 240 for locating the stored data 260 related to the connection 251 later.

In other words, the wireless device 240 transitions into the suspended idle mode. This action may be performed by means such as a transitioning module 1220 in the wireless device 240. The transitioning module 1220 may be implemented by a processor 1280 in the wireless device 240.

Action 601

After some time, the wireless device 240 obtains an indication to contact the wireless communications network 200. Such an indication may be a paging message from the third network node 212. Thus, the wireless device 240 wants to contact the wireless communications network 200 or in other words the wireless device 240 wants to establish a new connection.

Action 602

The wireless device 240 may check if it supports suspend and/or resume. It may further check whether the identifier 270 of the wireless device 240 is valid.

Action 603b

If the wireless device 240 does not support suspend and/or resume or if the identifier 270 of the wireless device 240 is not valid, then the wireless device 240 may do a normal service establishment.

Actions 603a, 803

The wireless device 240 transmits a message to the first network node 211, which transmitted message indicates a request to resume the connection 251 and which message comprises the identifier 270 of the wireless device 240.

In other words, the wireless device 240 transmits a message to the first network node 211 when the wireless device 240 wants to establish a new connection. The message indicates that the wireless device 240 wants to establish the new connection 251 and comprises the resume identifier of the wireless device 240. The message may be transmitted when the wireless device 240 wants to establish the new connection 251.

The transmitted message to the first network node 211 may be a Random Access RA message.

This action may be performed by a transmitting module 1230 in the wireless device 240. The transmitting module 1230 may be implemented by a transmitter in the wireless device 240.

This action is related to actions 603a and 707 above.

Action 804

The wireless device 240 receives a message from the first network node 211, in response to the transmitted message. The received message comprises the identifier 270 of the wireless device 240 and an indication that the resumption of the connection 251 is complete, whereby the suspended connection 251 between the wireless device 240 and the wireless communications network 200 is resumed using the data 260 related to the suspended connection 251.

In other words, the wireless device 240 receives a control message from the first network node 211 in response to the transmitted message. The control message comprises the resume identifier of the wireless device 240 and the indication that the resumption of the connection 251 is complete, whereby the connection 251 between the wireless device 240 and the wireless communications network 200 is resumed using the UE context.

The wireless device 240 transitions into connected mode in response to the received message. E.g. the wireless device 240 turns on encryption and in the connected mode the wireless device 240 is prepared to send uplink messages if scheduled, and prepared to receive downlink messages. The previous bearer configuration is active.

This action may be performed by the receiving module 1210 in the wireless device 240.

This action is related to actions 606a and 708 above.

Embodiments will now be described from the viewpoint of the third network node 212. The embodiments related to the third network node 212 relate to FIG. 9.

Figure 9:
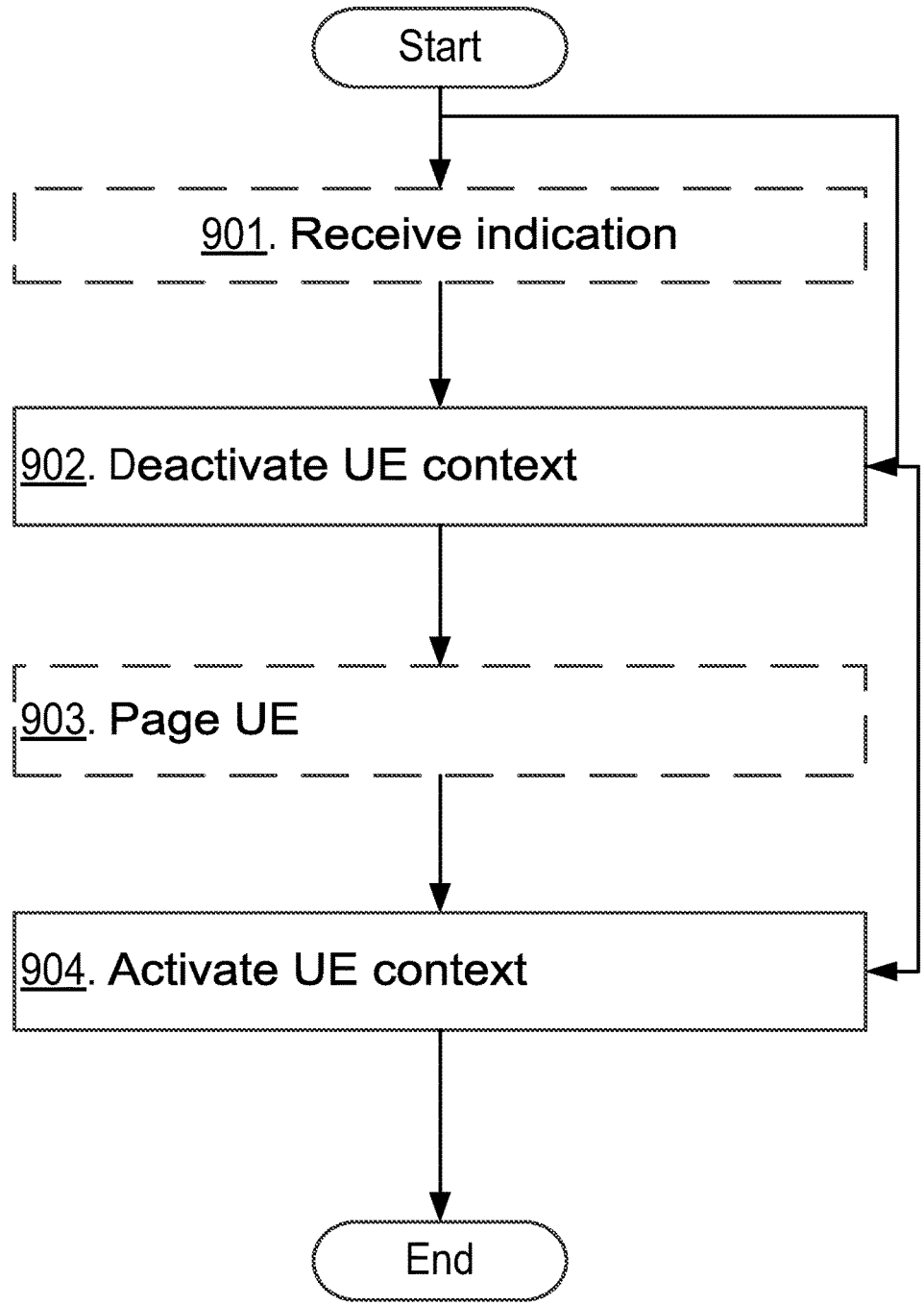
FIG. 9 is a flowchart illustrating embodiments of a method performed by a third network node.
Figure 9A:
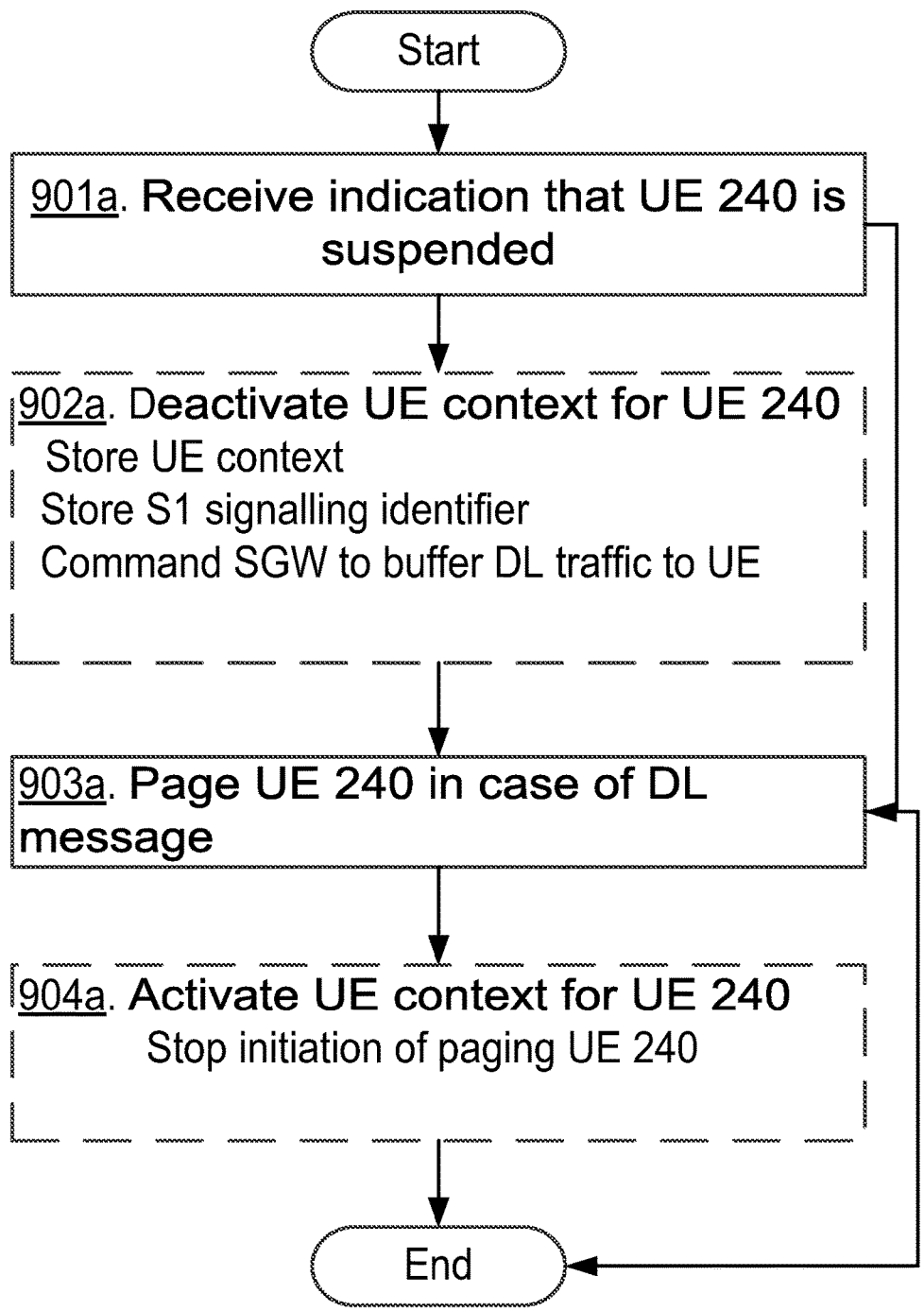
FIG. 9a is a flowchart illustrating further embodiments of a method performed by a third network node.

FIGS. 9 and 9a are flowcharts that describe actions of a method for handling, i.e. suspending and resuming, the connection 251 according to embodiments herein. Actions 901-904 are performed by the third network node 212. FIG. 9a is somewhat more detailed than FIG. 9. In the following description of FIGS. 9, 9a, reference will also be made to FIG. 13 which illustrates an example of how the third network node 212 may be configured for implementing this procedure.

As mentioned above the third network node 212 is responsible for paging the wireless device 240.

Action 901

The third network node 212 obtains an indication that the connection 251 between the wireless device 240 and the wireless communications network 200 is to be suspended.

This action may be performed by means such as a receiving module 1310 in the third network node 212. The receiving module 1310 may be implemented by a receiver in the third network node 212.

This action is related to actions 502a and 703 above.

Action 902

In order for the wireless device 240 to be able to be suspended the third network node 212 may deactivate the data 260 related to the connection 251. The deactivating of the stored data 260 related to the connection 251 further comprises paging the wireless device 240 in case of a downlink control message or a payload is to be transferred to the wireless device 240.

The deactivation may be performed in response to an indication that the connection between the wireless device 240 and the wireless communications network 200 is to be suspended.

The deactivating the data 260 related to the connection 251 may further comprise storing the data 260 related to the connection 251. The deactivating the data 260 related to the connection 251 may further comprises storing a security part of the data 260 related to the connection 251.

The deactivating the data 260 related to the connection 251 may further comprises storing a S1 signaling identifier.

The deactivating the stored data 260 related to the connection 251 may further comprise commanding the fourth network node 213 to buffer DL traffic to the wireless device 240.

This action may be performed by means such as a deactivating module 1320 in the third network node 212. The deactivating module 1320 may be implemented by a processor 1380 in the third network node 212.

Action 903

As a result of the deactivation of the data 260 related to the connection 251 the third network node 212 pages the wireless device 240 in case of a downlink control message is to be transferred to the wireless device 240 or when the fourth network node 213 has informed the third network node 212 that a payload is to be transferred to the wireless device 240.

The paging may be performed with a resume identifier. The resume identifier may be obtained from the indication that the connection 251 between the wireless device 240 and wireless communications network 200 is to be suspended.

This action may be performed by means such as a paging module 1330 in the third network node 212. The paging module 1330 may be implemented by the processor 1380 in the third network node 212.

Action 904

When the third network node 212 has obtained the indication that the wireless device 240 wants to or has resumed the connection 251 again, which was described above in relation to actions 606b and 709, the third network node 212 activates the stored data 260 related to the connection 251 in response to the indication that the wireless device 240 wants to or has resumed the connection 251 again. Thereby the connection 251 between the wireless device 240 and the wireless communications network 200 is resumed using the data related to the connection 251.

The third network node 212 may activate the stored data related to the connection 251 by stopping the initiation of paging of the wireless device 240 in case of a downlink control message is to be transferred to the wireless device 240 or in case of a payload is to be transferred to the wireless device 240. That is, the third network node 212 determines that it shall not page the wireless device 240 anymore.

The activation may further comprise commanding the fourth network node 213 to stop buffering downlink traffic to the wireless device 240 and to send buffered downlink traffic to the wireless device 240.

This action may be performed by means such as an activating module 1340 in the third network node 212. The activating module 1340 may be implemented by the processor 1380 in the third network node 212.

This action is related to actions 606a and 709 above and to action 1003 below.

Embodiments will now be described from the viewpoint of the fourth network node 213. The embodiments related to the fourth network node 213 relate to FIG. 10.

Figure 10:
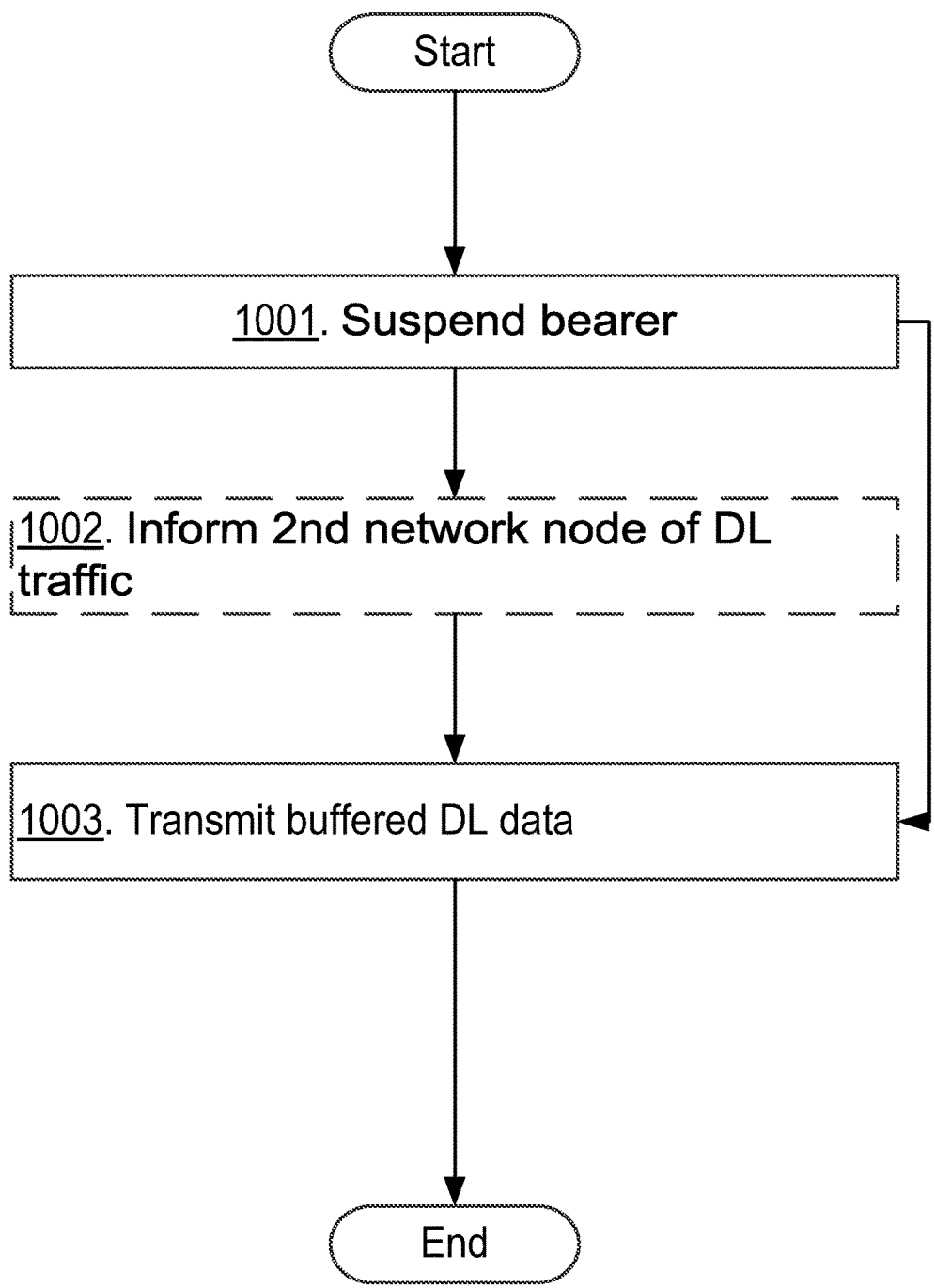
FIG. 10 is a flowchart illustrating embodiments of a method performed by a fourth network node.
Figure 10A:
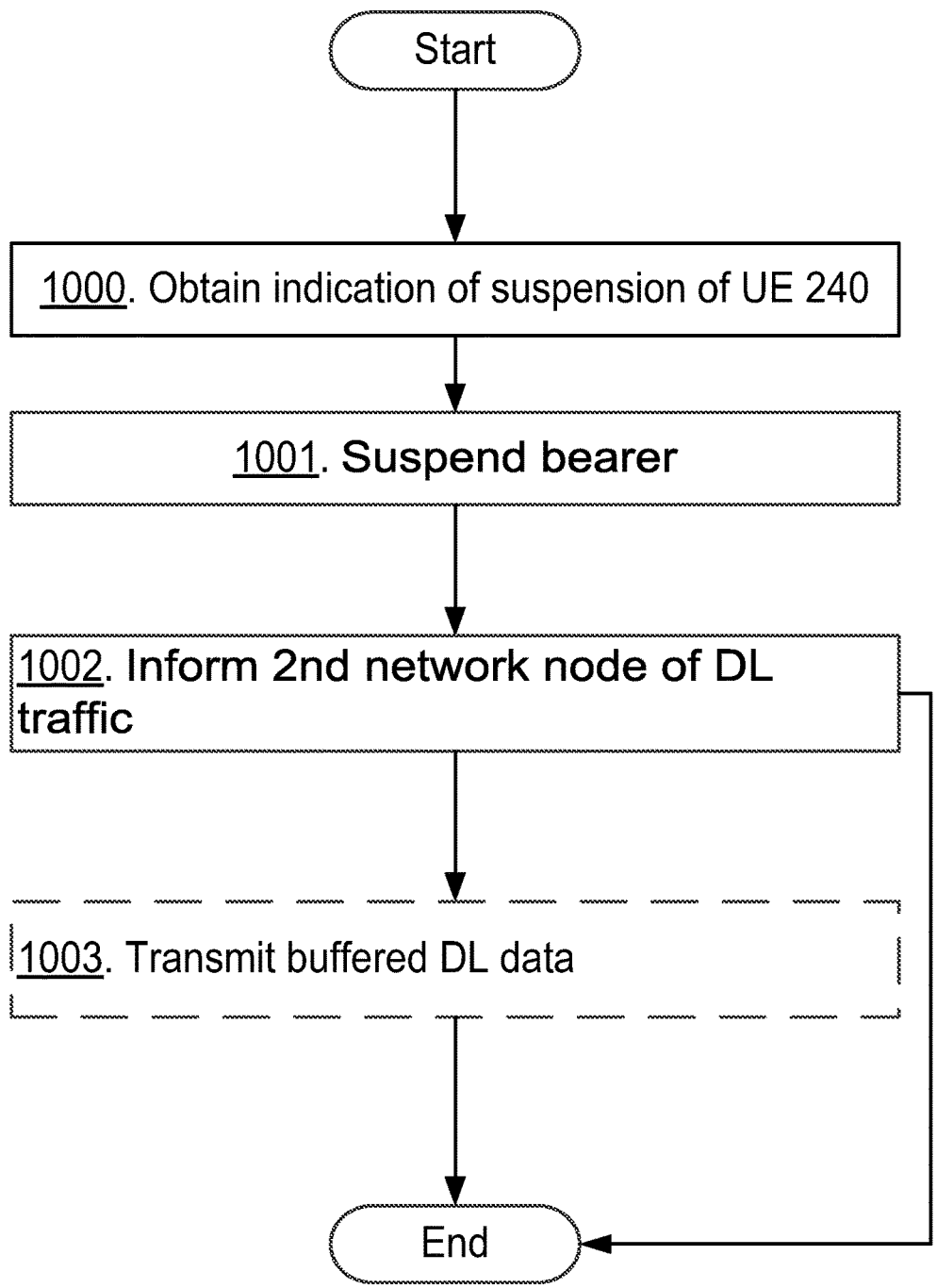
FIG. 10a is a flowchart illustrating further embodiments of a method performed by a fourth network node.

FIGS. 10 and 10a are flowcharts that describe actions of a method for handling, i.e. suspending and resuming, the connection 251 according to embodiments herein. The method is performed by the fourth network node 213. In the following description of FIGS. 10, 10a, reference will also be made to FIG. 14 which illustrates an example of how the fourth network node 213 may be configured for implementing this procedure. FIG. 10a complements FIG. 10 and discloses the additional action 1000.

As mentioned above the fourth network node 213, e.g. an SGW, may be responsible for forwarding downlink data packages to the wireless communications device 240.

Action 1000

The fourth network node 213 obtains an indication that the connection 251 between the wireless device 240 and the wireless communications network 200 is to be suspended.

This action is related to actions 505a and 704 above.

Action 1001

In order for the wireless device 240 to be able to be suspended the fourth network node 213 suspends a bearer related to the wireless device 240 in response to the indication that the connection 251 between the wireless device 240 and the wireless communications network is to be suspended. Suspending the bearer comprises buffering downlink payload to be sent to the wireless device 240 using the bearer.

This action may be performed by means such as a suspending module 1410 in the fourth network node 213. The suspending module 1410 may be implemented by a processor 1480 in the fourth network node 213.

Action 1002

When the fourth network node 213 has received downlink payload to the wireless device 240 for which the bearer is suspended, the fourth network node 213 informs the third network node 212 that the fourth network node 213 has received downlink payload to the wireless device 240.

The indication that the connection 251 between the wireless device 240 and the wireless communications network 200 is to be suspended, received above in action 1000, may comprise an indication that the fourth network node 213 shall inform the third network node 212 that the fourth network node 213 has received downlink payload to the wireless device 240.

This action is performed in order to get the third network node 212 to page the wireless device 240. The paging leads to that the wireless device 240 becomes active again and the downlink data may be transferred.

The bearers in the fourth network node 213 are originally setup by the third network node 212 and there is a 'connection' between the data 260 related to the connection 251 stored in the third network node 212, e.g. a UE context in an MME, and the data related to a bearer which is related to the wireless device 240 and stored in the fourth network node 213, e.g. a bearer context in an SGW. When the fourth network node 213 has received the indication of suspension related to the wireless device 240, this indicates that the third network node 212 must be signalled if downlink data is received in the fourth network node 213 on the concerned bearers.

This action may be performed by means such as an informing module 1420 in the fourth network node 213. The informing module 1420 may be implemented by the processor 1480 and/or a transmitter in the fourth network node 213.

This action is related to action 903 above.

Action 1003

When the fourth network node 213 receives an indication that the wireless device 240 has resumed the connection 251 again, as described above in actions 608a and 710 or action 904, the fourth network node 213 may transmit the buffered downlink payload to the wireless device 240. For example, the fourth network node 213 may have received a command from the third network node 212 to stop buffering downlink traffic to the wireless device 240 and to send buffered downlink traffic to the wireless device 240 in action 904.

The fourth network node 213 may transmit the buffered downlink payload in response to the indication that the wireless device 240 has resumed the connection 251 again. Thereby the connection 251 between the wireless device 240 and the wireless communications network 200 is resumed using the bearer related to the wireless device 240, i.e. the bearer used for the last connection 251.

This action may further comprise stopping the initiation of the buffering of downlink data traffic to the wireless device 240.

This action may be performed by means such as a transmitting module 1430 in the fourth network node 213. The transmitting module 1430 may be implemented by the transmitter in the fourth network node 213.

This action is related to actions 608a, 710 and 904 above.

Embodiments herein may be performed in the first network node 211. The first network node 211 may comprise the modules mentioned above and depicted in FIG. 11 for handling the connection 251.

Figure 11:
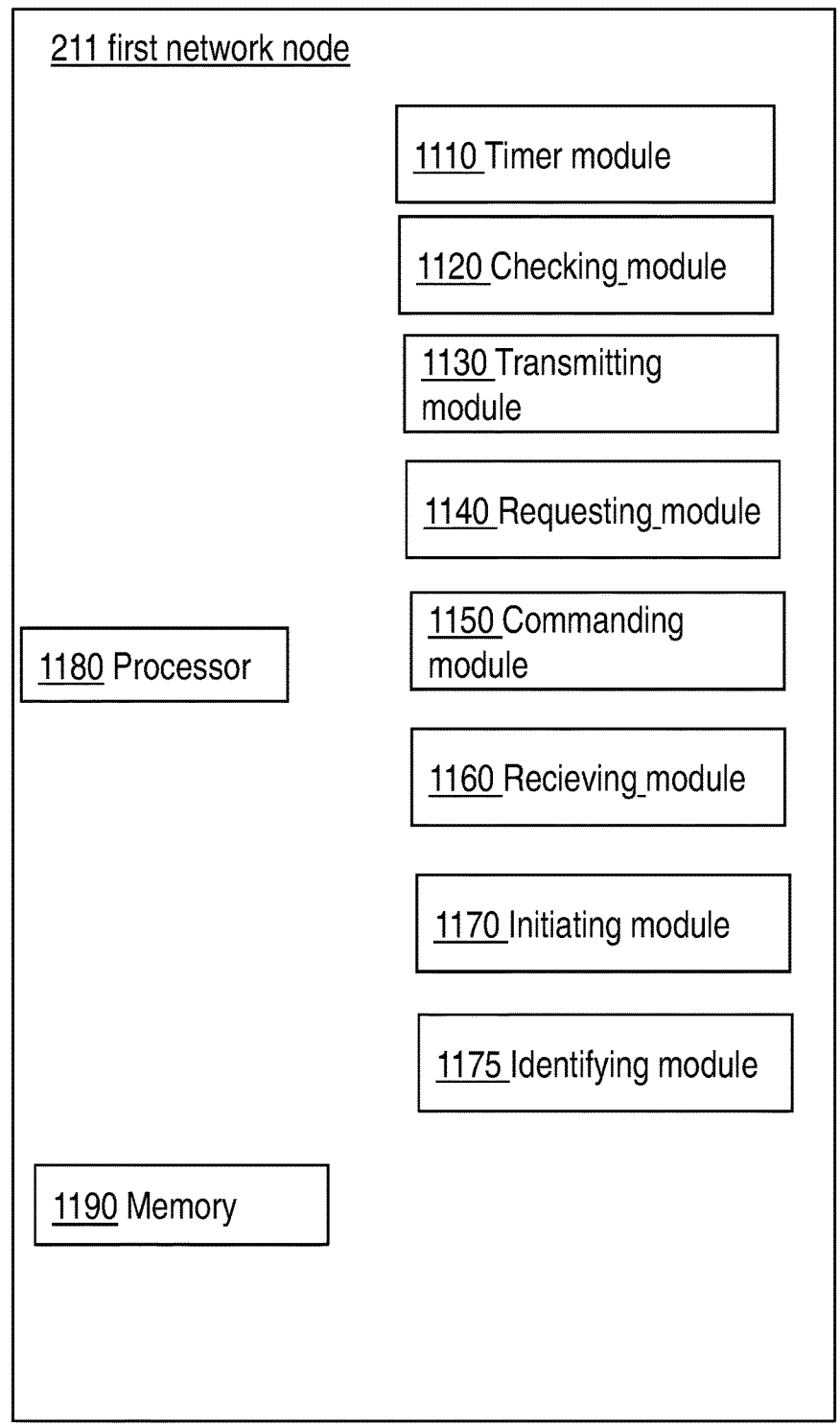
FIG. 11 is a schematic block diagram illustrating embodiments of a first network node.

In other words, to perform a procedure for handling the connection 251 between the wireless device 240 and the wireless communications network 200, e.g. as described above in relation to FIGS. 3-7, the first network node 211 comprises the following arrangement depicted in FIG. 11.

Embodiments herein may be performed in the wireless device 240. The wireless device 240 may comprise the modules mentioned above and depicted in FIG. 12 for handling the connection 251.

Figure 12:
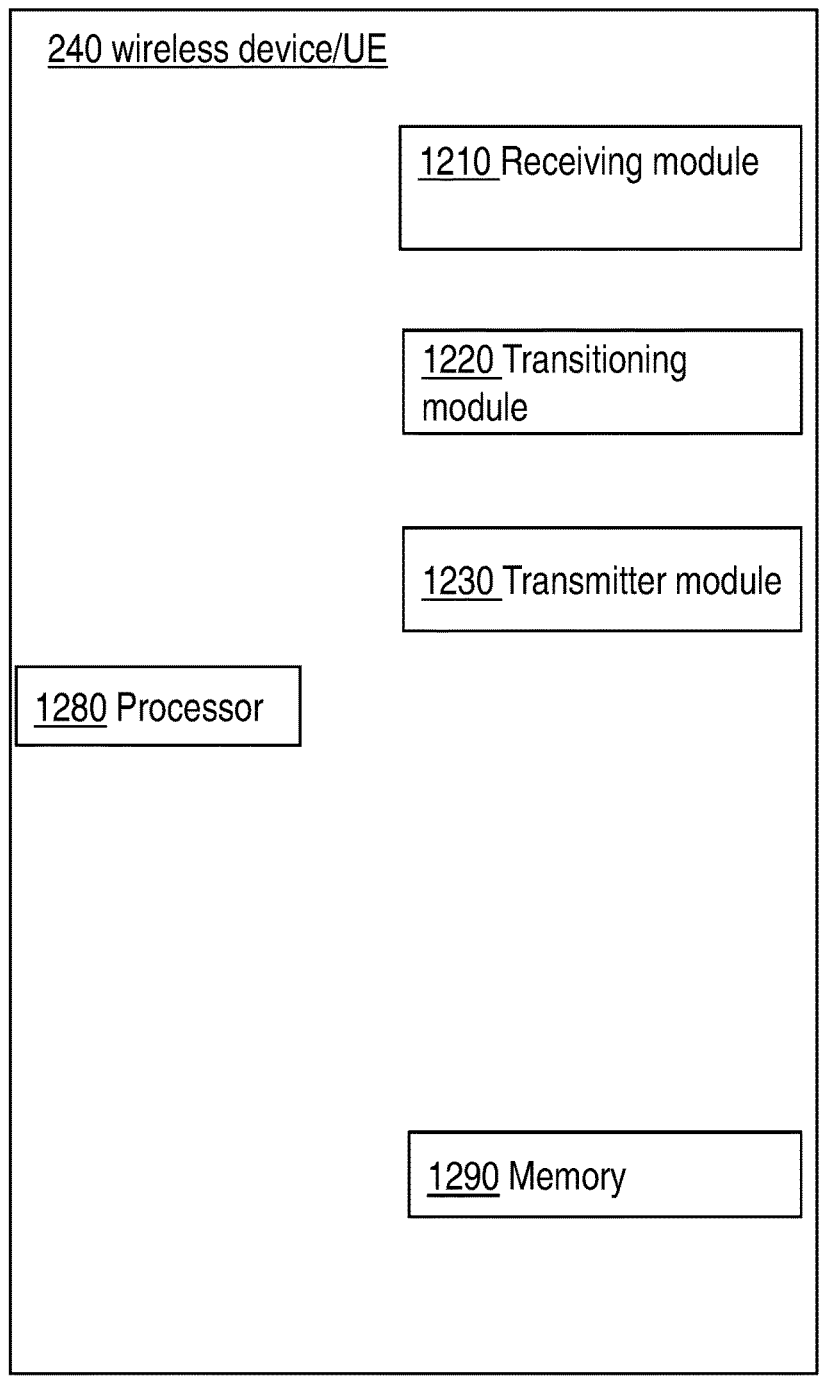
FIG. 12 is a schematic block diagram illustrating embodiments of a wireless device.

In other words, to perform the method actions for handling the connection 251 between the wireless device 240 and the wireless communications network 200 described above in relation to FIG. 3, FIG. 4a-d, FIG. 6 and FIG. 8, the wireless device 240 comprises the arrangement depicted in FIG. 12.

Embodiments herein may be performed in the third network node 212. The third network node 212 may comprise the modules mentioned above and depicted in FIG. 13 for handling the connection 251.

Figure 13:
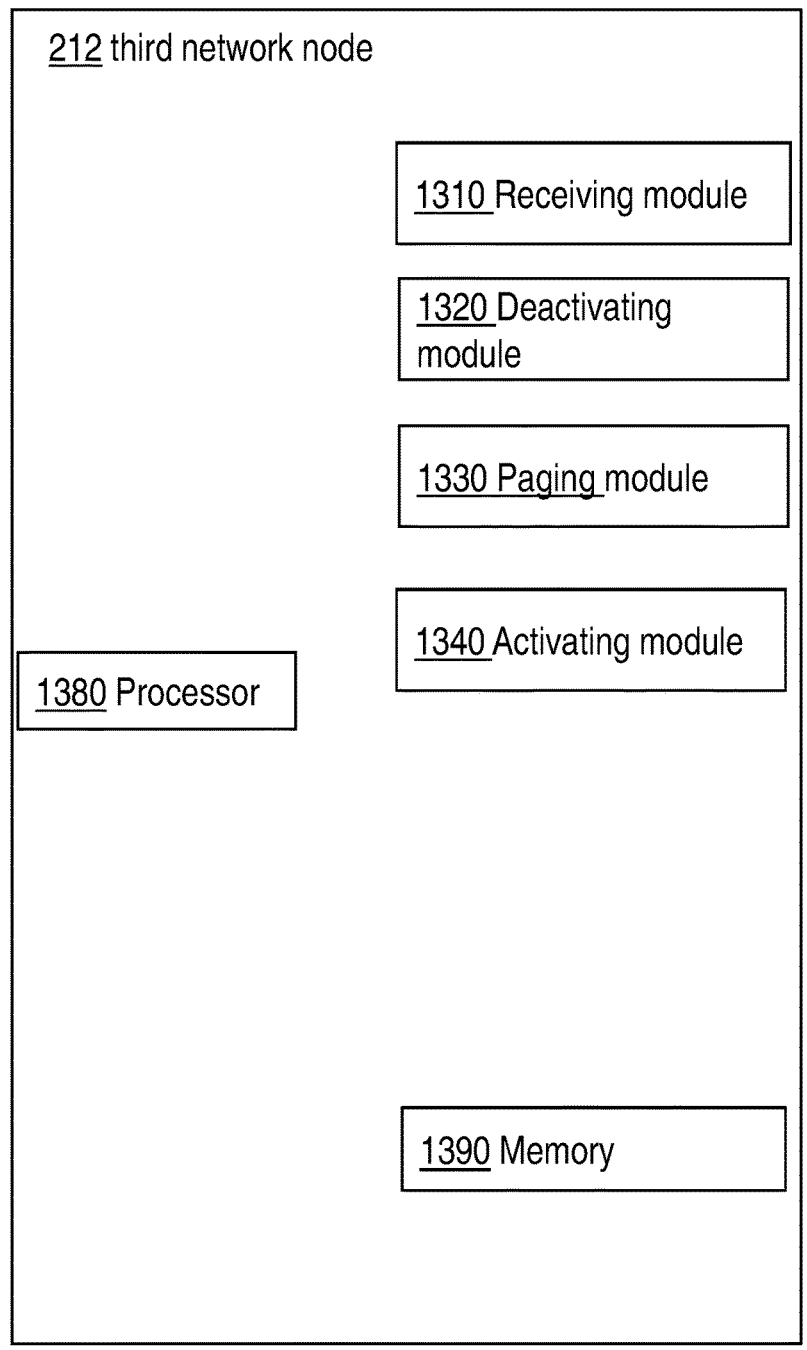
FIG. 13 is a schematic block diagram illustrating embodiments of a third network node.

In other words, to perform the method actions for handling the connection 251 between the wireless device 240 and the wireless communications network 200 described above in relation to FIG. 9, the third network node 212 comprises the arrangement depicted in FIG. 13.

Embodiments herein may be performed in the fourth network node 213. The fourth network node 213 may comprise the modules mentioned above and depicted in FIG. 14 for handling the connection 251.

Figure 14:
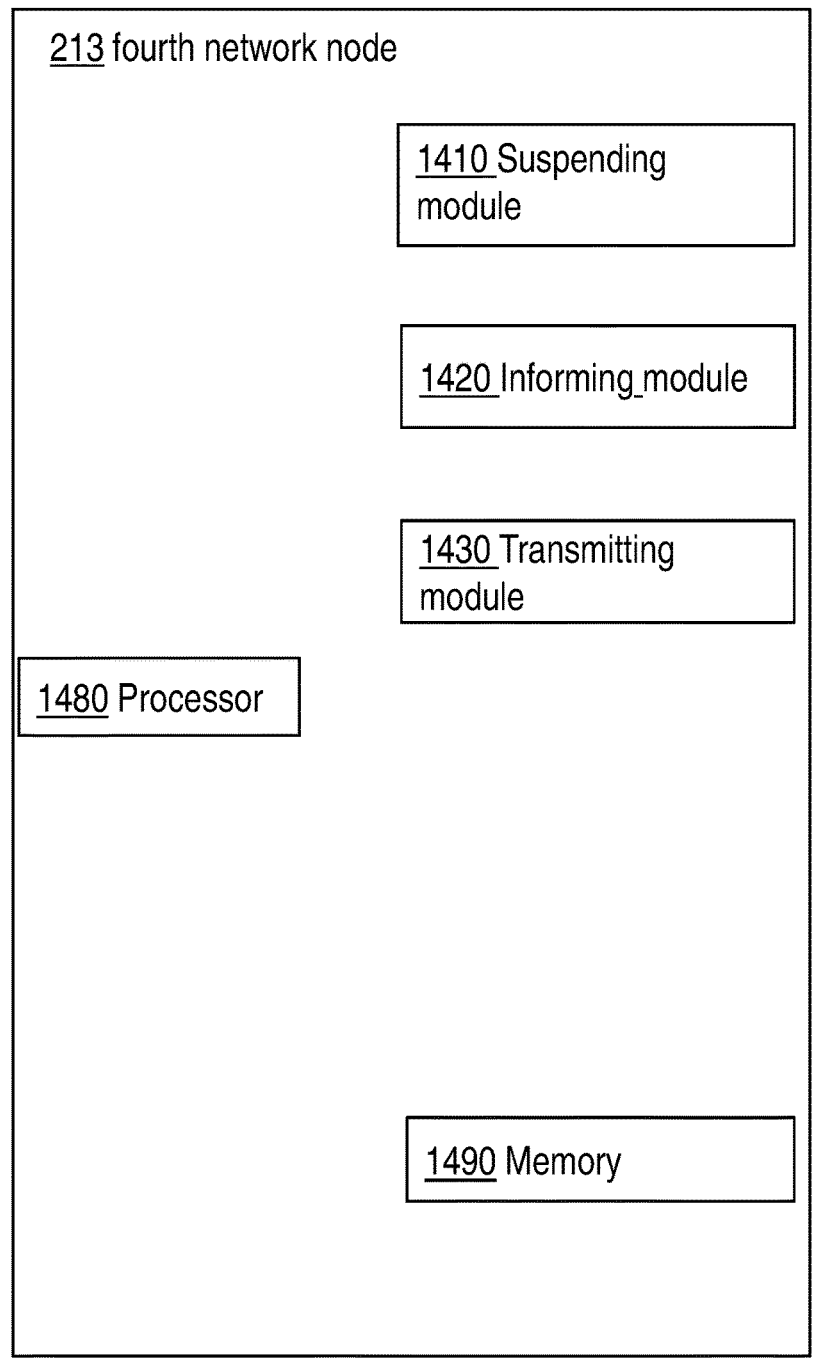
FIG. 14 is a schematic block diagram illustrating embodiments of a fourth network node.

In other words, to perform the method actions for handling the connection 251 between the wireless device 240 and the wireless communications network 200 described above in relation to FIG. 10, the fourth network node 213 comprises the arrangement depicted in FIG. 14.

Embodiments for suspending and resuming the connection 251 will now be described using the information indicating whether or not resume is possible. These embodiments will be illustrated with FIGS. 15-24. First the interaction between the wireless device 240 and the first network node 211 or between the wireless device 240 and the system of network nodes 216 will be described. As mentioned above, the system of network nodes 216 may comprise the first network node 211 and the second network node 214. Then embodiments will be described from the viewpoint of the wireless device 240 and later from the viewpoint of the first network node 211 and from the viewpoint of the system 216 of network nodes.

Embodiments herein disclose means to efficiently handle the RRC Resume Contexts in the time domain.

Embodiments herein introduce a new concept of a 'RRC Resume Area Information' (RRA Information). The embodiments enable the wireless device 240 to identify whether a cell is suitable for a resumption of an RRC connection associated with the wireless device 240.

Additionally, embodiments herein enable time limited support for RRC resumption by the network for any given wireless device, such as the wireless device 240. These embodiments introduce synchronized knowledge regarding the availability of the RRC Resume Context in the wireless communications network 200 and in the wireless device 240.

Further, embodiments herein enable, at for example equipment failure, managing the 'RRA Information' without the need for its re-configuration across the wireless communications network 200.

General

'RRA Information' indicates to the wireless device 240 whose RRC connection is suspended whether a cell is capable of resuming its RRC connection, i.e. whether the cell has access to its RRC Resume Context and the capability to resume its specific previously suspended RRC connection. The cell may for example be a cell that the wireless device 240 camps on.

The 'RRA Information' may be made available to the wireless device 240 by means of a new information element conveying on the broadcast control channel, e.g. Broadcast Control CHannel (BCCH), in existing or new system information. The 'RRA Information' may further be made available to the wireless device 240 by means of dedicated signaling between the wireless communications network 200 and the wireless device 240. For example, the first network node 211 may use dedicated signaling to the wireless device 240. The dedicated signalling is used when the RRC connection is suspended.

RRA Network Configuration Aspects

First a scenario will be described. 'RRA Information' may need to be coordinated in a RAN on cell level. In embodiments herein the RAN comprises the first network node 211, and optionally the second network node 214. This may e.g. be done by taking into account that the cells' access possibilities, e.g. the fourth cell's 224 access possibilities, to the RRC Resume Contexts may potentially be limited by the network architecture. This means that in some scenarios, only a subset of cells may share access to a common memory. E.g. all cells configured on a single eNB, such as the first network node 211, may share access to the common memory. It may further be assumed that no inter-eNB access to the common memory is available. The common memory may be placed in or in connection to a network node, such as the first network node 211, e.g. a base station.

Figure 15:
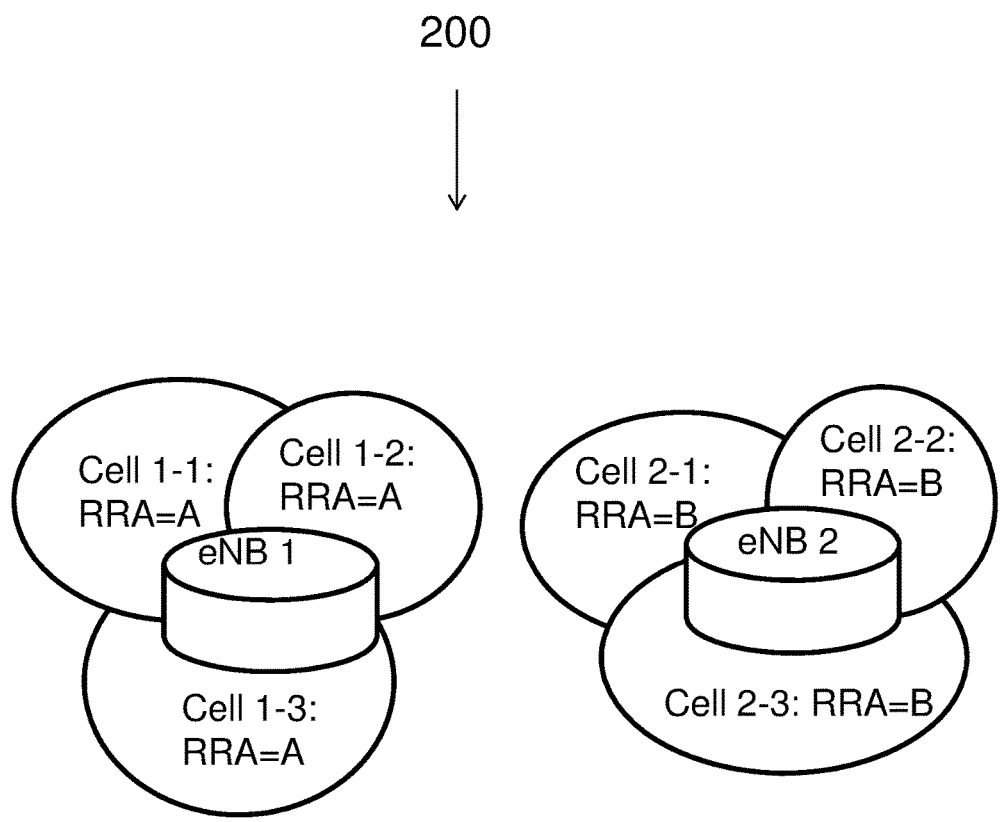
FIG. 15 is a schematic block diagram illustrating embodiments of a method performed in a wireless communications network.

The scenario mentioned above is further exemplified and illustrated in FIG. 15, which will be described now with further reference to the cells illustrated in FIG. 2a. In FIG. 15 two eNBs, eNB1 and eNB2, are depicted. The first network node 211 may be eNB1. The second network node 214 may be eNB2. On eNB1 three cells 1-1, 1-2 and 1-3 are configured. In a particular scenario the first cell 221 of FIG. 2a corresponds to cell 1-1, the second cell 222 corresponds to cell 1-2 and the third cell 223 corresponds to cell 1-3. On eNB2 three other cells 2-1, 2-2 and 2-3 are configured. In a particular scenario the fourth cell 224 corresponds to cell 2-1, the fifth cell 225 corresponds to cell 2-2 and the sixth cell 226 corresponds to cell 2-3. Cells 1-1 . . . 1-3 have access to a shared memory on eNB1 while cells 2-1 . . . 2-3 have access to shared memory on eNB2.

The RRC Resume Context or UE context of a UE with a suspended RRC connection in any of the cells configured on eNB1 will be accessible to any of the cells configured on eNB1 as all of these cells share a common memory space. The same is valid for eNB2. Hence a UE, such as the wireless device 240, with its RRC connection suspended in a cell that is configured on eNB1 is not able to resume its RRC connection in any of the cells configured on eNB2. To communicate this limitation to the wireless device 240 the 'RRA Information' provided to the wireless device 240 in cells configured on eNB1 is different from the 'RRA Information' provided by the cells configured on eNB2.

On the other hand to benefit from the shared memory accessible to all cells configured on the respective eNB, all cells configured on eNB1 respectively eNB2 provide to the wireless device 240 the same 'RRA information'. In this example 'RRA Information' in all cells configured on eNB1 is set to 'A' while it is set to 'B' in cells configured on eNB2, where 'A' and 'B' represent different 'RRA Information' values.

It shall be noted that there may be different reasons why access to the RRC Resume Context is available or not available in different cells.

It is furthermore possible for a given wireless device 240 to suspend its RRC connection subsequently in multiple cells in which it is provided with different 'RRA Information'. This may be e.g. because the cells' access to the RRC Resume Context may be mapped on different physical nodes, such as the first network node 211 and the fourth network node 214. This implies that there may be multiple suspended S1-U connections as well as multiple suspended S1AP associations for a specific wireless device 240. A connection that exists in both the first network node 211 and the third network node 212 may be 'tied together' over an interface that exists between these two nodes. The S1 interface between an eNB and MME is such an interface. An S1AP association is a name for the pair of 'local MME S1 identifier' and 'local eNB S1 Identifier'. When the connection is suspended, the S1AP connection is kept. In that case, the wireless device 240 may at suspend be provided with an indication whether its previously suspended RRC connections are still valid or which of it are selected to be invalidated. This functionality needs to be coordinated by an MME, e.g. the third network node 212. The third network node 212 may in case of multiple suspended RRC connections for a given wireless device 240 need to manage the set of suspended associated UE Contexts. In case the radio network, e.g. the eNB:s comprised therein, have multiple UE contexts, the core network may manage them and keep one common context in a core network node, such as the third network node 212 which may be an MME.

RRA Information Structure

Figure 16:
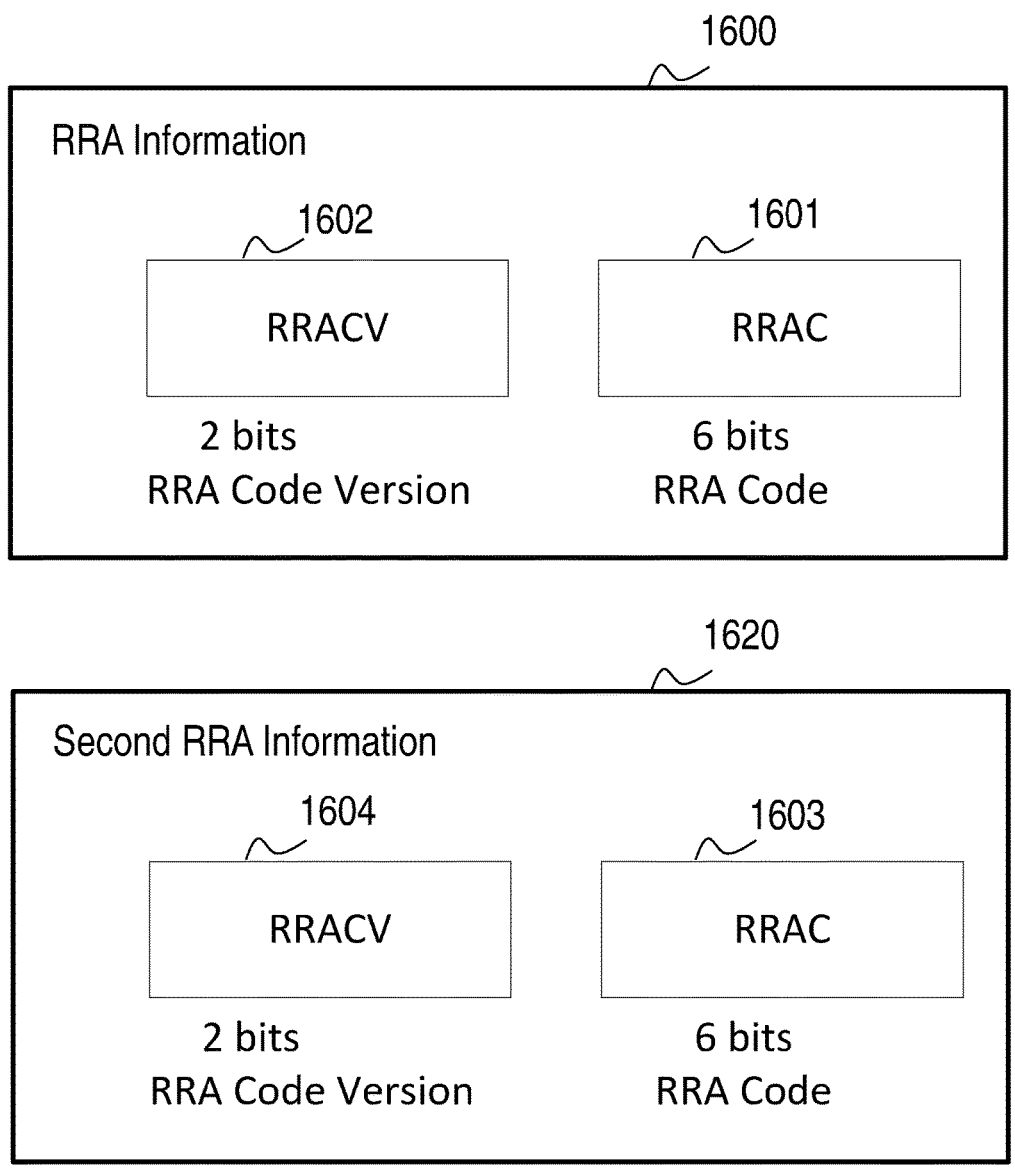
FIG. 16 is a schematic block diagram illustrating embodiments of a method performed in a wireless communications network.

FIG. 16 provides an example for one possible format of the 'RRA Information' structure. FIG. 16 illustrates information 1600 which may be referred to as RRA Information. The information 1600 relates to resumption of suspended connections, such as the connection 251. The information 1600 comprises a first identifier 1601 identifying the first cell area 281. As mentioned above, the first cell area 281 comprises one or more cells 221, 222, 223 capable of resuming the connection 251.

In some embodiments the information 1600 further comprises a second identifier 1602 identifying a version of the first identifier 1601.

FIG. 16 further illustrates a second information 1620 which may be referred to as a second RRA Information. In some embodiments the second information 1620 is transmitted to the wireless device 240 from the second network node 214 when the wireless device 240 has moved to one of the cells served by the second network node 214, e.g. to the fourth cell 224. In some other embodiments the second information 1620 is transmitted to the wireless device 240 from the first network node 211 when the wireless device 240 has not changed cell or when the wireless device 240 has changed to another cell in the first cell area 281, such as the second cell 222.

The second information 1620 comprises a third identifier 1603 identifying a cell area, such as the first cell area 281 and/or the second cell area 282. The cell area identified by the third identifier 1603 comprises cells capable of resuming suspended connections. However, depending on which cell area the third identifier 1603 identifies the cells may or may not be capable of resuming the connection 251 between the wireless device 240 and the wireless communications network.

In some embodiments the second information 1620 further comprises a fourth identifier 1604 identifying a version of the third identifier 1603.

In other words, the information 1600 and the second information 1620, such as the 'RRA Information', may comprise the following two elements:
- the first identifier 1601/the third identifier 1603, e.g. an 'RRC Resume Area Code (RRAC)', identifies a cell with access to the RRC Resume Context that is stored for a given wireless device 240 at suspension of its RRC connection.
- the second identifier 1602/the fourth identifier, e.g. 'RRC Resume Area Code Version (RRACV)', identifies the version of the RRAC. RRACV enables smart RRAC management where the RRACV indicates to the wireless device 240 the validity of the previously stored RRAC.

The following paragraph provides an example of the usage of the RRACV element. In case of equipment failure where the RRC Resume Contexts that have been stored while the RRACV had a particular value, e.g. RRACV='00', are no longer accessible to a cell, the affected cell modifies the 'RRA Information' being broadcast in the system information and provided in dedicated signaling. This modification may be done by changing the value of the RRACV element while the RRAC itself does not have to be modified and thus re-configured across the network.

In other words, the first network node 211 which is associated with the affected cell, such as the first cell 221, may modify RRA Information' being broadcast in the system information and provided in dedicated signaling.

The modified value of the RRACV indicates to the affected UEs, such as the wireless device 240, camping on that particular cell that their RRC Resume Contexts are no longer available in this cell. Thus these UEs have no longer support for the resumption of their particular suspended RRC connections. Stepping the RRACV is used to indicate to the UEs whether or not the previously acquired/provisioned RRAC is valid or not. The previously acquired/provisioned RRAC may have been received in the suspending command from the first network node 211.

Figure 17A:
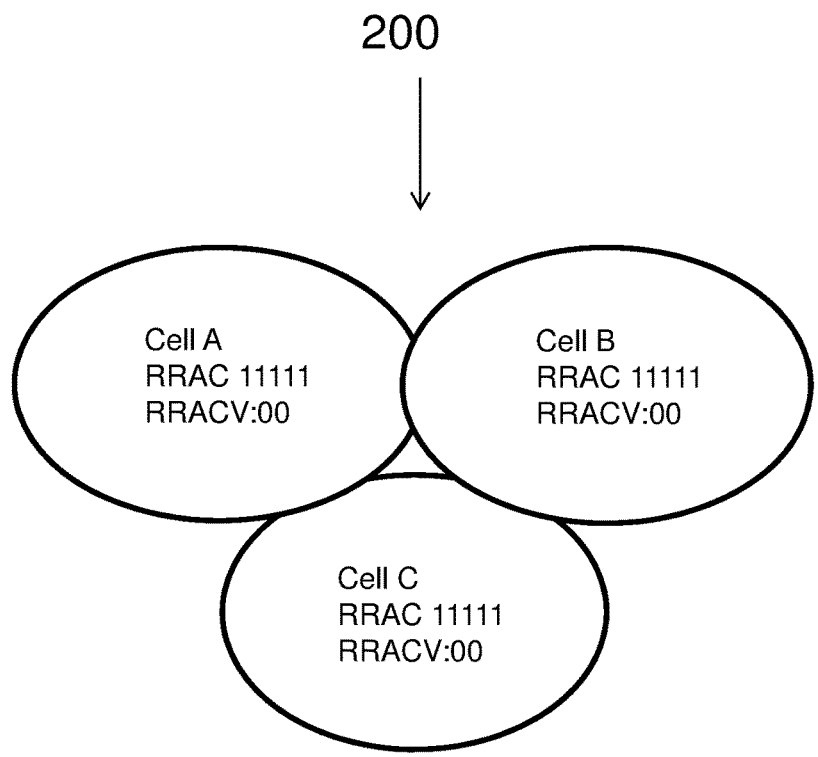
FIG. 17a is a schematic block diagram illustrating embodiments of a method performed in a wireless communications network.

FIG. 17a shows an example of the RRACV usage. FIG. 17a shows 3 cells, cell A, cell B and cell C, with access to a shared memory. The shared memory stores RRC Resume Contexts created at suspension of RRC connections in all three cells. The three cells may correspond to the first cell 221, the second cell 222 and the third cell 223.

To enable RRC Resume in all 3 cells for UEs, such as the wireless device 240, that have suspended their RRC connections in any of the 3 cells all 3 cells broadcast and/or provision in dedicated signaling the same 'RRA Information' set to '0011111'. The RRAC value is '11111' and the RRACV is '00'. All UEs, such as the wireless device 240, that have stored this 'RRA Information' are allowed to resume their suspended RRC connections as long as the same specific 'RRA Information' value is broadcast in the system information of the cells, e.g. in the cell that the wireless device 240 camps on.

Figure 17B:
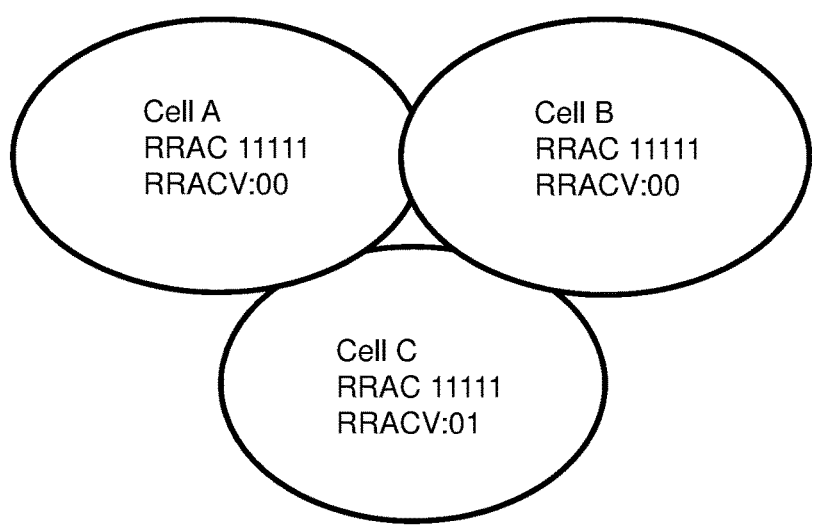
FIG. 17b is a schematic block diagram illustrating embodiments of a method performed in a wireless communications network.

In FIG. 17b the RRACV is modified in cell C, e.g. by the first network node 211. The RRACV comprised in the 'RRA Information' provided by cell 'C' is stepped from '00' to '01', e.g. because of equipment failure disabling cell 'C' to access the RRC Resume Contexts stored when RRACV was set to '00'. This means that UEs, such as the wireless device 240, that have been provisioned a 'RRA Information' value '00111111' by the network in dedicated signaling when their RRC connection has been suspended are not allowed to attempt to resume their RRC connections in cell 'C'.

The second identifier 1602, e.g. RRACV, may be used for additional features like for example:
- One code point or one specific value may indicate that there is no support for RRC Resume. E.g. value 1-3 may mean 'RRC Resume supported' and 0 may mean 'RRC Resume not supported'.
- To invalidate the 'RRA Information' provided to all UEs, such as the wireless device 240, that were suspended within a certain time period.

'RRA Information' Time Supervision

It is assumed that e.g. due to memory space constraints it is preferable to store the RRC Resume Contexts for some limited time period. To avoid failed resumption attempts this may be managed in a synchronized manner between the network and the UEs, such as the wireless device 240.

As outlined above 'RRA Information' broadcast in the system information indicates to the wireless device 240 if it may attempt to resume its suspended RRC connection in a cell, such as in a cell that the wireless device 240 camps on. To enable the possibility of a time controlled resumption capability a new timer 'RRC Context Validity Timer (RCVT)' may be introduced. The new timer is used in the wireless device 240 and in the wireless communications network 200, such as in the first network node 211, to supervise the validity time of the 'RRA Information'. The RCVT value may be provided by the network to the wireless device 240 in dedicated signaling when the RRC connection is suspended.

At successful RRC connection suspension the wireless device 240 initiates its RCVT with the value provided by the wireless communications network 200. At expiry of the 'RCVT' the wireless device 240 and the wireless communications network 200 delete the stored 'RRA Information' and the wireless device 240 returns to RRC Idle mode. The wireless communications network 200, e.g. the first network node 211, may notify any other elements or nodes that may be involved in the suspension process and hold some related information or states, that the RRC connection is now in Idle mode. Such other elements may for example be MMES and SGWs such as the third network node 212 and the fourth network node 213.

Figure 18:
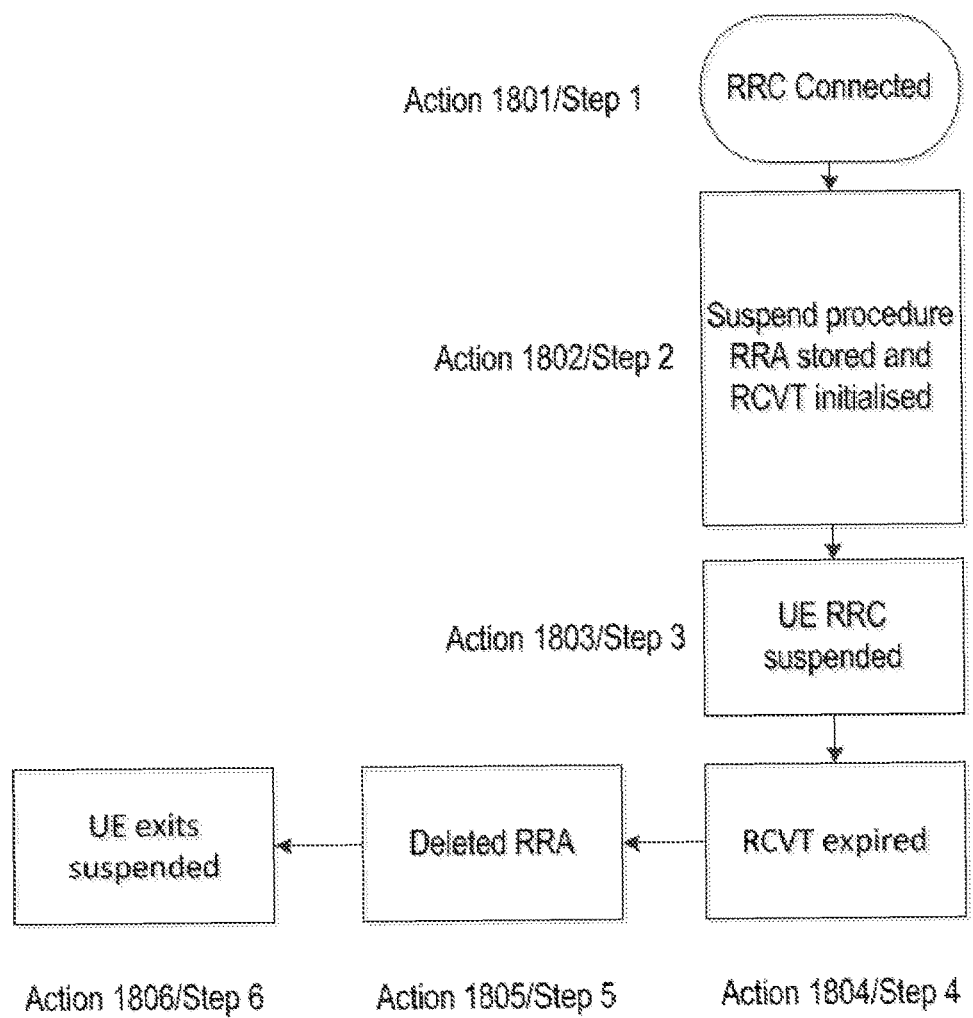
FIG. 18 is a flowchart illustrating embodiments of a method performed by a wireless device.

FIG. 18 depicts a procedure for handling of the RCVT by the wireless device 240.

1. In action 1801/step 1 the wireless device 240 is in RRC connected mode.

2. In action 1802/step 2 the serving cell, i.e. the network node associated with the serving cell, suspends the UE's RRC connection whereby it provides the 'RRA Information' and the value for the associated RCVT. The suspension is based on the capabilities of the wireless device 240 to support 'RRC Resume'.

3. In action 1803/step 3 the wireless device 240 has entered RRC suspended mode.

4. Action 1804/Step 4 RCVT expiration, i.e. the RCVT expires.

5. Action 1805/Step 5, the wireless device 240 deletes the associated 'RRA Information'.

6. Action 1806/Step 6, the wireless device 240 exits suspended mode.

Procedures Impacts and UE Logic for 'MA Information' Handling

The 'RRA Information' handling is based on the following principles:

- A cell supporting the 'RRC Resume' feature includes the valid 'RRA Information' in the relevant system information.
- At suspension of its RRC Connection the wireless device 240 is provided by the network, e.g. by the first network node 211, with the valid 'RRA Information' and optionally the associated RCVT value in the relevant dedicated signaling.
- Alternatively, if the wireless device 240 supports the 'RRC Resume' feature it stores the RRA information which is broadcasted in the relevant system information.
- the wireless device 240 is allowed to attempt to resume its previously suspended RRC Connection in a cell if that cell broadcasts the same 'RRA Information' value in the system information that the wireless device 240 has stored when its RRC connection was suspended.

Figure 19:
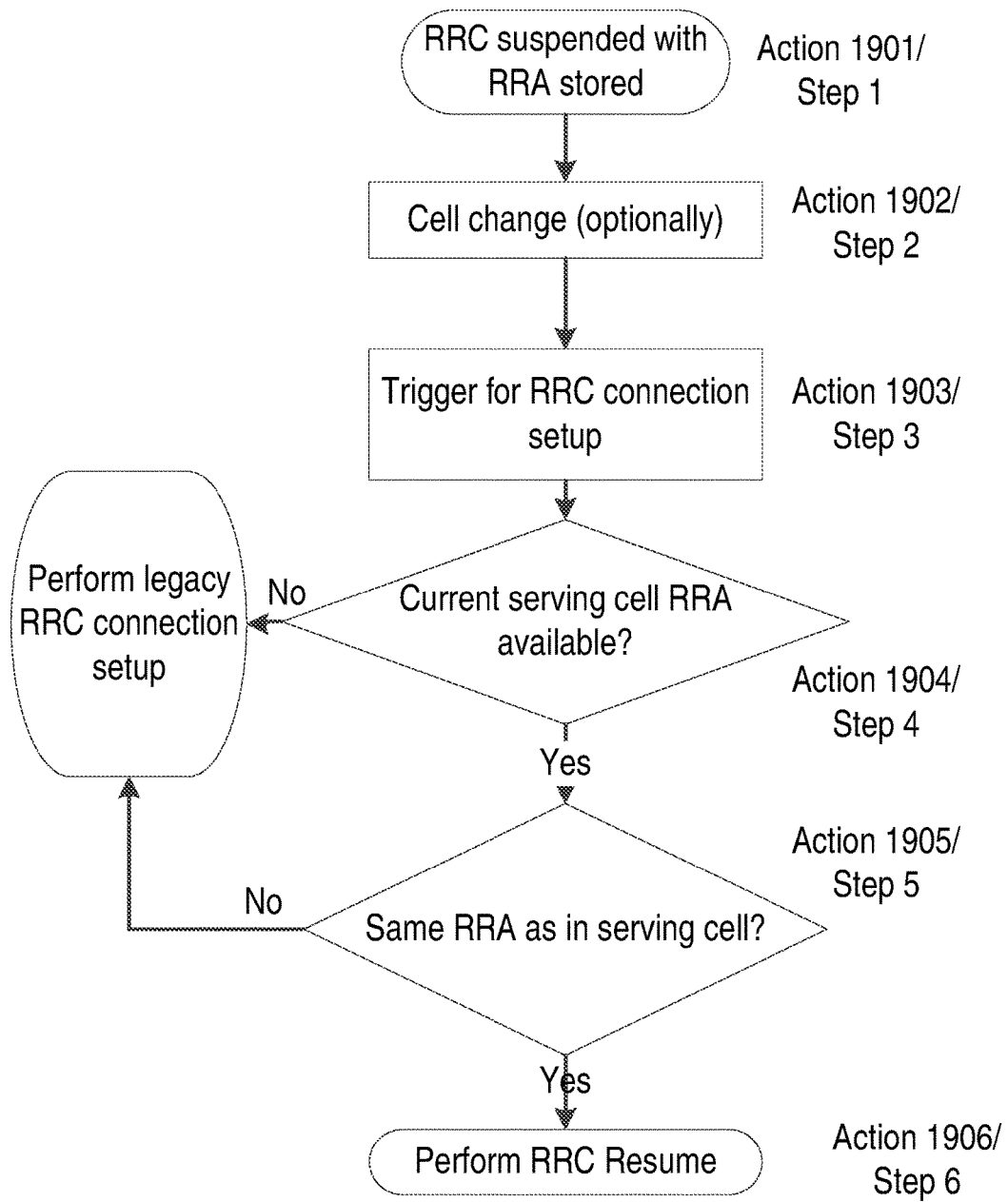
FIG. 19 is a flowchart illustrating embodiments of a method performed by a wireless device.

FIG. 19 describes a procedure for the usage of the 'RRA information' by the wireless device 240:

1. In action 1901/step 1 the RRC Connection of the wireless device 240 is suspended in cell 'A', e.g. the first cell 221. During the suspend procedure the wireless device 240 stores 'RRA Information' received from the network in dedicated signaling or in broadcast system info as mentioned above.

2. In action 1902/step 2 the wireless device 240 may perform cell re-selection e.g. due to mobility or other reasons. Thus the wireless device 240 may change the cell which it camps on to cell 'B', such as the second cell 222. In the new cell B the wireless device 240 acquires the system information as per legacy procedure. Given the wireless device 240 supports the RRC Resume feature it attempts to acquire 'RRA Information' if broadcast on the BCCH in the system information in cell B.

3. In action 1803/step 3 the RRC entity in the wireless device 240 is triggered to establish an RRC connection.

4. In action 1804/step 4 the wireless device 240 checks if a cell, such as cell B, is suitable for RRC Resume. I.e. the wireless device 240 checks first if it has acquired in an 'RRA Information' in the cell. The cell may be the cell that the wireless device is camping on. The cell may be cell A or cell B or any other cell.

5. In case that the wireless device 240 has acquired 'RRA Information' in the cell it compares its stored 'RRA Information' received in action 1901/step 1 and associated with cell A with the 'RRA Information' acquired from the system information in the cell. This is performed in action 1905/Step 5.

6. In case both 'RRA Information' values are same, the wireless device 240 attempts RRC Resume procedure. That is, in action 1906/Step 6 the wireless device 240 attempts RRC Resume procedure if both 'RRA Information' values are the same.

Embodiments will now be described from the viewpoint of the wireless device 240. FIG. 20 describes a method in the wireless device 240 according to some embodiments herein. However, embodiments herein will also be described with reference to FIG. 20*a*. In the following description of FIGS. 20, 20*a*, reference will also be made to FIGS. 12 and 22 which illustrate examples of how the wireless device 240 may be configured for implementing this procedure.

FIG. 20*a* is a flowchart that describes actions of a method performed by a wireless device 240 for handling suspension of a connection 251 between the wireless device 240 and a wireless communications network 200, The wireless communications network 200 comprises a first network node 211.

It is further assumed that the wireless device 240 is located in the first cell 221, associated with the first network node 211, when it is about to suspend its connection 251.

Actions 2001, 2001*a*

The wireless device 240 receives information 1600 from the first network node 211, e.g. at suspension of the connection 251. The information relates to a possible resumption of the connection 251 when the connection has been suspended. The information 1600 comprises a first identifier 1601 identifying the first cell area 281. The first cell area 281 comprises one or more cells 221, 222, 223 capable of resuming the connection 251. Since it is assumed that the wireless device 240 is located in the first cell 221, the first cell 221 is comprised in the first cell area 281 in embodiments herein.

In some embodiments the information 1600 further comprises a second identifier 1602 identifying a version of the first identifier 1601 identifying the first cell area 281. This may for example be the RRACV mentioned above.

In some further embodiments the information 1600 further indicates a time period, i.e. a duration, for which the first identifier 1601 is valid. The time may be indicated by a timer, such as the RCVT timer mentioned above.

The information 1600 may be received with RRC signaling. The information 1600 may further be received with dedicated signaling, e.g. at suspension of the connection 251.

This action may be performed by means such as the receiving module 1210, 2210 in the wireless device 240.

This action is related to action 2103 below.

Actions 2002, 2002*a*

In some embodiments the indicated time period during which the first identifier 1601 is valid is received in a separate action.

This action may be performed by means such as the receiving module 1210, 2210 in the wireless device 240.

This action is related to action 2103 below.

Actions 2003, 2003*a*

The wireless device 240 may store the received information 1600.

This action may be performed by means such as the memory 1290, 2290 in the wireless device 240.

This action is related to action 1901 above.

Actions 2004, 2004a

The wireless device 240 suspends 1803, 2004 the connection 251 in the first cell 221 out of the one or more cells 221, 222, 223.

When the wireless device 240 suspends the connection 251 it may also start the timer.

Figure 22:
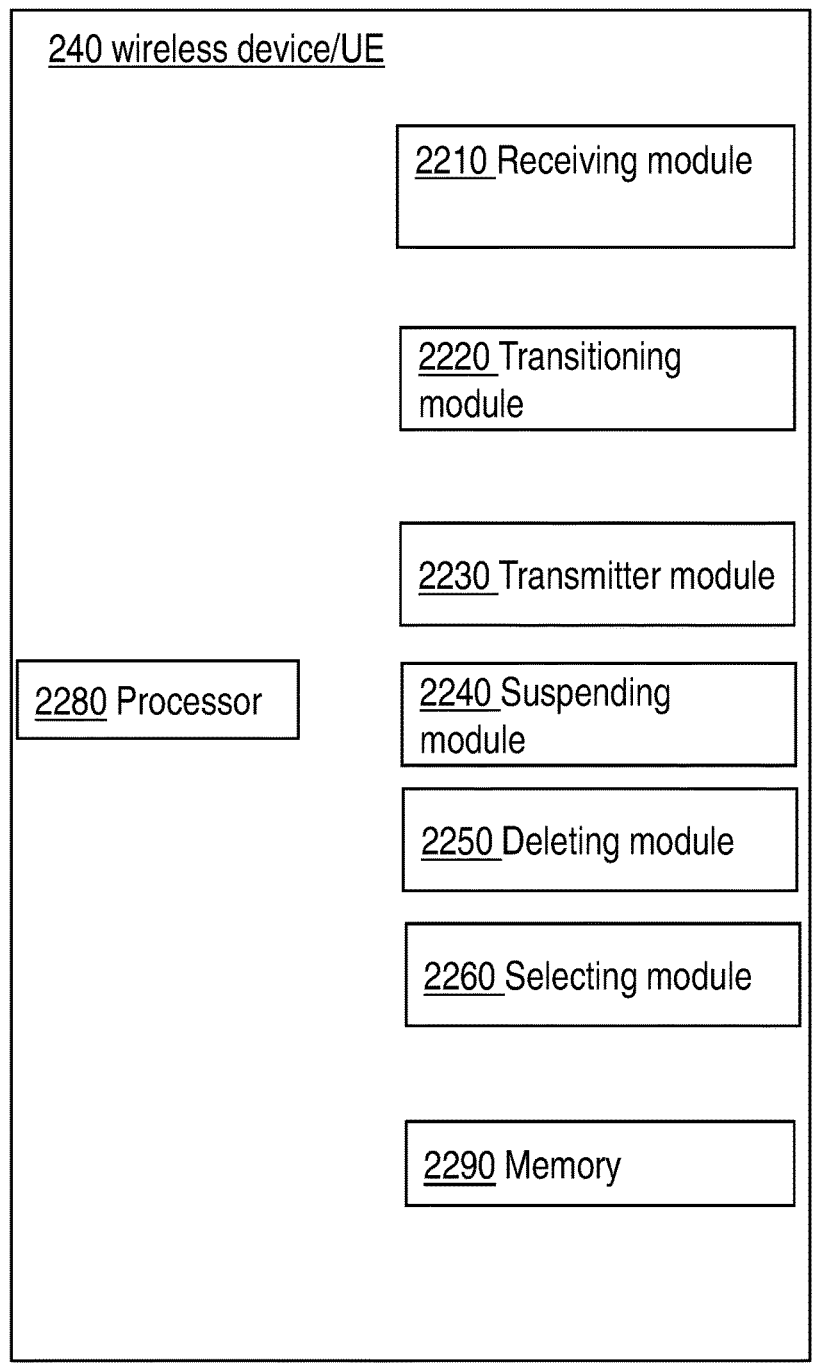
FIG. 22 is a schematic block diagram illustrating embodiments of a wireless device.

This action may be performed by means such as a suspending module 2240 in the wireless device 240 as depicted in FIG. 22. The suspending module 2240 may be implemented by the processor 1280, 2280 in the wireless device 240.

This action is related to actions 1803 and 1901 above.

Actions 2005, 2005a

In some embodiments the wireless device 240 deletes the received information 1600, e.g. if the RCVT timer expires. This was discussed in detail above in relation to FIG. 18.

This action may be performed by means such as a deleting module 2250 in the wireless device 240 as depicted in FIG. 22. The deleting module 2250 may be implemented by the processor 1280, 2280 in the wireless device 240.

This action is related to actions 1804 and 1805 above.

Actions 2006, 2006a

After some time the wireless device 240 needs to resume the suspended connection 251. E.g. the RRC entity in the wireless device 240 may be triggered to establish an RRC connection.

When selecting a cell access method for a cell 221, 222, 223, 224, 225, 226, the wireless device 240 determines whether or not resumption of the connection 251 is allowed in the cell 221, 222, 223, 224, 225, 226, based on the information 1600 from the network node 211. For example, if the wireless device 240 is still in the same cell, e.g. the first cell 221, as it was when it suspended its connection, then the wireless device 240 may determine whether or not resumption of the connection 251 is allowed in this same cell based on the information 1600 that the wireless device 240 received in that cell, i.e. based on the information 1600 associated with that same cell.

The wireless device 240 may camp on the cell 221, 222, 223, 224, 225, 226 for which the wireless device 240 is selecting the cell access method.

In some embodiments the wireless device selects to access the cell 221, 222, 223, 224, 225, 226 by resuming the connection 251 if resumption of the connection is allowed in the cell 221, 222, 223, 224, 225, 226.

The wireless device 240 may receive a second information 1620 related to the cell 221, 222, 223, 224, 225, 226. The second information 1620 comprises a third identifier 1603 identifying a second cell area 281, 282. The second cell area 281, 282 comprises the cell 221, 222, 223, 224, 225, 226. The wireless device 240 may receive the second information 1620 as part of selecting a cell access method for the cell 221, 222, 223, 224, 225, 226. For example, if the wireless device 240 has changed cell from the first cell 221 to the second cell 222 or to the fourth cell 224 during the suspension of the connection 251 then the wireless device 240 may use the second information 1620 in combination with the first information 1600 for determining whether resumption is allowed in the second cell 222 or in the fourth cell 224.

In some embodiments the wireless device 240 compares the first identifier 1601 with the third identifier 1603 and determines that resumption of the connection 251 is allowed in the cell 221, 222, 223, 224, 225, 226 if the first identifier 1601 matches the third identifier 1603.

In some other embodiments the information 1600 comprises the second identifier 1602 identifying the version of the first identifier 1601 and the second information 1620 comprises the fourth identifier 1604 identifying the version of the third identifier 1603. Then the wireless device 240 may compare the second identifier 1602 with the fourth identifier 1604.

Further the wireless device 240 may determine that resumption of the connection 251 is allowed in the cell 221 if the first identifier 1601 identifying the first cell area 281 matches the third identifier 1603, and if the second identifier 1602 matches the fourth identifier 1604.

The second information 1620 may be received on the Broadcast Control CHannel, BCCH comprised in system information.

This action may be performed by means such as a selecting module 2260 in the wireless device 240 as depicted in FIG. 22. The selecting module 2240 may be implemented by the processor 1280, 2280 in the wireless device 240.

This action is related to action 2103 below.

Figure 21A:
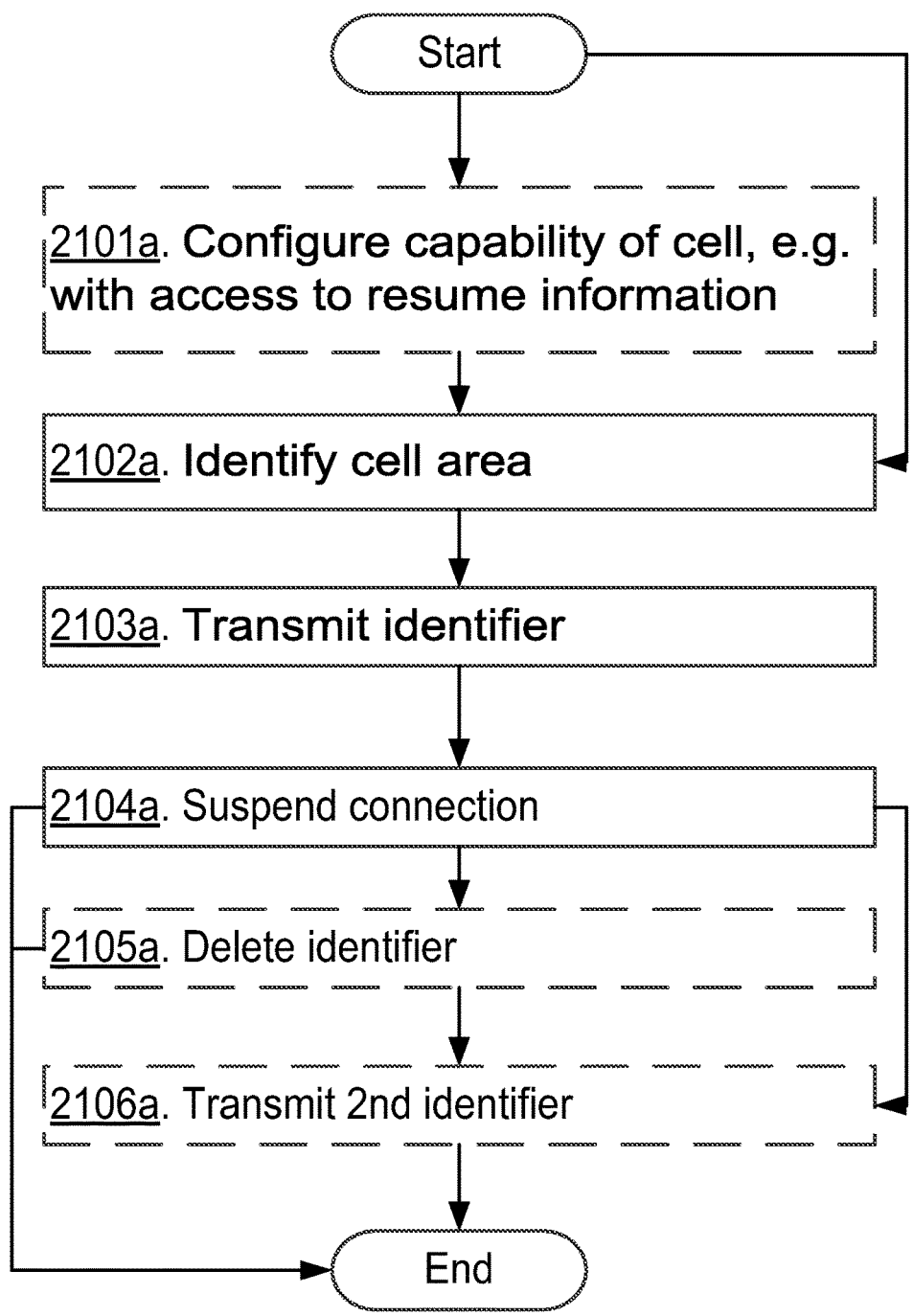
FIG. 21a is a flowchart illustrating further embodiments of a method performed by a first network node and/or by a system of network nodes.

Embodiments will now be described from the viewpoint of the first network node 211 and/or from the viewpoint of the system 216 of network nodes. FIG. 21 describes a method in the first network node 211 according to some embodiments herein. However, embodiments herein will also be described with reference to FIG. 21a.

FIG. 21a is a flowchart that describes actions of a method performed by a system 216 of network nodes for handling suspension of the connection 251 between the wireless device 240 and the wireless communications network 200. The wireless communications network 200 comprises the system 216 of network nodes.

FIG. 21a is also a flowchart that describes actions of a method performed by the first network node 211 for handling suspension of the connection 251 between the wireless device 240 and the wireless communications network 200.

Actions 2101, 2101a

In some embodiments the first network node 211 configures capabilities of cells associated with the first network node 211, such as the first cell 221. For example, the first network node 211 may configure the cells comprised in the first cell area 281. The capabilities may relate to access to information relating to suspend and resume procedures. Such information may be the data 260 related to the connection 251, such as the UE context.

Figure 23:
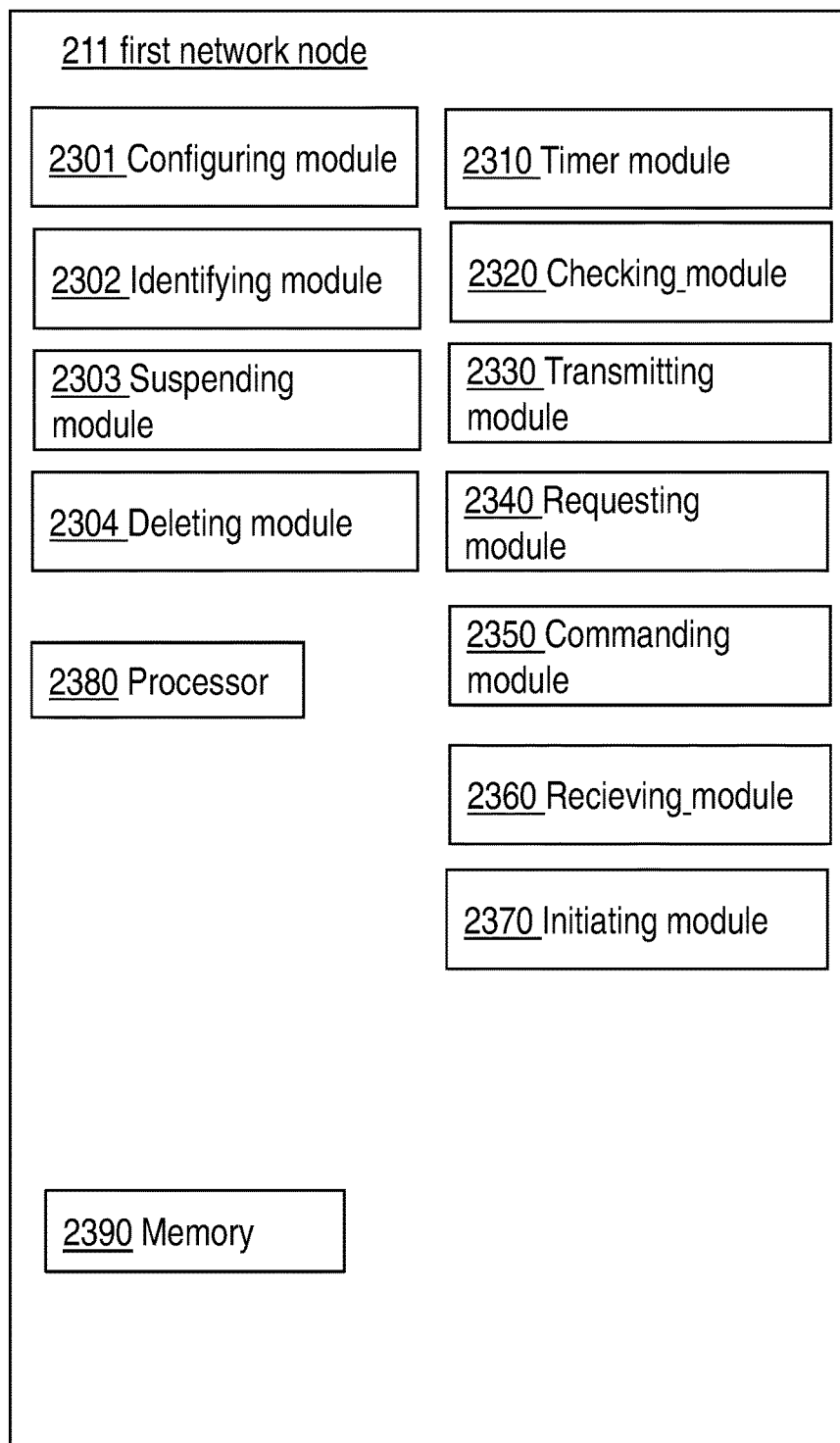
FIG. 23 is a schematic block diagram illustrating embodiments of a first network node.

This action may be performed by means such as a configuring module 2301 in the first network node 211 as depicted in FIG. 23. The configuring module 2301 may be implanted by the processor 1180, 2280 in the first network node 211.

Actions 2102, 2102a

The first network node 211 identifies the first cell area 281. The first cell area 281 comprises one or more cells 221, 222, 223 capable of resuming the connection 251 when the connection 251 is suspended. E.g. the first cell area 281 comprises the first cell 221.

In some embodiments the one or more cells 221, 222, 223 capable of resuming the connection 251 have access to data 260 related to the connection 251. The data 260 is stored for the wireless device 240 at suspension of the connection 251.

This action may be performed by means such as an identifying module 2302 in the first network node 211 as depicted in FIG. 23. The identifying module 2302 may be implanted by the processor 1180, 2280 in the first network node 211.

Actions 2103-2104, 2103a

The first network node 211 transmits 2103 information 1600 to the wireless device 240, which information 1600 comprises a first identifier 1601 identifying the first cell area 281.

The first identifier 1601 enables the wireless device 240 to determine whether resumption of the connection 251 is allowed or not in the cell 221, 222, 223, 224, 225, 226. The cell 221, 222, 223, 224, 225, 226 may for example be a cell for which the wireless device 240 is selecting a cell access method.

The information 1600 may further comprise the second identifier 1602 identifying the version of the first identifier 1601.

The information 1600 may further comprise a time, i.e. duration, for which the identification is valid. In other words, the information 1600 may further indicate the time period during which the identifier is valid.

This action may be performed by means such as the transmitting module 1130, 2330 in the first network node 211 as depicted in FIGS. 11 and 23.

This action is related to action 2101a above.

Action 2104a

The first network node 211 suspends the connection 251 in the first cell 221.

When the first network node 211 suspends the connection 251 it may also start a timer related to the validity of the first identifier 1601.

This action may be performed by means such as a suspending module 2303 in the first network node 211 as depicted in FIG. 23. The suspending module 2240 may be implemented by the processor 1180, 2280 in first network node 211.

This action is related to actions 1803 and 1901 above.

Actions 2105, 2105a

In some embodiments the first network node 211 deletes the transmitted information 1600, e.g. if the RCVT timer expires. The first network node 211 may further delete the data 260 related to the connection when the RCVT timer expires, i.e. when the first identifier 1601 is not valid any more.

This action may be performed by means such as a deleting module 2304 in the first network node 211 as depicted in FIG. 23. The deleting module 2305 may be implemented by the processor 1180, 2380 in the first network node 211.

This action is related to actions 1804 and 1805 above.

Action 2106a

In some embodiments the first network node 211 transmits the second information 1620 to the wireless device 240. The second information 1620 comprises a third identifier 1603 identifying a second cell area 281, 282. The second cell area 281, 282 comprises the cell 221, 222, 223, 224, 225, 226, e.g. the cell 221, 222, 223, 224, 225, 226 for which the wireless device 240 is selecting a cell access method. This enables the wireless device 240 to determine whether or not resumption of the connection 251 is allowed in the cell 221, 222, 223, 224, 225, 226 based on comparing the first identifier 1601 with the second identifier 1603.

In some other embodiments the second network node 214 transmits the second information 1620 to the wireless device 240. This may for example be the case when the wireless device 240 has changed cell to a cell, e.g. the fourth cell 224, comprised in the second cell area 282 during the suspension of the connection 251.

This action may be performed by means such as the transmitting module 1130, 2330 in the first network node 211.

This action is related to action 2006a above.

As mentioned above embodiments herein provide a more efficient procedure to move the wireless device 240 from a state corresponding to RRC_IDLE state or mode to a state where data may be transferred to and from the wireless communications network 200 by reusing information from the previous session.

Embodiments herein further provide means to RRA Information handling. The RRA Information handling manages a variety of scenarios like local equipment failure, memory shortage etc, with a minimized impact to the availability of the functionality of RRC resume.

Some of the embodiments mentioned above will now be summarized below. According to an aspect of embodiments herein it is provided a method in the wireless device 240, such as a UE, for handling the connection 251, such as an RRC connection, between the wireless device 240 and a wireless communications network 200. The wireless communication network 200 comprises at least the first network node 211. The wireless device 240 receives information 1600 from the first network node 211, which information comprises the identifier 1601 of the first cell area 281. The first cell area 281 comprises cells capable of resuming the connection 251, e.g. a cell that has access to an RRC Resume Context that is stored for the wireless device 240 at suspension of its RRC connection. The information 1600 may comprise a time period during which the identification is valid. The Information 1600 may further comprise an identifier of the version of the identifier 1601 of the cell area.

The wireless device 240 may select a cell access method, i.e. determine whether resumption is allowed in the cell the wireless device 240 camps on or not, based on the information from the first network node 211.

According to a second aspect of embodiments herein it is provided a method in a first network node 211 for handling the connection 251, such as an RRC connection, between the wireless device 240, and the wireless communications network 200. The wireless communication network 200 comprises at least the first network node 211. The first network node 211 may configure a capability of a cell, such as a serving cell, which capability is related to the connection.

The first network node 211 may further identify the first cell area 281, which first cell area 281 comprises cells capable of resuming the connection 251, e.g. that has access to an RRC Resume Context that is stored for the wireless device 240 at suspension of its RRC connection.

The first network node 211 may transmit information 1600 to the wireless device 240, which information comprises a first identifier 1601 of the cell area. Thereby, the wireless device 240 is able to select a cell access method, i.e. determine whether resumption is allowed in the cell the wireless device 240 camps on or not, based on information from the first network node 211.

The information 1600 may comprise a time period during which the identification is valid. The information 1600 may further comprise an identifier 1602 of the version of the identifier 1601 of the first cell area 281.

The embodiments herein may be performed in the wireless device 240 and in the network node 211.

The wireless device 240 may comprise the modules mentioned above and depicted in FIG. 22.

In other words, to perform the method actions for handling the connection 251 between the wireless device 240 and the wireless communications network 200 described above in relation to FIG. 20a, the wireless device 240 comprises the arrangement depicted in FIG. 22.

The wireless device 240 is configured to, e.g. by means of the receiving module 2210 configured to, receive information 1600 from the first network node 211, e.g. at suspension of the connection 251. The information relates to a possible resumption of the connection 251 when the connection has been suspended. The information 1600 comprises a first identifier 1601 identifying the first cell area 281. The first cell area 281 comprises one or more cells 221, 222, 223 capable of resuming the connection 251.

The wireless device 240 is further configured to, e.g. by means of the suspending module 2240 configured to, suspend the connection 251 in the first cell 221 out of the one or more cells 221, 222, 223.

The wireless device 240 may further be configured to, e.g. by means of the selecting module 2260 configured to, determine whether or not resumption of the connection 251 is allowed in a cell 221, 222, 223, 224, 225, 226, based on the information 1600 from the network node 211. The determination is performed when the wireless device 240 selects a cell access method for the cell 221, 222, 223, 224, 225, 226.

The wireless device 240 may further be configured to, e.g. by means of the selecting module 2260 configured to, select to access the cell 221, 222, 223, 224, 225, 226 by resuming the connection 251 if resumption of the connection 251 is allowed in the cell 221, 222, 223, 224, 225, 226.

In some embodiments the wireless device 240 is further configured to, e.g. by means of the receiving module 2210 configured to, receive a second information 1620 related to the cell 221, 222, 223, 224, 225, 226. The second information 1620 comprises the third identifier 1603 identifying the second cell area 281, 282.

In some embodiments the wireless device 240 is further configured to, e.g. by means of the selecting module 2260 configured to, compare the first identifier 1601 with the third identifier 1603 and determine that resumption of the connection 251 is allowed in the cell 221, 222, 223, 224, 225, 226 if the first identifier 1601 matches the third identifier 1603.

In some further embodiments the wireless device 240 is further configured to, e.g. by means of the selecting module 2260 configured to, compare the second identifier 1602 with a fourth identifier 1604 identifying the version of the third identifier 1603, and determine that resumption of the connection 251 is allowed in the cell 221 if the first identifier 1601 matches the third identifier 1603, and if the second identifier 1602 matches the fourth identifier 1604.

The first network node 211 may comprise the modules mentioned above and depicted in FIG. 23.

In other words, to perform the method actions for handling the connection 251 between the wireless device 240 and the wireless communications network 200 described above in relation to FIG. 21a, the first network node 211 comprises the arrangement depicted in FIG. 23.

The first network node 211 is configured to, e.g. by means of the identifying module 2301 configured to, identify the first cell area 281.

The first network node 211 is further configured to, e.g. by means of the transmitting module 2330 configured to, transmit information 1600 to the wireless device 240, which information 1600 comprises the first identifier 1601 identifying the first cell area 281.

The first network node 211 is further configured to, e.g. by means of the suspending module 2303 configured to, suspend the connection 251 in the first cell 221.

In some embodiments the first network node 211 is further configured to, e.g. by means of the transmitting module 2330 configured to, transmit the second information 1620 to the wireless device 240. The second information 1620 comprises the third identifier 1603 identifying the second cell area 281, 282.

The second network node 214 may comprise the modules mentioned above and depicted in FIG. 24.

Figure 24:
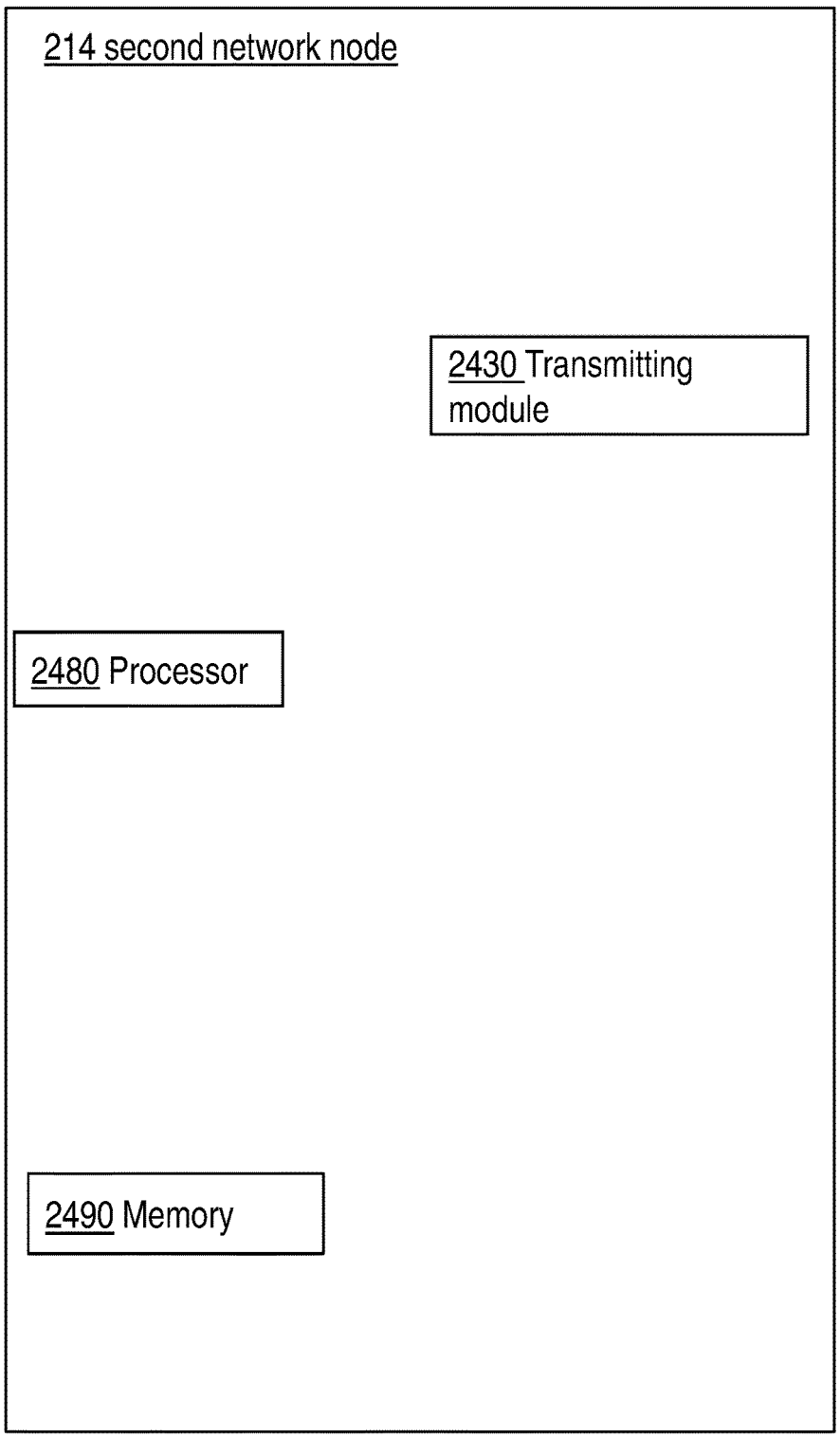
FIG. 24 is a schematic block diagram illustrating embodiments of a second network node.

In other words, to perform the method actions for handling the connection 251 between the wireless device 240 and the wireless communications network 200 described above in relation to FIG. 21a, the second network node 214 comprises the arrangement depicted in FIG. 24.

The second network node 214 is configured to, e.g. by means of the transmitting module 2430 configured to, transmit the second information 1620 to the wireless device 240. The second information 1620 comprises the third identifier 1603 identifying the second cell area 281, 282.

The embodiments herein may be implemented through one or more processors, such as the processor 1180, 2380 in the first network node 211 depicted in FIGS. 11 and 23, the processor 1280, 2280 in the wireless device 240 depicted in FIGS. 12 and 22, the processor 1380 in the second network node 214 depicted in FIG. 24, the processor 1380 in the third network node 212 depicted in FIG. 13, and the processor 1480 in the fourth network node 213 depicted in FIG. 14 together with computer program code for performing the functions and actions of the embodiments herein. The program code mentioned above may also be provided as a computer program product, for instance in the form of a data carrier carrying computer program code for performing the embodiments herein when being loaded into the first network node 211, the second network node 214, the wireless device 240, the third network node 212 and the fourth network node 213. One such carrier may be in the form of a CD ROM disc. It is however feasible with other data carriers such as a memory stick. The computer program code may furthermore be provided as pure program code on a server and downloaded to the first network node 211, the wireless device 240, the second network node 214, the third network node 212 and the fourth network node 213.

Thus, the methods according to the embodiments described herein for the first network node 211, the wireless device 240, the second network node 214, the third network node 212 and the fourth network node 213 may be implemented by means of a computer program product, comprising instructions, i.e., software code portions, which, when executed on at least one processor, cause the at least one processor to carry out the actions described herein, as performed by the first network node 211, the wireless device 240, the second network node 214, the third network node 212 and the fourth network node 213. The computer program product may be stored on a computer-readable storage medium. The computer-readable storage medium, having stored there on the computer program, may comprise the instructions which, when executed on at least one processor, cause the at least one processor to carry out the actions described herein, as performed by the first network node 211, the wireless device 240, the second network node 214, the third network node 212 and the fourth network node 213. In some embodiments, the computer-readable storage medium may be a non-transitory computer-readable storage medium.

The first network node 211, the wireless device 240, the second network node 214, the third network node 212 and the fourth network node 213 may further each comprise a memory 1190/2390, 1290/2290, 2490, 1390, 1490 comprising one or more memory units. The memory 1190/2390, 1290/2290, 2490, 1390, 1490 is arranged to be used to store obtained information such as number of repetitions of a radio block, if the burst mapping is legacy, compact or combined and applications etc. to perform the methods herein when being executed in the first network node 211, the wireless device 240, the second network node 214, the third network node 212 and the fourth network node 213.

Those skilled in the art will also appreciate that the different modules described above may refer to a combination of analog and digital circuits, and/or one or more processors configured with software and/or firmware, e.g. stored in the memory, that when executed by the one or more processors, such as the processors in the first network node 211, the wireless device 240, the second network node 214, the third network node 212 and the fourth network node 213, perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first core network node and a second core network node should be considered to be non-limiting and does in particular not imply a certain hierarchical relation between the two.

The invention claimed is:

1. A method performed by a wireless device for handling suspension of a connection established between the wireless device and a wireless communications network, which wireless communications network comprises a first network node, the method comprising:

receiving information from the first network node, which information comprises a first identifier identifying a first cell area, which first cell area comprises one or more cells capable of resuming the connection using data that is related to the connection established between the wireless device and the wireless communications network and saved in one or more network nodes connected to the wireless device;

suspending the connection in a first cell out of the one or more cells, wherein suspending the connection comprises saving the data that is related to the connection established between the wireless device and the wireless communications network, and wherein resuming the connection comprises establishing a connection using the data that was saved; and when selecting a cell access method for a cell, determining, based on the information received from the first network node, whether or not the cell allows resumption of the connection using the saved data, wherein the information comprising the first identifier identifying the first cell area further comprises a second identifier identifying a version of the first identifier.

2. The method according to claim 1, wherein the wireless device camps on the cell for which the wireless device is selecting the cell access method.

3. The method according to claim 1, further comprising: selecting to access the cell by resuming the connection if resumption of the connection is allowed in the cell.

4. The method according to claim 1, wherein the information further indicates a time period during which the first identifier is valid.

5. The method according to claim 1, further comprising:

receiving a second information related to the cell, which second information comprises a third identifier identifying a second cell area, which second cell area comprises the cell;

comparing the first identifier with the third identifier; and determining that resumption of the connection is allowed in the cell if the first identifier matches the third identifier.

6. The method according to claim 5, further comprising:

comparing the second identifier with a fourth identifier identifying a version of the third identifier; and determining that resumption of the connection is allowed in the cell if the first identifier identifying the first cell area matches the third identifier, and if the second identifier matches the fourth identifier.

7. The method according to claim 1, wherein the wireless communications network is an Long Term Evolution, LTE, network;

the first network node is an eNB;

the wireless device is a User Equipment, UE;

the connection is a Radio Resource Control, RRC, connection;

the information is received with RRC signaling;

a second information is received on a Broadcast Control CHannel, BCCH, comprised in system information.

8. A wireless device for handling suspension of a connection established between the wireless device and a wireless communications network, which wireless communications network comprises a first network node, the wireless device is configured to:

receive information from the first network node, which information comprises a first identifier identifying a first cell area, which first cell area comprises one or more cells capable of resuming the connection using data that is related to the connection established between the wireless device and the wireless communications network and saved in one or more network nodes connected to the wireless device;

suspend the connection in a first cell out of the one or more first cells, wherein suspending the connection comprises saving the data that is related to the connection established between the wireless device and the wireless communications network, and wherein resuming the connection comprises establishing a connection using the data that was saved; and when selecting a cell access method for a cell, determine, based on the information received from the first network node, whether or not the cell allows resumption of the connection using the save data, wherein the information comprising the first identifier identifying the first cell area further comprises a second identifier identifying a version of the first identifier identifying the first cell area.

9. The wireless device according to claim 8, further configured to:

select to access the cell by resuming the connection if resumption of the connection is allowed in the cell.

10. The wireless device according to claim 8, wherein the information further indicates a time period during which the first identifier is valid.

11. The wireless device according to claim 8, further configured to:

receive a second information related to the cell, which second information comprises a third identifier identifying a second cell area, which second cell area comprises the cell;

compare the first identifier with the third identifier; and determine that resumption of the connection is allowed in the cell if the first identifier matches the third identifier.

12. The wireless device according to claim 8, further configured to:

compare the second identifier with a fourth identifier identifying a version of the third identifier; and determine that resumption of the connection is allowed in the cell if the first identifier matches the third identifier, and if the second identifier matches the fourth identifier.

13. A method performed by a system of network nodes for suspension of a connection established between a wireless device and a wireless communications network, which wireless communications network comprises the system of network nodes, comprising:

identifying, by a first network node comprised in the system of network nodes, a first cell area, which first cell area comprises one or more cells capable of resuming the connection using data that is related to the connection established between the wireless device and the wireless communications network and saved in one or more network nodes connected to the wireless device when the connection is suspended;

transmitting, by the first network node to the wireless device, information which comprises a first identifier identifying the first cell area;

suspending, by the first network node, the connection in a first cell out of the one or more cells, wherein suspending the connection comprises saving the data that is related to the connection established between the wireless device and the wireless communications network, and wherein resuming the connection comprises establishing a connection using the data that was saved; and transmitting, by a second network node comprised in the system of network nodes, a second information to the wireless device, which second information is related to a cell, and which second information comprises a third identifier identifying a second cell area, which second cell area comprises the cell, which enables the wireless device to determine, based on comparing the first information with the second information, whether or not resumption of the connection using the saved data is allowed in the cell.

14. The method according to claim 13, further comprising camping on the cell by the wireless device.

15. The method according to claim 13, wherein transmitting the information further comprises transmitting information that indicates a time period during which the identifier is valid.

16. The method according to claim 13, wherein identifying the first cell area comprising the one or more cells capable of resuming the connection comprises identifying the first cell area comprising one or more cells having access to data related to the connection, which data is stored for the wireless device at suspension of the connection.

17. The method according to claim 13, wherein the wireless communications network is an Long Term Evolution, LTE, network;

the first network node is an eNB;

the wireless device is a User Equipment, UE;

the connection is a Radio Resource Control, RRC, connection;

the information is transmitted with RRC signaling;

the second information is transmitted on a Broadcast Control CHannel, BCCH, comprised in system information.

18. A method performed by a first network node for handling suspension of a connection established between a wireless device and a wireless communications network, which wireless communications network comprises the first network node, the method comprising:

identifying a first cell area, which first cell area comprises one or more cells capable of resuming the connection using data that is related to the connection established between the wireless device and the wireless communications network and saved in one or more network nodes connected to the wireless device when the connection is suspended;

transmitting information to the wireless device, which information comprises a first identifier identifying the first cell area, which information enables the wireless device to determine whether resumption of the connection using the saved data is allowed or not in a cell; and suspending the connection in a first cell out of the one or more first cells, wherein suspending the connection comprises saving the data that is related to the connection established between the wireless device and the wireless communication network, wherein transmitting the information further comprises transmitting a second identifier identifying the version of the first identifier.

19. The method according to claim 18, further comprising:

transmitting a second information to the wireless device, which second information is related to the cell, and which second information comprises a third identifier identifying a second cell area, which second cell area comprises the cell, which enables the wireless device to determine, based on comparing the first identifier with a second identifier, whether or not resumption of the connection is allowed in the cell.

20. A system of network nodes, comprising: at least a first network node; a second network node, each network node comprises circuitry, for handling suspension of a connection established between a wireless device and a wireless communications network, wherein:

the first network node comprised in the system of network nodes is configured to identify a first cell area, which first cell area comprises one or more cells capable of resuming the connection using data that is related to the connection established between the wireless device and the wireless communications network and saved in one or more network nodes connected to the wireless device when the connection is suspended;

the first network node is configured to transmit information to the wireless device, which information comprises a first identifier identifying the first cell area;

the first network node is configured to suspend the connection in a first cell out of the one or more cells, wherein suspending the connection comprises saving the data that is related to the connection established between the wireless device and the wireless communications network and wherein resuming the connection comprises establishing a connection using the data that was saved; and the second network node comprised in the system of network nodes is configured to transmit a second information to the wireless device, which second information is related to a cell, and which second information comprises a third identifier identifying a second cell area, which second cell area comprises the cell, which enables the wireless device to determine, based on comparing the first information with the second information, whether or not resumption of the connection using the save data is allowed in the cell.

21. The system of network nodes according to claim 20, wherein the information further comprises a second identifier identifying the version of the first identifier.

22. The system of network nodes according to claim 20, wherein the information further indicates a time period during which the identifier is valid.

23. The system of network nodes according to claim 20, wherein the one or more cells capable of resuming the connection have access to data related to the connection, which data is stored for the wireless device at suspension of the connection.

24. The system of network nodes according to claim 20, further configured to:

transmit a second information to the wireless device, which second information comprises a third identifier identifying a second cell area, which second cell area comprises the cell, which enables the wireless device to determine, based on comparing the first identifier with a second identifier, whether or not resumption of the connection is allowed in the cell.

25. A first network node for handling suspension of a connection established between a wireless device and a wireless communication network, the first network node comprising:

a processor; and memory containing instructions executable by the processor, whereby the first network node is configured to:

identify a first cell area, which first cell area comprises one or more cells capable of resuming the connection using data that is related to the connection established between the wireless device and the wireless communications network and saved in one or more network nodes connected to the wireless device when the connection is suspended;

transmit information to the wireless device, which information comprises a first identifier identifying the first cell area, which first identifier enables the wireless device to determine whether resumption of the connection using the save data is allowed or not in a cell; and suspend the connection in a first cell out of the one or more cells, wherein suspending the connection comprises saving the data that is related to the connection established between the wireless device and the wireless communications network and wherein resuming the connection comprises establishing a connection using the data that was saved, wherein the information further comprises a second identifier identifying the version of the first identifier.

26. The first network node according to claim 25, wherein the information further indicates a time period during which the identifier is valid.

27. The first network node according to claim 25, wherein the one or more cells capable of resuming the connection have access to data related to the connection, which data is stored for the wireless device at suspension of the connection.

28. The first network node according to claim 25, further configured to:

transmit a second information to the wireless device, which second information comprises a third identifier identifying a second cell area, which second cell area comprises the cell, which enables the wireless device to determine, based on comparing the first identifier with a second identifier, whether or not resumption of the connection is allowed in the cell.

* * * * *